United States Patent
Samukawa et al.

(10) Patent No.: US 8,781,644 B2
(45) Date of Patent: Jul. 15, 2014

(54) METHOD AND APPARATUS FOR RECOGNIZING SHAPE OF ROAD FOR VEHICLES

(75) Inventors: Yoshie Samukawa, Kariya (JP); Toyohito Nozawa, Aichi-ken (JP); Mai Sakamoto, Konan (JP); Hiroshi Ookata, Kariya (JP)

(73) Assignee: Denso Corporation, Kariya (JP)

( * ) Notice: Subject to any disclaimer, the term of this patent is extended or adjusted under 35 U.S.C. 154(b) by 79 days.

(21) Appl. No.: 13/424,735

(22) Filed: Mar. 20, 2012

(65) Prior Publication Data

US 2012/0271483 A1 Oct. 25, 2012

(30) Foreign Application Priority Data

| Mar. 21, 2011 | (JP) | 2011-061860 |
| May 17, 2011 | (JP) | 2011-110221 |
| May 17, 2011 | (JP) | 2011-110222 |
| May 17, 2011 | (JP) | 2011-110223 |
| May 17, 2011 | (JP) | 2011-110224 |
| May 17, 2011 | (JP) | 2011-110225 |

(51) Int. Cl.
*G05D 1/00* (2006.01)
*G05D 1/02* (2006.01)
*B60W 40/072* (2012.01)

(52) U.S. Cl.
CPC .................. *B60W 40/072* (2013.01)
USPC .............................................. 701/1; 701/300

(58) Field of Classification Search
CPC ................................................... B60W 40/072
USPC .............. 701/1, 45, 93, 301, 300; 342/70–71; 340/903
See application file for complete search history.

(56) References Cited

U.S. PATENT DOCUMENTS 6,226,571 B1 5/2001 Kai
6,553,283 B2 4/2003 Shirai et al.
(Continued)

FOREIGN PATENT DOCUMENTS

JP 09-288179 11/1997
JP 11-345394 12/1999
(Continued)

OTHER PUBLICATIONS

Office Action issued Dec. 20, 2012 in corresponding Japanese Application No. 2011-110225 with English translation.
(Continued)

*Primary Examiner* — Helal A Algahaim
*Assistant Examiner* — Nga X Nguyen
(74) *Attorney, Agent, or Firm* — Harness, Dickey & Pierce, PLC

(57) ABSTRACT

An example of recognition of the shape of a road where a vehicle travels is provided. An object type as to whether an object is a moving or stationary object is determined according to a relative speed of the object and a speed of the vehicle. Object-unit data effective for recognizing a road shape is extracted according to the determination. The object-unit data is used for forming data of a roadside object group, based on which a road edge is recognized. A series of the processes is repeatedly performed at a predetermined cycle. After the extraction process, a data addition process is performed to add object-unit data obtained in the extraction process of the previous cycle to object-unit data obtained in the extraction process of the present cycle. In a recognition process, a road edge is recognized according to the object-unit data obtained in the data addition process.

3 Claims, 29 Drawing Sheets

(56) References Cited

U.S. PATENT DOCUMENTS

| | | |
|---|---|---|
| 6,567,039 B2 | 5/2003 | Shirai et al. |
| 8,214,087 B2 | 7/2012 | Samukawa et al. |
| 2001/0020201 A1 | 9/2001 | Shirai et al. |
| 2001/0025211 A1 | 9/2001 | Shirai et al. |
| 2001/0026238 A1 | 10/2001 | Shirai et al. |
| 2001/0037165 A1* | 11/2001 | Shirai et al. ................. 701/1 |
| 2001/0053955 A1 | 12/2001 | Shirai et al. |
| 2002/0044080 A1 | 4/2002 | Shirai et al. |
| 2004/0117090 A1* | 6/2004 | Samukawa et al. ........... 701/45 |
| 2005/0033516 A1 | 2/2005 | Kawasaki |
| 2009/0027180 A1 | 1/2009 | Shibata et al. |

FOREIGN PATENT DOCUMENTS

| | | |
|---|---|---|
| JP | 2001-256600 | 9/2001 |
| JP | 2001-283391 | 10/2001 |
| JP | 2001-328451 | 11/2001 |
| JP | 2001-338398 | 12/2001 |
| JP | 3417375 | 4/2003 |
| JP | 3417381 | 4/2003 |
| JP | 3427809 | 5/2003 |
| JP | 3427817 | 5/2003 |
| JP | 2007-066047 | 3/2007 |
| JP | 2008-286565 | 11/2008 |
| JP | 2009-031053 | 2/2009 |
| JP | 2010-107447 | 5/2010 |
| JP | 2011-018214 | 1/2011 |

OTHER PUBLICATIONS

Office action dated Apr. 23, 2013 in corresponding Japanese Application No. 2011-110221.
Office action dated Apr. 23, 2013 in corresponding Japanese Application No. 2011-110222.
Office action dated Apr. 23, 2013 in corresponding Japanese Application No. 2011-110223.
Office action dated Jun. 4, 2013 in corresponding Japanese Application No. 2011-061860.
Office action dated Oct. 1, 2013 in corresponding Japanese Application No. 2011-110223.
Office action dated Jan. 10, 2014 in corresponding Chinese Application No. 201210076608.3.

* cited by examiner

STRAIGHT-ROAD CONVERSION

FUNDAMENTAL DETERMINATION 1 (LEFT)

FUNDAMENTAL DETERMINATION 2 (LEFT)

FIG.9

| | SEGMENT INFORMATION THIS TIME | CONDITIONS |
|---|---|---|
| a | VEHICLE SPEED Vn | Vn≧1667cm／s(60km／h) |
| b | ESTIMATED R | |R|＞7000m |
| c | | |R|＜700m |
| d | | R＞2500m |
| e | | −2500m＞R |
| f | ROAD SHAPE ESTIMATED R Road_R | |Road_R|＞7000m |
| g | | |Road_R|＜700m |
| h | | Road_R≠32767 (CALCULATION HAS NOT BEEN COMPLETED.) |
| i | | Road_R＞0 |
| j | | Road_R＜0 |
| k | ROAD R, ROAD SHAPE ESTIMATED R | 1／R−1／Road_R＞0.0008 |
| l | | 1／R−1／Road_R＜−0.0008 |
| m | | 1／R−1／Road_R＞0.0015 |
| n | | 1／R−1／Road_R＜−0.0015 |
| o | MOVING OBJECT FLAG | ON |
| p | EXTRAPOLATION CONDITION | EXTRAPOLATION |
| q | WIDE-RANGE FLAG | ON |
| r | | Cycle＞50 |
| s | | Cycle＜150 |
| t | | Cycle＞200 |
| u | | Cycle＞300 |
| v | INSTANTANEOUS CORRECTION VALUE PH BASED ON ROAD SHAPE RECOGNITION | Ph＜0% |
| w | | Ph＞0% |
| x | LANE PROBABILITY INSTANTANEOUS VALUE P | P≦50% |
| y | | P＞50% |
| z | DISTANCE Z | 30m＜Z＜80m |
| a2 | | 60m＜Z＜110m |
| b2 | RELATIVE SPEED Vr | |Vr|＜417cm／s(15kph) |
| c2 | | |Vr|＞555cm／s(20kph) |
| d2 | DISTANCE Z | 30m＜Z＜100m |

MEASUREMENT DATA

CONNECTION REQUIREMENT : $\begin{cases} \Delta X \leq 0.2m \\ \Delta Z \leq 2m \end{cases}$

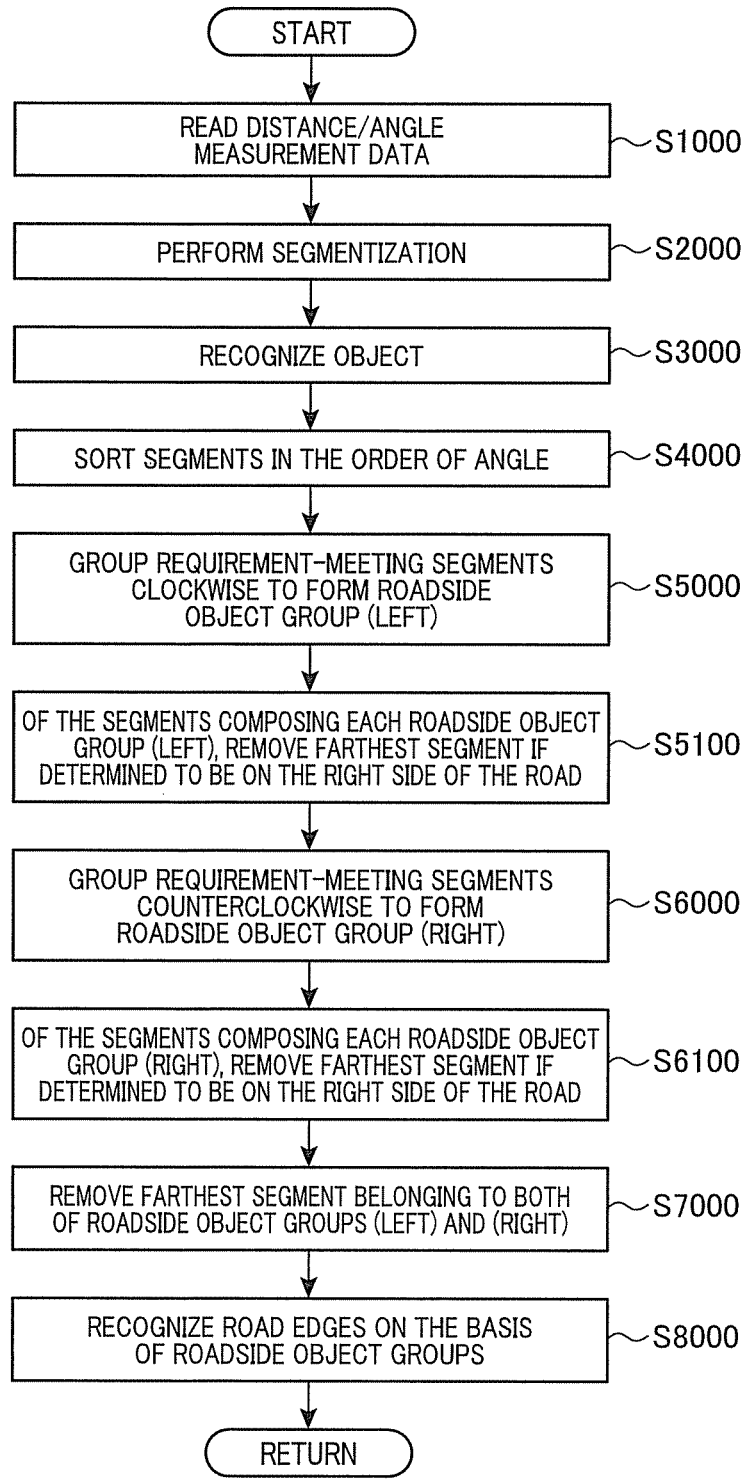

FIG.22
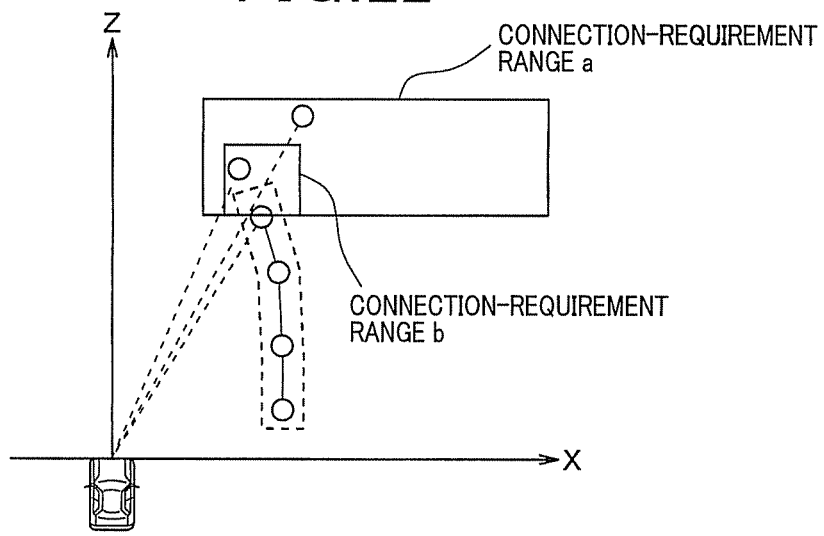
FIG.23
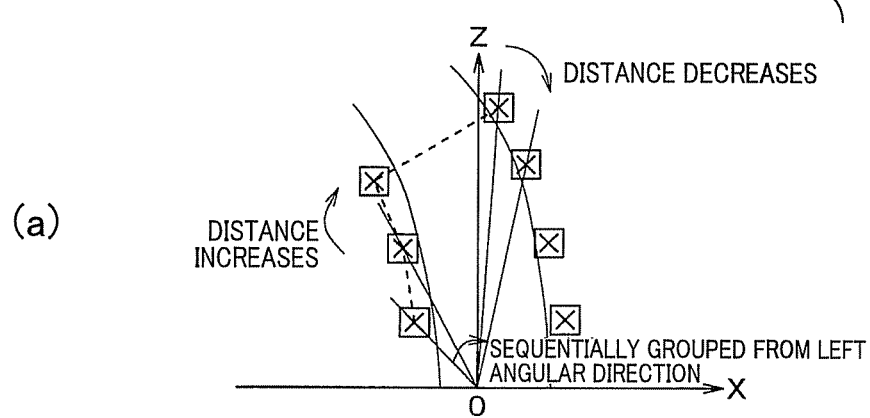
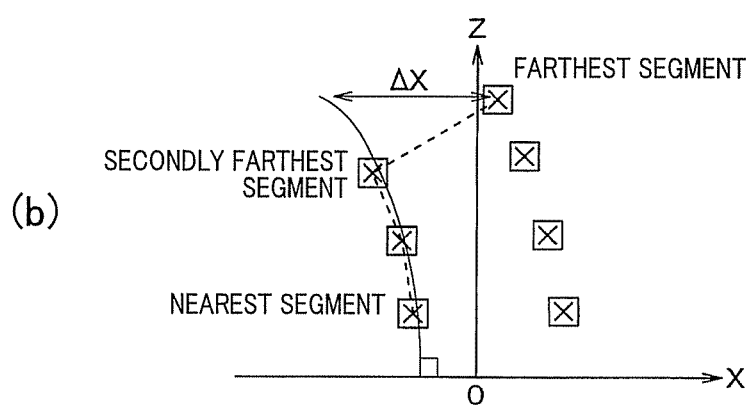

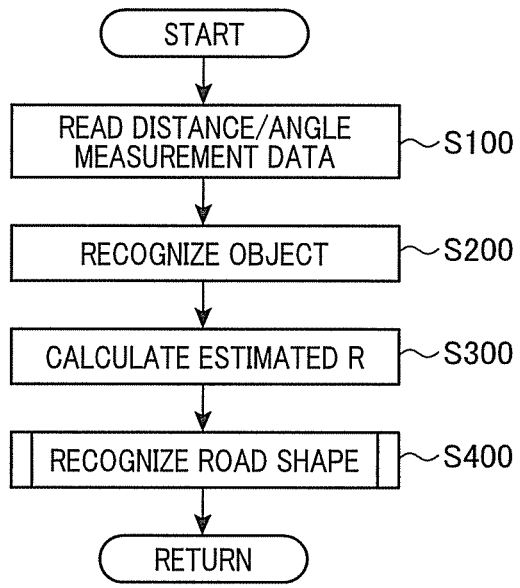
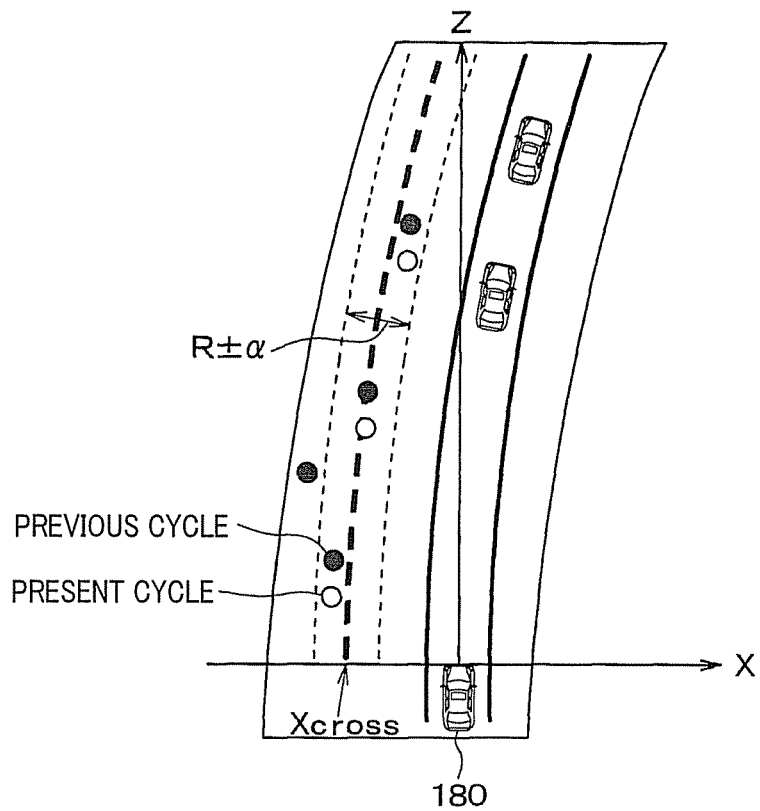

METHOD AND APPARATUS FOR RECOGNIZING SHAPE OF ROAD FOR VEHICLES

CROSS-REFERENCE TO RELATED APPLICATION

This application is based on and claims the benefit of priority from earlier Japanese Patent Application No. 2011-061860 filed Mar. 21, 2011 and Nos. 2011-110221, 2011-110222, 2011-110223, 2011-110224 and 2011-110225 all filed May 17, 2011, the descriptions of which are incorporated herein by reference.

BACKGROUND OF THE INVENTION

1. Technical Field of the Invention

The present invention relates to a method and an apparatus for recognizing the shape of a road on which the vehicle travels.

2. Related Art

Methods of calculating a lane-probability instantaneous value are well known. The term lane probability refers to a probability that a target to be recognized ahead of the vehicle is present on the same lane. A lane-probability instantaneous value is calculated from a curve radius of the road where the vehicle travels in order to make a determination on an object to be controlled. The curve radius is obtained from a position (distance and lateral position) of a target ahead of the vehicle that has been detected by a sensor, a state of turn of the vehicle that has been obtained based on a steering angle and a yaw rate, and a speed of the vehicle. A lane-probability instantaneous value calculated in this way is corrected and applied such as with a predetermined filtering process to calculate a lane probability, based on which a preceding vehicle is selected.

However, the state of turn of the vehicle is usually not in conformity with the shape of the road on which an actual object to be controlled travels. To take measures against this, a Patent Document 1 (JP-B-3417375), for example, discloses a technique for calculating a lane probability. According to the technique, the shape of the road the vehicle travels is recognized to correct a curve radius R of the turn of the vehicle and to correct a lane-probability instantaneous value. The corrected lane-probability instantaneous value is applied such as with a predetermined filtering process to calculate a lane probability, based on which a preceding vehicle is selected.

However, the calculation according to the technique of conventional art mentioned above is based on the estimation of a road edge that matches the shape of the road. Therefore, the technique is unlikely to provide a correct estimation when the vehicle does not travel along the shape of the road, such as when the vehicle travels through an interchange, a ramp, i.e. on-ramp or off-ramp, a climbing lane or the like, or when the vehicle, such as a bus, is going to stop at a bus stop on an expressway.

For example, as shown in FIG. 11, a road of left-hand curve on which the vehicle travels may be connected with a road of right-hand curve. In this case, when a curve radius (curvature radius) R calculated based on the recognized road shape is corrected, for a curve radius R calculated on the vehicle side, the corrected curvature radius R is not in conformity, after all, with the shape of the road the vehicle travels. Thus, even when the shape of the road is recognized correctly on the vehicle side, the correction of the curvature radius R is likely to impair correct road shape recognition in a situation as shown in FIG. 11.

Further, according to the technique disclosed in this Patent Document 1, it is determined whether an object is a moving object or a stationary object in recognizing the shape of the road. Then, the stationary objects are connected and grouped for the recognition of a road edge.

The conventional art mentioned above may encounter a problem that roadside objects are not detected due to the presence of a preceding vehicle or that the absolute number of roadside objects is small. Accordingly, a road edge is not calculated more correctly and with good frequency, and thus the shape of the road is unlikely to be recognized more correctly.

Further, according to the conventional art mentioned above, stationary objects that are not roadside objects may be targeted for grouping, or a base point of the grouping may be incorrect. Thus, grouping of roadside object groups is unlikely to be performed with good accuracy. As a result, a road edge is not calculated more correctly and with good frequency, and thus the shape of the road is unlikely to be recognized more correctly.

On the other hand, a Patent Document 2 (JP-B-3427809) suggests a method of recognizing a road on which the vehicle travels. Specifically, in the method disclosed in the Patent Document 2, segmentized measurement data is sorted in the order of, angle to remove unnecessary data based on the shape of segment and to remove segments located in the vicinity of moving objects. Then, the segments effective for recognizing the shape of the road are grouped clockwise and counterclockwise. Further, a farthest segment, if it is doubtful, is removed. Then, road edges are recognized based on a roadside object group (left) and a roadside object group (right).

However, according to the conventional art mentioned above, the base point for grouping roadside objects may sometimes be incorrect, and thus grouping of roadside object groups is unlikely to be performed with good accuracy. As a result, a road edge is not calculated more correctly and with good frequency, and thus the shape of the road is unlikely to be recognized more correctly.

Further, the conventional art mentioned above may encounter a problem that roadside objects are not detected due to the presence of a preceding vehicle or that the absolute number of roadside objects is small. Accordingly, a road edge is not calculated more correctly and with good frequency, and thus the shape of the road is unlikely to be recognized more correctly.

In addition, the shape of the road on which an actual object to be controlled travels is unlikely to be in conformity with the state of turn of the vehicle. In this regard, a Patent Document 3 (JP-A-2001-328451) suggests a technique for calculating a curve radius of a road based on a stationary object as well when the stationary object is present on the road. Then, a curve radius based on the vehicle is corrected using the curve radius based on the stationary object. The corrected curve radius is used for calculating a lane-probability instantaneous value which is then used for calculating a lane probability. Then, based on the lane probability, a preceding vehicle is selected.

In this way, generally, in recognizing the shape of a road, stationary objects are recognized as mentioned above and a curve radius is calculated based on the stationary objects. However, for example, it is sometimes difficult to detect stationary objects due to the presence of a preceding vehicle, or the absolute number of stationary objects may be small. For this reason, stationary objects do not necessarily contribute to accurately calculating a curve radius, and thus the shape of the road is not necessarily calculated correctly and with good frequency.

SUMMARY

Thus it is desired to provide a road shape recognition method and an apparatus for vehicles, which is able to calculate the shape of a road more correctly and with good frequency.

In order to achieve the object set forth above, according to a first example, the shape of the road ahead of the vehicle is recognized based on a distance to an object and an angle thereof in the vehicle's width direction. Based on the recognized road shape and the degree of recognition, a probability is determined of the object's being on the lane where the vehicle travels. Then, based on the results of the determination, a correction value for correcting a lane probability is calculated. Then, it is determined whether or not there is a difference between a curvature of the road where the vehicle travels and the curvature of the recognized road shape. If there is no difference, the lane probability is corrected by the correction value. If there is a difference, the lane probability is not corrected by the correction value.

Thus, in a situation where an estimated R is significantly different from a road-shape R, a lane probability suitable for the situation is obtained. Specifically, correction of a lane probability is prevented from becoming a demerit, thereby enabling more correct calculation of the road shape with good frequency.

Also, in an apparatus for realizing the road shape recognition method for vehicles, it is determined whether or not there is a difference between a curvature of the road where the vehicle travels and the curvature of the recognized road shape. If it is determined that there is no difference, the lane probability calculated by a lane probability calculating means is corrected by a correction value calculated by a correction value calculating means. If it is determined that there is a difference, the lane probability calculated by the lane probability calculating means is not corrected by the correction value calculated by the correction value calculating means.

Thus, similar to the first example, the road shape is more correctly recognized.

For example, a computer system may realize the functions of a curve radius calculating means, object recognizing means, lane probability calculating means, road shape recognizing means, same-lane determining means and correction value calculating means. In this case, for example, the functions may be provided in the form of programs started by the computer system. Such programs may be recorded on a computer-readable a recording medium, such as a magnetooptical disc, CD-ROM, hard disc or flash memory, and may be used by loading the programs onto the computer system as necessary and starting the loaded programs. Alternatively, the programs may be recorded on a ROM or a backup RAM as a computer-readable recording medium, and the ROM or the backup RAM may be integrated into the computer system.

In order to achieve the object set forth above, according to a second example, a transmission wave is radiated over a predetermined angular range in the vehicle's width direction. In recognizing a road shape around the vehicle based on the reflected wave, the following recognition is performed. Specifically, object-unit data at least including a distance to each object are acquired according to angles in a vehicle's width direction. At the same time, it is determined whether each object is a moving object or a stationary object based on the relative speed of the object obtained based on the reflected wave and based on the speed of the vehicle. Then, based on the results of the determination as to the object type, object-unit data is extracted, which is effective for recognizing the road shape. After that, based on the object-unit data, data of a roadside object group is formed, clockwise and counterclockwise, by grouping the data having a distance of monotonic increase as a connection requirement. Then, a road edge is recognized based on the data of the roadside object group formed in this way.

Such a series of processes is ensured to be repeatedly performed at a predetermined cycle. After extracting the object-unit data effective for recognizing the road shape, a data addition process is performed to add the object-unit data extracted in the previous cycle to the object-unit data extracted in the present cycle. Then, a road edge is recognized based on the object-unit data obtained through the data addition process.

In this way, since the object-unit data of the previous cycle are added to the object-unit data of the present cycle, the amount of data used for road shape recognition is increased. Thus, the accuracy of recognizing a road edge is enhanced and further a correct road shape is calculated with good frequency in a situation where an absolute number of roadside objects that can be used for road shape recognition is small, such as when roadside objects cannot be detected due to the presence of a preceding vehicle or when an absolute number of roadside objects is small.

Also, in an apparatus for realizing the road shape recognition method for vehicles according to the second example is provided with a data adding means for adding object-unit data extracted by an effective data extracting means in the previous cycle to object-unit data extracted by the effective data extracting means in the present cycle, after the process to be performed by the effective data extracting means has been performed. In the apparatus, a road edge recognizing means recognizes a road edge based on the object-unit data obtained by the data adding means.

Thus, similar to the first example, the road shape is more correctly calculated with good frequency.

A computer system may realize the function of the recognizing means of the road shape recognition apparatus for vehicles. For example, the function may be provided in the form of a program started by the computer system.

In order to achieve the object set forth above, according to a third example, a transmission wave is radiated over a predetermined angular range in the vehicle's width direction. In recognizing a road shape around the vehicle based on the reflected wave, the following recognition is performed. Specifically, object-unit data at least including a distance to each object are acquired according to angles in a vehicle's width direction. At the same time, it is determined whether each object is a moving object or a stationary object based on the relative speed of the object obtained based on the reflected wave and based on the speed of the vehicle. Then, based on the results of the determination as to the object type, object-unit data is extracted, which is effective for recognizing the road shape. When a stationary object is present on the traveling road between the vehicle, i.e. the apparatus-equipped vehicle, and a preceding vehicle, i.e. an immediately preceding vehicle, or between the immediately preceding vehicle and a vehicle ahead of the immediately preceding vehicle, i.e. a secondly preceding vehicle, data corresponding to the stationary object on the traveling road is removed from extracted object-unit data. After that, based on the object-unit data, data of a roadside object group is formed, clockwise and counter-clockwise, by grouping the data having a distance of monotonic increase as a connection requirement. Then, a road edge is recognized based on the data of the roadside object group formed in this way.

In this way, stationary objects are removed from the object-unit data, the stationary objects being positioned on a road where the apparatus-equipped vehicle travels or where an immediately preceding vehicle travels. Thus, the road side object group resulting from the grouping of data is approximated to an actual road shape.

Also, in the apparatus for realizing the road shape recognition method for vehicles according to the third example, when a stationary object is present on the traveling road between the vehicle, i.e. the apparatus-equipped vehicle, and a preceding vehicle, i.e. an immediately preceding vehicle, or between the immediately preceding vehicle and a vehicle ahead of the immediately preceding vehicle, i.e. a secondly preceding vehicle, data corresponding to the stationary object on the traveling road is removed from the extracted object-unit data.

Thus, similar to the first example, the road shape is more correctly calculated with good frequency.

A computer system may realize the function of the recognizing means of the road shape recognition apparatus for vehicles. For example, the function may be provided in the form of a program started by the computer system.

In order to achieve the object set forth above, according to a fourth example, a transmission wave is radiated over a predetermined angular range in the vehicle's width direction. In recognizing a road shape around the vehicle based on the reflected wave, the following recognition is performed. Specifically, object-unit data at least including a distance to each object are acquired according to angles in a vehicle's width direction. At the same time, it is determined whether each object is a moving object or a stationary object based on the relative speed of the object obtained based on the reflected wave and based on the speed of the vehicle. Then, based on the results of the determination as to the object type, object-unit data is extracted, which is effective for recognizing the road shape. Then, from the extracted object-unit data, a lateral position is extracted of a stationary object located at a position nearest to the vehicle in the vehicle's width direction. At the same time, a stationary object as a starting point is determined. The stationary object in this case is at a position of a predetermined distance from the lateral position of the stationary object located nearest to the vehicle in the vehicle's width direction, and is at a position where the direct distance from the vehicle is the shortest. Then, data of a roadside object group is formed, clockwise and counterclockwise, by connecting and grouping, from the starting point, the data having a distance of monotonic increase as a connection requirement. Then, a road edge is recognized based on the data of the roadside object group formed in this way.

Thus, a stationary object at a position having a smallest angle with reference to the vehicle's width direction and distanced far from the vehicle is prevented from being used as a starting point of grouping connection. Further, when the roadside is seen doubled, grouping is preferentially started from an inner stationary object, without using a distant stationary object, to form a roadside object group. Thus, accuracy of recognizing a road edge is enhanced and further the road shape is more correctly calculated with good frequency.

According to the fourth example, in forming data of a roadside object group, a first connection-requirement range and a second connection-requirement range are determined. The second connection-requirement range is smaller than and included in the first connection-requirement range. Then, starting from a starting point as a base point, a stationary object included in both of the first and second connection-requirement ranges is connected to the starting point. Then, the connected stationary object is used as the subsequent base point, for connection with a stationary object which is included in both of the first and second connection-requirement ranges. This is repeated for the grouping of stationary objects, thereby forming data of a roadside object group.

In this way, in grouping stationary objects, the first and second connection-requirement ranges are determined. Accordingly, a stationary object included in the first connection-requirement range but not included in the second connection-requirement range is excluded from connection. Thus, comparing stationary objects in the order of angle, a stationary object having a large distance difference but small angular difference is prevented from being preferentially subjected to comparison and connection. Accordingly, grouping connection is more approximated to an actual road shape and further the accuracy of road edge recognition is enhanced.

For example, in recognizing a road edge based on data of a roadside object group, a plurality of data of roadside object groups are formed. After that, an intersection between a circle passing the roadside object group and an axis in the vehicle's width direction is calculated for each roadside object group. Then, a road edge is recognized using only the roadside object groups for the intersections which are positioned in a range defined between an intersection nearest to the vehicle in the vehicle's width direction and a point distanced from the intersection by a threshold distance.

Thus, the roadside object groups far from the vehicle in the vehicle's width direction are excluded in recognizing a road edge. Accordingly, a calculated average road edge is recognized as passing vehicle side roadside object groups, and thus the accuracy of road edge recognition is enhanced.

On the other hand, in an apparatus for realizing the road shape recognition method for vehicles according to the fourth example, the effects similar to those described above are also exerted.

A computer system may realize the function of the recognizing means of the road shape recognition apparatus for vehicles. For example, the function may be provided in the form of a program started by the computer system.

In order to achieve the object set forth above, according to a fifth example, a transmission wave is radiated over a predetermined angular range in the vehicle's width direction. In recognizing a road shape around the vehicle based on the reflected wave, the following road shape recognition is performed. Specifically, object-unit data at least including a distance to each object are acquired according to angles in a vehicle's width direction. At the same time, it is determined whether each object is a moving object or a stationary object based on the relative speed of the object obtained based on the reflected wave and based on the speed of the vehicle. Then, based on the results of the determination as to the object type, object-unit data of an immediately preceding vehicle and a secondly preceding vehicle with respect to the apparatus-equipped vehicle are extracted from moving objects, and object-unit data of reflectors placed along the road are extracted from stationary objects. After that, three points of the object-unit data, i.e. the apparatus-equipped vehicle, the immediately preceding vehicle and the secondly preceding vehicle, are approximated to a circle to thereby calculate a radius of the circle. Then, a road shape is recognized based on the radius of the circle and a line of the reflectors.

In this way, the radius of the circle is calculated using the immediately preceding vehicle and the secondly preceding vehicle. The radius of the circle is used for road shape recognition to more correctly obtain a road shape with good frequency, even when, for example, it is difficult to detect reflectors or when the number of reflectors on the road is originally small.

Also, an apparatus for realizing the road shape recognition method for vehicles according to the fifth example is provided with a preceding vehicle extracting means for extracting the object-unit data of the immediately preceding vehicle and the secondly preceding vehicle with respect to the apparatus-equipped vehicle from among moving objects, a reflector extracting means for extracting the object-unit data of reflectors placed along the road from among stationary objects, and an approximation radius calculating means for approximating the object-unit data of three points, i.e. the apparatus-equipped vehicle, the immediately preceding vehicle and the secondly preceding vehicle, to a circle to thereby calculate the radius of the circle. In the apparatus, the road shape recognizing means recognizes the road shape based on the radius of the circle and a line of reflectors. Thus, similar to the first example, the road shape is more correctly calculated with good frequency.

A computer system may realize the function of the recognizing means of the road shape recognition apparatus for vehicles. For example, the function may be provided in the form of a program started by the computer system.

In order to achieve the object set forth above, according to a sixth example, a transmission wave is radiated over a predetermined angular range in the vehicle's width direction. In recognizing a road shape around the vehicle based on the reflected wave, the following recognition is performed. Specifically, object-unit data at least including a distance to each object are acquired according to angles in a vehicle's width direction. At the same time, it is determined whether each object is a moving object or a stationary object based on the relative speed of the object obtained based on the reflected wave and based on the speed of the vehicle. Then, based on the results of the determination as to the object type, object-unit data of reflectors placed along the road are extracted from among stationary objects. After that, a circle passing the line of reflectors is approximated based on the object-unit data of the reflectors extracted in the extraction process. Thus, a road-shape estimated curve radius is calculated for use in recognizing the road shape.

Such a series of processes is ensured to be repeatedly performed at a predetermined cycle. In extracting object-unit data of reflectors from among stationary objects, an addition process is performed. In the addition process, of the object-unit data of reflectors extracted in the previous cycle, specific object-unit data are added to the object-unit data of reflectors extracted in the extraction process of the present cycle. The specific object-unit data are of reflectors positioned within a predetermined range in the radial direction with reference to the road-shape estimated curve radius calculated in the recognition process of the previous cycle. Then, in performing road shape recognition, a road-shape estimated curve radius is calculated based on the object-unit data of reflectors obtained in the data addition process, for use in recognizing the road shape.

In this way, of the object-unit data of reflectors extracted in the previous cycle, those of reflectors placed within a predetermined range with reference to the road-shape estimated curve radius calculated in the previous cycle are added to the data of the present cycle, thereby enhancing the appearance frequency of reflectors. Further, since the data of reflectors of the previous cycle, which are placed within the predetermined range, are selected, data of reflectors reflecting the road shape can be used. Therefore, the road shape is more correctly calculated with good frequency even when it is difficult to detect reflectors due to the presence of a preceding vehicle or when the number of reflectors on the road is originally small.

Also, in an apparatus for realizing the road shape recognition method for vehicles according to the sixth example, the extracting means is provided with a data adding means which adds the object-unit data of reflectors positioned within a predetermined range in the radial direction with reference to the road-shape estimated curve radius calculated in the previous cycle, from among the object-unit data of reflectors extracted in the previous cycle, to the object-unit data of reflectors extracted in the present cycle. Further, in the apparatus, the road shape recognizing means is configured to calculate the road-shape estimated curve radius based on the object-unit data of reflectors obtained by the data adding means, for use in recognizing the road shape. Thus, the road shape is more correctly calculated with good frequency.

A computer system may realize the function of the recognizing means of the road shape recognition apparatus for vehicles. For example, the function may be provided in the form of a program started by the computer system.

It should be noted that the bracketed reference numerals in this section and in the claims indicate correspondency with the specific means in the embodiments described later.

BRIEF DESCRIPTION OF THE DRAWINGS

In the accompanying drawings:

FIG. 9 is a diagram showing relationship between segment information and its requirement;

FIG. 20 is an explanatory diagram illustrating the outline of a road shape recognition process according to a fourth embodiment of the present invention;

FIG. 22 is an explanatory diagram illustrating how to sequentially connect stationary objects starting from a stationary object at a starting point;

FIG. 23 is an explanatory diagram illustrating how to cope with a farthest segment in a roadside object group (left);

FIG. 37 is a flow diagram illustrating road shape recognition executed by an inter-vehicle control apparatus to which a road shape recognition apparatus according to a tenth embodiment of the present invention is applied; and FIG. 38 is an explanatory diagram illustrating how to use data of stationary objects in the vicinity of a road-shape estimated curve radius R, which has been calculated in the previous cycle.

DETAILED DESCRIPTION OF THE PREFERRED EMBODIMENTS

With reference to the accompanying drawings, hereinafter are described several embodiments of a road shape recognition method and apparatus for vehicles of the present invention.

First Embodiment

Referring to FIGS. 1 to 10, a road shape recognition method and apparatus for vehicles according to a first embodiment of the present invention is described.

Figure 1:
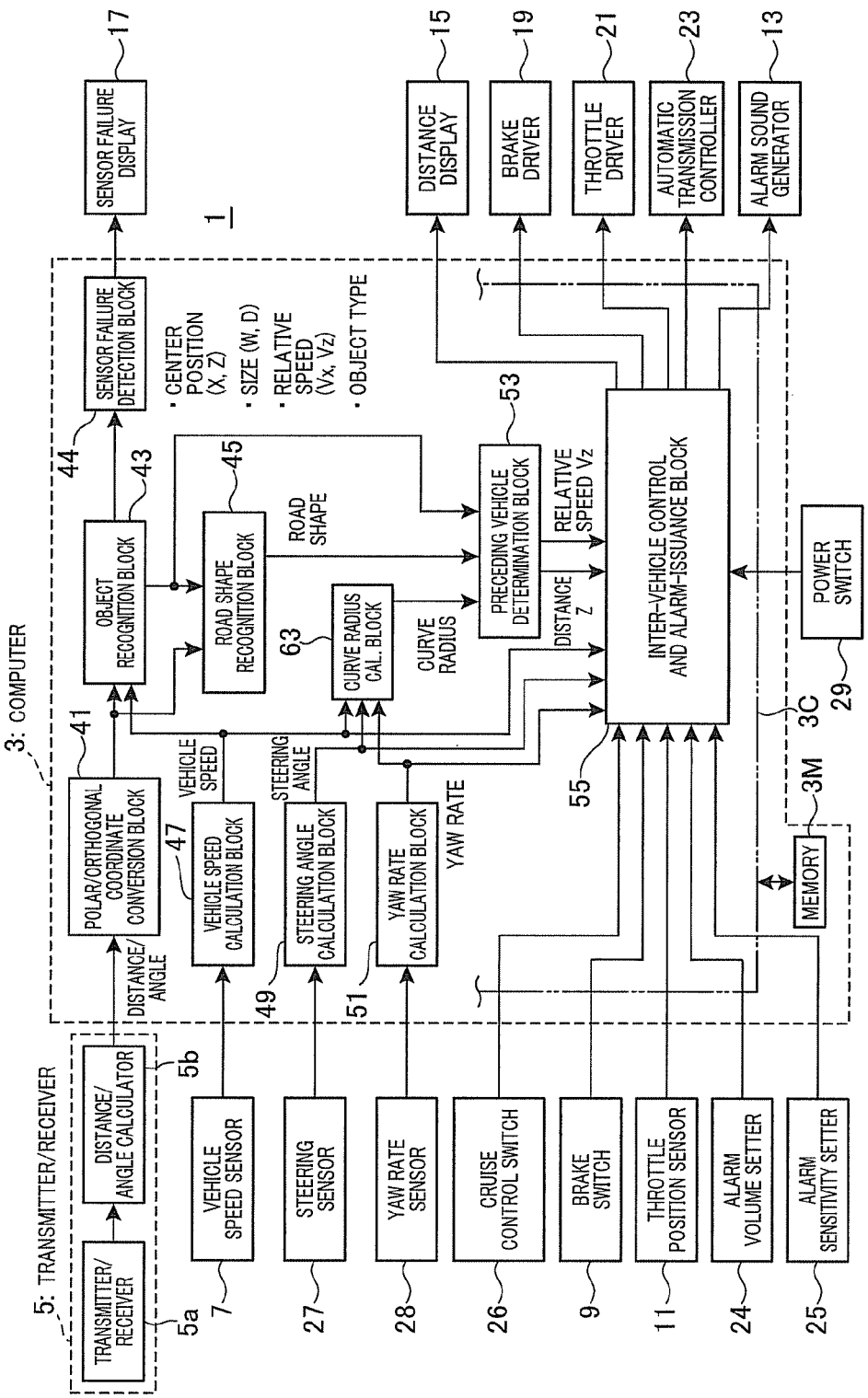
FIG. 1 is a block diagram illustrating a configuration of a vehicle control apparatus according to a first embodiment of the present invention.

FIG. 1 illustrates a configuration of a vehicle control apparatus 1 to which the road shape recognition apparatus for vehicles is applied. The control apparatus 1 is installed in a motor vehicle and raises an alarm when obstacles are present in a predetermined situation in an area that requires issuance of an alarm or controls the vehicle speed in conformity with a preceding vehicle.

FIG. 1 is a system block diagram of the apparatus 1. The vehicle control apparatus 1 is mainly composed of a computer 3. The computer 3 is mainly composed of a microcomputer and includes an input/output interface (I/O) and various drive circuits and detection circuits. Since these hardware components are generally used ones, detailed description is omitted. Thus, the computer 3 includes a CPU (central processing unit) 3C as an arithmetic unit and a memory 3M as a recording medium.

The CPU 3C reads and executes various processing programs, which will be described later, stored in the memory 3M. Thus, the computer 3 cooperates with its peripheral devices to exert various functions that are shown in the functional blocks illustrated in FIG. 1. The computer 3 is similarly configured in the subsequent embodiments and modifications described later. The memory as such a recording medium may be a magnetooptical disc, CD-ROM, hard disc, flash memory or the like. A ROM (read-only memory) or a backup RAM (random access memory) may be used as the memory.

The computer 3 receives inputs of various predetermined detection data from a distance/angle measuring device 5 serving as an obstacle detection unit for vehicle, a vehicle speed sensor 7, a brake switch 9 and a throttle position sensor 11. Further, the computer 3 outputs predetermined drive signals to an alarm sound generator 13, distance indicator 15, sensor failure indicator 17, brake driver 19, throttle driver 21 and automatic transmission controller 23.

The computer 3 includes an alarm volume setter 24 that sets the volume of alarm, alarm sensitivity setter 25, cruise control switch 26, steering sensor 27 that detects a manipulated variable of a steering wheel, not shown, and yaw rate sensor 28. The computer 3 also includes a power switch 29 and starts predetermined processes when the power switch 29 is turned on.

The distance/angle measuring device 5 includes a transmitter/receiver 5*a* and a distance/angle calculator 5*b*. The transmitter/receiver 5a discontinuously outputs a laser beam to scan the forward direction of the vehicle, centering on a predetermined optical axis (central axis), and covering a predetermined angular range in the vehicle's width direction, and detects reflected light. The distance/angle calculator 5b detects a distance r to an object ahead of the vehicle based on the time taken for capturing the reflected light. Alternative to a laser beam, a radio wave, such as a millimeter wave, or an ultrasonic wave may be used. Further, the way of scanning is not limited to the scanning with the transmitter, but may be a scanning with the receiver.

With this configuration, the computer 3 executes an alarming process for raising an alarm such as when an obstacle is present in a predetermined alarming area for a predetermined time. Such obstacles include a preceding vehicle traveling or stopping ahead of the vehicle, or objects (e.g., guardrails or poles) on a roadside. At the same time, the computer 3 outputs drive signals to the brake driver 19, the throttle driver 21 and the automatic transmission controller 23 to carry out a so-called inter-vehicle control under which the vehicle speed is controlled according to the conditions of a preceding vehicle.

Hereinafter is described an internal configuration of the computer 3 in terms of its functional control blocks. Specifically, the distance/angle calculator 5b of the distance/angle measuring device 5 outputs data concerning the distance r and a scan angle θ. The outputted data is transmitted to a coordinate conversion block 41 for conversion from a polar coordinate into an orthogonal coordinate. Thus, the coordinate conversion block 41 converts the transmitted data into an orthogonal coordinate in which the center of laser radar is an origin (0, 0), the vehicle's width direction is an X-axis and the vehicle's longitudinal direction is a Z-axis. Then, the converted data is transmitted to an object recognition block 43 and a road shape recognition block 45.

The object recognition block 43 calculates a center position (X, Z) and a size (W, D) of an object based on the measurement data converted to an orthogonal coordinate. The object recognition block 43 calculates a relative speed (Vx, Vz) of an obstacle, such as a preceding vehicle, with reference to the position of the vehicle equipped with the apparatus 1, i.e. the apparatus-equipped vehicle, based on the temporal changes of the center position (X, Z). Further, the object recognition block 43 recognizes an object type, i.e. whether an object is a stationary object or a moving object. In recognizing an object type, the object recognition block 43 uses a vehicle speed (speed of the apparatus-equipped vehicle) V outputted from a vehicle speed calculation block 47 according to a detection value of the vehicle sensor 7, and also uses the relative speed (Vx, Vz) calculated as mentioned above. Then, the object recognition block 43 selects an object that will affect the traveling of the vehicle, based on the object types each recognized as mentioned above and the center positions of the objects, and indicates the distance to the selected object on a distance display 15. The (W, D) indicating the size of an object corresponds to (width, depth). A model of an object having such data is referred to as a "target model".

Then, a sensor failure detection block 44 detects whether the data calculated in the object recognition block 43 has a value that falls in an abnormal range. If the value falls in the abnormal range, the sensor failure indicator 17 indicates accordingly. On the other hand, the road shape recognition block 45 recognizes the shape of the road based on the measurement data converted to an orthogonal coordinate and the data calculated in the object recognition block 43. The details of the recognition process of a road shape will be described later. The data obtained in the road shape recognition block 45 is outputted to a preceding vehicle determination block 53.

The computer 3 also includes a steering angle calculation block 49 that calculates a steering angle based on a signal from the steering sensor 27, and a yaw rate calculation block 51 that calculates a raw rate based on a signal from the yaw rate sensor 28. Further, in the computer 3, a curve radius (curvature radius) calculation block 63 calculates a curve radius (curvature radius) R, based on a vehicle speed from the vehicle speed calculation block 47, a steering angle from the steering angle calculation block 49 and a raw rate from the raw rate calculation block 51. The preceding vehicle determination block 53 selects a preceding vehicle and calculates a distance Z to the preceding vehicle and a relative speed Vz relative to the preceding vehicle. The selection of a preceding vehicle is based on the curve radius R, as well as the object type, the center position coordinate (X, Z), the size (W, D) of the vehicle and the relative speed (Vx, Vz) calculated in the object recognition block 43, and the road shape data obtained in the road shape recognition block 45.

The computer 3 further includes an inter-vehicle control and alarm-raising block 55 which makes an alarming determination or a cruising determination. The alarming or cruising determination is made based on the distance Z, relative speed Vz, apparatus-equipped vehicle speed Vn, preceding vehicle speed, object center position, object width, object type, setting conditions of the cruise control switch 26 and degree of braking applied to the brake switch 9, and throttle position derived from the throttle position sensor 11 and sensitivity value set by the alarm sensitivity setter 25. If an alarming determination is made, it is further determined whether or not an alarm should be raised. If a cruising determination is made, the details of vehicle speed control are determined. As a result of the determination, if an alarm is required to be raised, the block 55 outputs an alarm generation signal to the alarm sound generator 13. If a cruising determination is made, the block 55 outputs control signals to the automatic transmission controller 23, the brake driver 19 and the throttle driver 21 to perform controls as required. In performing these controls, the block 55 outputs a necessary indication signal to the distance display 15 to inform the driver of the situation.

Referring now to a flow diagram of FIG. 2, hereinafter is described an operation involved in the recognition of a road shape, which is performed by the vehicle control apparatus 1 configured as described above. At step S1000 that is an initial step in FIG. 2, distance/angle measurement data, i.e. distance/angle data, is read by the distance/angle measuring device 5. Specifically, the distance/angle measuring device 5 acquires distance/angle data corresponding to one scan. In this case, the scanning cycle is 100 msec and thus the distance/angle measuring device 5 acquires distance/angle data every 100 msec.

Then, at the subsequent step S2000, the coordinate conversion block 41 converts the distance/angle data in a polar coordinate system into that in an X-Z orthogonal coordinate system. Then, the object recognition block 43 recognizes an object based on the converted data. The details of this object recognition are as described above. An object recognized here is referred to as a target or a target model.

At step S3000, an estimated R (estimated curve radius of the curve the vehicle travels) is calculated based on a yaw rate derived from the yaw rate sensor 28 or a steering angle derived from the steering sensor 27. Here, an estimated R is calculated from the steering angle. In other words, an estimated R is calculated as follows:

$$\text{Estimated } R = \text{constant} \div \text{steering angle}$$

The "constant" here relies on the vehicle speed and the vehicle model. Values of the constant are expressed as map functions on a vehicle-speed basis for each of vehicle models and stored in the curve radius (curvature radius) calculation block 63 of the computer 3. Since such a function C is known as a function for calculating a curve radius from a steering angle θ, detailed explanation is omitted. An estimated R is calculated based on a yaw rate Ω, i.e. calculated by dividing a vehicle speed V by a yaw rate Ω.

At step S4000, a lane-probability instantaneous value is calculated for a target recognized at step S2000. The lane probability is a parameter indicating a likelihood that the target is a vehicle traveling on the same lane where the apparatus-equipped vehicle travels. A lane-probability instantaneous value is calculated based on detection data of the instant.

First, positions of all targets obtained through the object recognition process (step S2000) are converted to positions in terms of straight-rode traveling. When the center position of each target is (Xo, Zo) and the width in the X-axis direction is Wo, a straight-road conversion position (X, Z, W) is obtained through the following conversion formulas (see FIG. 3).

$$X \leftarrow Xo - Zo^2/2R \tag{1}$$

$$Z \leftarrow Zo \tag{2}$$

$$W \leftarrow Wo \tag{3}$$

R: Estimated R
Right-hand curve: Positive sign
Left-hand curve: Negative sign

The symbol ^ in Formula (1) refers to that a value preceding the symbol ^ is exponentiated by the number of times indicated by a value following the symbol ^. The symbol ^, whenever it is used in the specification, has the same meaning. Here, a circle equation is approximated assuming that:

$$|X| << |R|, Z$$

Further, when the distance/angle measuring device 5 is mounted at a position apart from the center of the vehicle, the X-coordinate is corrected so that the center of the vehicle will be an origin. In other words, only the X-coordinate is actually converted here.

Figure 4:
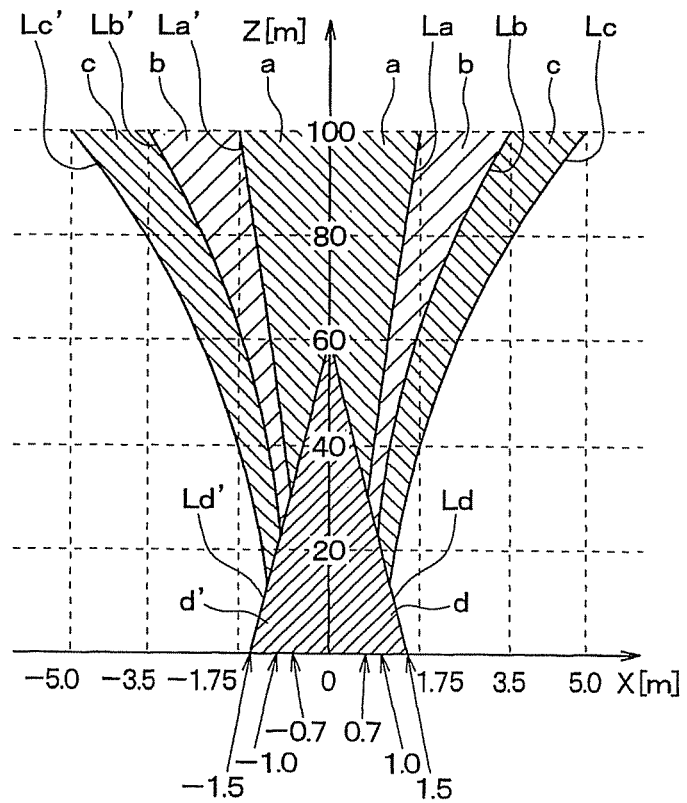
FIG. 4 is an explanatory diagram illustrating a lane probability map.

Each center position (X, Z) obtained through the conversion in terms of a straight road is arranged on a lane probability map shown in FIG. 4 to calculate an instantaneous lane probability of each object, i.e. a probability for each object to be present then in the lane the vehicle travels. There is an error between a curve radius (curvature radius) R calculated from a steering angle and an actual curve radius. In order to realize a control taking into account the error, an instantaneous lane probability of each object is calculated here as a probability of presence.

In FIG. 4, the horizontal axis is an X-axis, i.e. the left-and-right direction of the vehicle, and the vertical axis is a Z-axis, i.e. the forward direction of the vehicle. In the present embodiment, a range covering 5 m of each of the left and the right of the vehicle and 100 m ahead of the vehicle is shown in FIG. 4. The range here is divided into an area a (lane probability: 80%), an area b (lane probability: 60%), an area c (lane probability: 30%), an area d (lane probability: 100%) and other area ((lane probability: 0%). This setting is based on actual measurement data. In particular, the area d is set considering that other vehicle may cut right in front of the vehicle.

Lines La, Lb, Lc and Ld dividing between the areas a, b, c and d are obtained, for example, through the following Formulas (4) to (7). It should be appreciated that lines La', Lb', Lc' and Ld' are symmetrical to the lines La, Lb, Lc and Ld, respectively, with respect to the Y-axis.

$$La: X=0.7+(1.75-0.7)\cdot(Z/100)^2 \tag{4}$$

$$Lb: X=0.7+(3.5-0.7)\cdot(Z/100)^2 \tag{5}$$

$$Lc: X=1.0+(5.0-1.0)\cdot(Z/100)^2 \tag{6}$$

$$Ld: X=1.5\cdot(1-Z/60) \tag{7}$$

These formulas are expressed by the following general Formulas (8) to (11).

$$La: X=A1+B1\cdot(Z/C1)^2 \tag{8}$$

$$Lb: X=A2+B2\cdot(Z/C2)^2 \tag{9}$$

$$Lc: X=A3+B3\cdot(Z/C3)^2 \tag{10}$$

$$Ld: X=A4\cdot(B4-Z/C4) \tag{11}$$

In general, areas are set based on Formulas (8) to (11) so as to meet the following Formulas (12) to (14). Actually used values are determined through experiments.

$$A1 \leq A2 \leq A3 < A4 \tag{12}$$

$$B1 \leq B2 \leq B3 \text{ and } B4=1 \tag{13}$$

$$C1=C2=C3(C4 \text{ has no limitation}) \tag{14}$$

The lines La, Lb, Lc, La', Lb' and Lc' are expressed in parabolas considering the processing speed of calculation, but may better be expressed in arcs if the processing speed of calculation is tolerable. The lines Ld and Ld' as well may better be expressed in parabolas or arcs curved outward if the processing speed of calculation is tolerable.

Then, the position of each target resulting from the straight-road conversion is checked against the lane probability map shown in FIG. 4. The checking against the map is conducted based on the following points to thereby obtain an instantaneous value P0 of lane probability.

Object occupying area d even slightly→P0=100%
Object having the center in area a→P0=80%
Object having the center in area b→P0=60%
Object having the center in area c→P0=30%
Object meeting none of the above→P0=0%

At step S5000, a road shape is recognized based on target data that appears to be delineators placed on a roadside.

First, of the targets, those targets are extracted which are stationary objects in terms of an object type, and have a horizontal width W of less than 1 m. Thus, most of vehicles, signposts, advertising boards and the like are removed. Then, a point of intersection with the X-axis is estimated for each of the extracted stationary targets. In calculating such an estimated X-axis intersection for each stationary target, a circle is calculated, which passes the center of the target and has a relative speed vector as a tangent vector. Assuming that the center of the circle is on the X-axis, the circle is perpendicular to the X-axis and thus the radius R is univocally determined. In practice, the following approximate calculation is conducted.

When a circle is approximated to a parabola on the assumption of $|X|<<|R|$, Z, an equation of a circle passing the center of the target and perpendicular to the X-axis is expressed as follows.

$$X=Xo+(Z-Zo)^2/2R \tag{15}$$

Further, since the relative speed vector of the target is the tangent vector of the circle, Formula (15) is expressed as follows.

$$dX/dZ=Vx/Vz \tag{16}$$

Figure 5A:
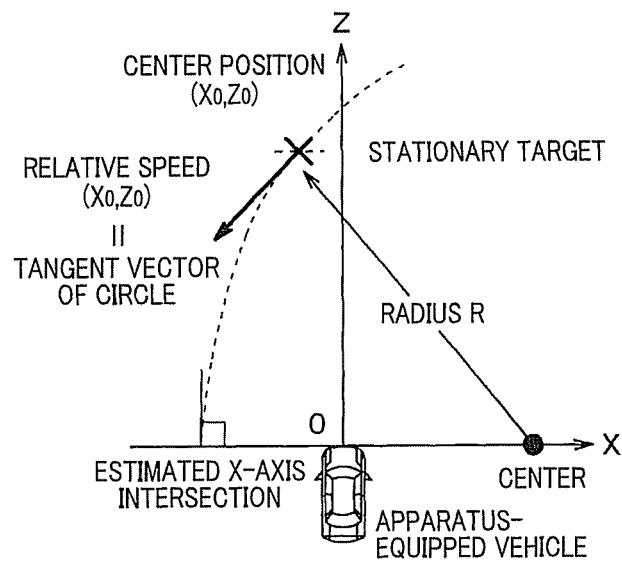
FIG. 5A is an explanatory diagram illustrating an estimated X-axis intersection.

Based on these two formulas, a radius R is expressed as follows (see FIG. 5A).

$$R=(Z-Zo)\cdot Vz/Vx$$

In this case, when Z=0, the following formula is established.

$$X=Xo-Zo\cdot Vx/2Vz$$

Thus, an estimated X-axis intersection is calculated as follows.

$$\text{Estimated X-axis intersection}=Xo-Zo\cdot Vx/2Vz$$

Estimated X-axis intersections are calculated in this way for all of the stationary targets. After that, the resultant values are divided into values of positive sign and values of negative sign and statistically processed as follows in each division. First, the estimated X-axis intersections of all of the stationary targets are simply averaged to obtain a provisional average. Then, those data which are deviated by 2 m or more from the provisional average are all removed and the remaining data are averaged again. The removed data here are not used for the road shape recognition.

The reasons why such a process is taken are as follows. If the data include advertising boards located high above, for example, without being removed, other than delineators, the shape of the road may be erroneously recognized. In this regard, the averaging process as mentioned above is able to remove data that are located significantly offset from the positions where delineators should be present. Accordingly, the shape of the road is recognized with good accuracy.

Figure 5B:
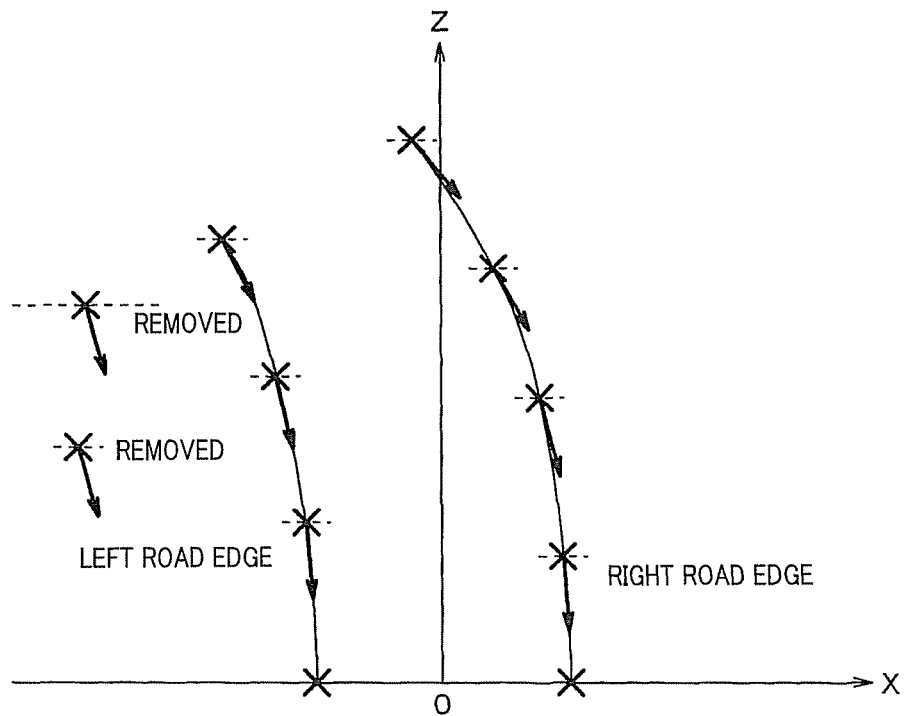
FIG. 5B is an explanatory diagram illustrating road edge recognition.

Then, as shown in FIG. 5B, the remaining stationary targets are interpolatively connected for both of the left and the right of the road for the recognition of the road edges. Further, of the targets constituting a road edge, the one nearest to the vehicle, or located at a shortest distance from the vehicle (smallest Z), is selected for each of the left and right road edges so that the estimated X-axis intersection of the selected target is used as the intersection between the road edge and the X-axis. The recognized road edges are set in a road-edge coordinate table. The road-edge coordinate table is prepared for each of the left road edge and the right road edge. An X-coordinate value of a road edge for every 5 meters is stored in each table. The distance ranges from 0 m to 150 m. Distances to the respective targets that constitute each road edge are each rounded off to a 5-meter unit and set in the corresponding table. If there is no relevant data, the table is left vacant.

As a result of the road shape recognition as described above, a road shape R different from the estimated R obtained at step S3000 is obtained.

At step S6000, it is determined whether individual targets are vehicles traveling on the lane where the apparatus-equipped vehicle travels, based on the road shape recognized at step S5000. Then, according to the determination, a "correction value of instantaneous lane probability" is calculated. First, fundamental determinations are made for each target as to whether the target is a vehicle traveling on the lane where the apparatus-equipped vehicle travels. The fundamental determinations are as follows.

[Fundamental Determination 1]

This is a determination made when a road edge is recognized farther than a target. This determination is made for each of the left and right sides of the road.

(a) Left Side of the Road

Figure 6A:
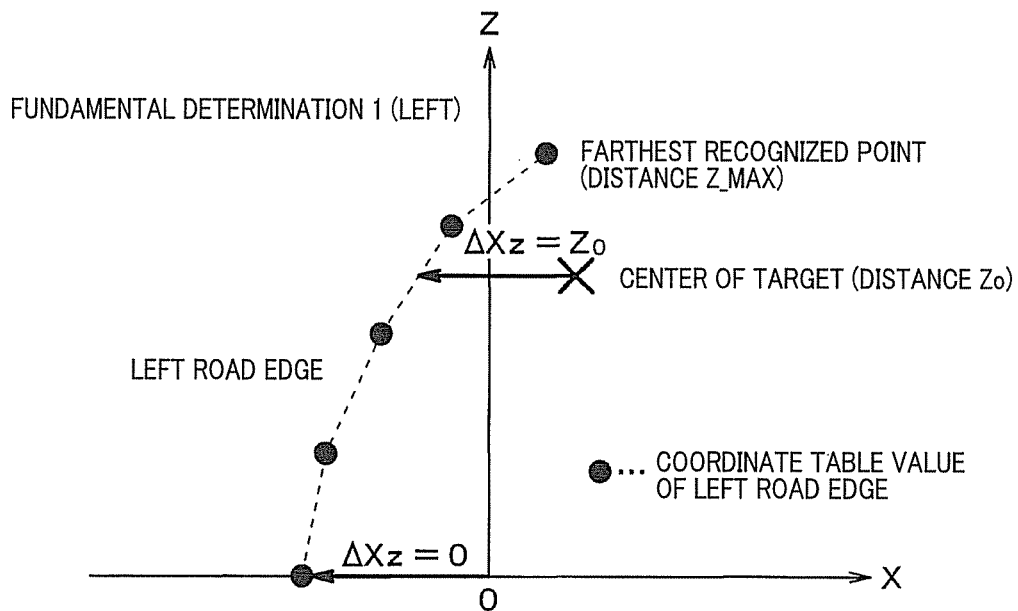
FIG. 6A is an explanatory diagram illustrating a determination process, in the case where road edges are recognized farther than a target.

In FIG. 6A:

When $Z\_MAX \geq Zo$ and $|\Delta XZ = Zo - \Delta XZ = 0| < 1.2$ m:

Fundamental Determination 1 (L) Result←1

When $Z\_MAX \geq Zo$ and $|\Delta XZ = Zo - \Delta XZ = 0| \geq 2.0$ m:

Fundamental Determination 1 (L) Result←−1
When other than the above:
Fundamental Determination 1 (L) Result←0

(b) Right Side of the Road
Similar to the left side of the road:

When $Z\_MAX \geq Zo$ and $|\Delta XZ = Zo - \Delta XZ = 0| < 1.2$ m:

Fundamental Determination 1 (R) Result←1

When $Z\_MAX \geq Zo$ and $|\Delta XZ = Zo - \Delta XZ = 0| \geq 2.0$ m:

Fundamental Determination 1 (R) Result←−1
When other than the above:
Fundamental Determination 1 (R) Result←0

When the Fundamental Determination 1 results in "1", the target is highly probably determined to be a preceding vehicle traveling on the same lane, and when results in "−1", the target is highly probably determined to be a vehicle traveling on a different lane or an object on the roadside. When the Fundamental Determination 1 results in "0", it is difficult to determine whether the target is on the same lane or on a different lane, or, otherwise, no road edge is recognized.

[Fundamental Determination 2]

This determination is made when a road edge is not recognized up to the point of a target. This determination is made for each of the left and right sides of the road.

(a) Left Side of the Road

Figure 6B:
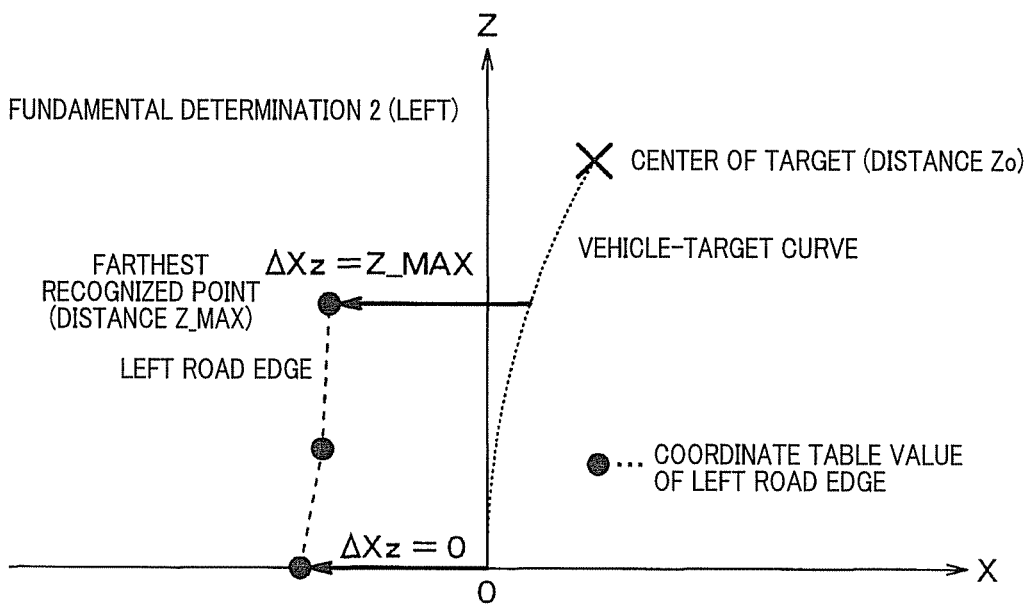
FIG. 6B is an explanatory diagram illustrating a determination process, in the case where road edges are recognized covering only a distance short of a target.

In FIG. 6B:

When $|\Delta XZ = Z\#MAX - \Delta XZ = 0| < 1.2$ m$\cdot(Z\#MAX/Zo)^2$;

or

When $|\Delta XZ = Z\#MAX - \Delta XZ = 0| < 0.3$ m:

Fundamental Determination 2 (L) Result←1

When $|\Delta XZ = Z\#MAX - \Delta XZ = 0| \geq 2.0$ m$\cdot(Z\#MAX/Zo)^2$;

and

When $|\Delta XZ = Z\#MAX - \Delta XZ = 0| \geq 0.3$ m:

Fundamental Determination 2 (L) Result←−1
When other than the above:
Fundamental Determination 2 (L) Result←0

When $Z\_MAX > Zo/2$:

Fundamental Determination 2 (L) Reliability←1 (high)

When $Z\_MAX \leq Zo/2$:

Fundamental Determination 2 (L) Reliability←−1 (low)

(b) Right side of the road
Similar to the left side of the road, the results and the reliabilities of the Fundamental Determination 2 (R) are calculated.

In FIG. 6B, a vehicle-target curve corresponds to a curve connecting a target and the origin via a segment of a circle perpendicular to the X-axis. The circle equation is approximated to a parabola using the following formula on the assumption of $|X| \ll |R|$, Z.

$$X=Z^2/R (R: \text{radius})$$

As will be understood from FIG. 6B, the determination is bases on a distance ($\Delta XZ = Z\#MAX$) between a farthest recognition point (distance $Z\_MAX$) and a point where a line extended, in parallel with the X-axis, from the farthest recognition point intersects the vehicle-target curve. Due to the approximation to a parabola, the determining values 1.2 m and 2.0 m of the Fundamental Determination 1 are multiplied by $(Z\#MAX/Zo)^2$.

When the Fundamental Determination 2 results in "1", the target is highly probably determined to be a preceding vehicle traveling on the same lane, and when results in "−1", the target is highly probably determined to be a vehicle traveling on a different lane or an object on the roadside. In the Fundamental Determination 2, the reliability of determination is expressed in two stages. When the Fundamental Determination 2 results in "0", it is difficult to determine whether the target is on the same lane or on a different lane, or, otherwise, no road edge is recognized.

[Fundamental Determination 3]

This determination is made based on a distance other than $Z=Zo$, $Z\_MAX$. This determination is made for each of the left and right sides of the road.

(a) Left Side of the Road

The following two determinations are made.

[Determination 3a]

Figure 7A:
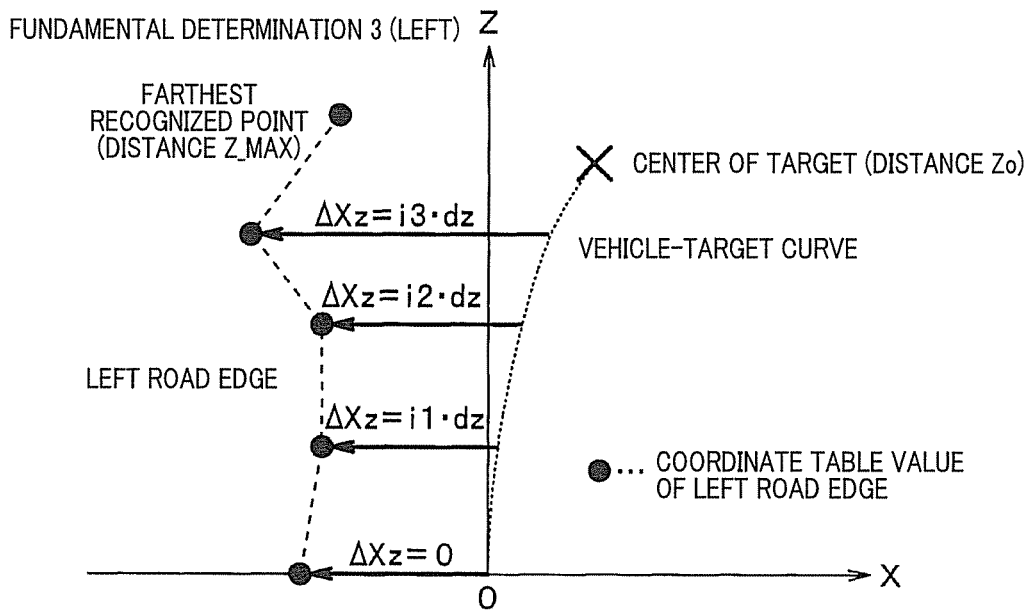
FIG. 7A is an explanatory diagram illustrating a determination process, based on a distance between each target position used for road edge recognition and a vehicle-target curve.
Figure 7B:
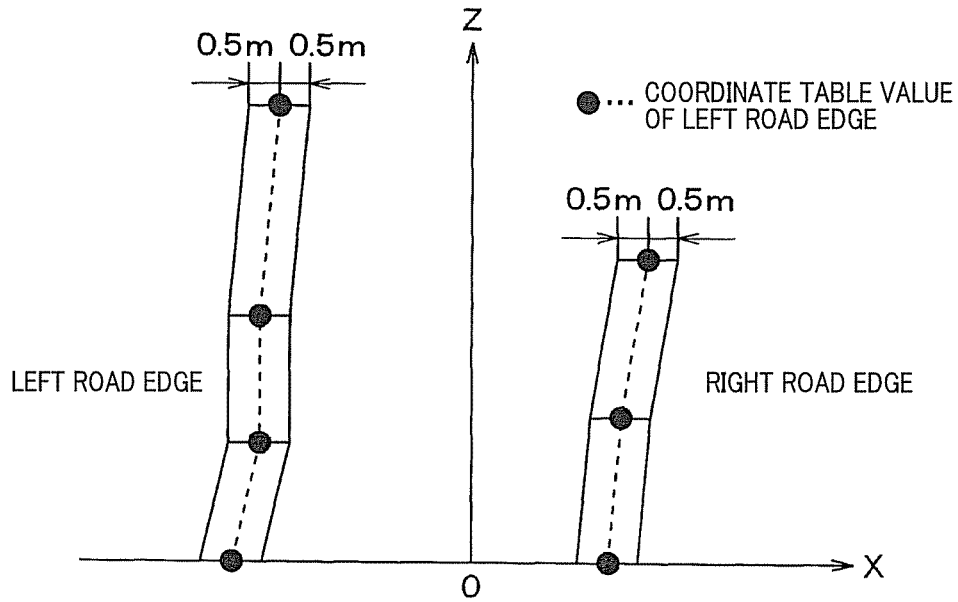
FIG. 7B is an explanatory diagram illustrating areas in the vicinities of road edges.

In FIG. 7A, all positive numbers i meeting $i \cdot dZ \leq Zo$ ($dZ=5$ m) are rendered to be $Z\_MAX \rightarrow i \cdot dZ$ and the same determination as Fundamental Determination 2 (L) Result=1 is made.

When all of i's meets the condition of Fundamental Determination 2 (L) Result=1:

Fundamental Determination 3a (L) Result←1

When there are one or more is that do not meet the condition:

Fundamental Determination 3a (L) Result←−1

When there is no i to be determined:

Fundamental Determination 3a (L) Result←0

[Determination 3b]

In FIG. 7A, all positive numbers i meeting $i \cdot dZ \leq Zo$ ($dZ=5$ m) are rendered to be $Z\_MAX \rightarrow i \cdot dZ$ and the same determination as Fundamental Determination 2 (L) Result=−1 is made.

When all of i's meet the condition of Fundamental Determination 2 (L) Result=−1:

Fundamental Determination 3b (L) Result←1

When there are one or more i's that do not meet the condition:

Fundamental Determination 3b (L) Result←−1

When there is no i to be determined:

Fundamental Determination 3b (L) Result←0

(b) The Right Side of the Road

Results of Fundamental Determination 3a (R) and Fundamental Determination 3b (R) are calculated in a manner similar to the manner of the left side of the road.

When Fundamental Determination 3a results in "1", use of road edge data of any distance will result in a determination that the target is a preceding vehicle on the same lane, and when results in "−1", the target is not necessarily determined to be a preceding vehicle on the same lane, depending on the distance. When Fundamental Determination 3a results in "0", no road edge coordinate data is present at a distance short of the target.

On the other hand, when Fundamental Determination 3b results in "1", use of road edge data of any distance will result in a determination that the target is a vehicle on a different lane or is an object on a roadside, and when results in "−1", the target is not necessarily determined to be a vehicle on a different lane or an object on a roadside. When Fundamental Determination 3b results in "0", no road edge coordinate data is present at a distance short of the target.

Based on the results of the three fundamental determinations set forth above, the following six classifications are provided. A correction value of a lane-probability instantaneous value is calculated according to the six classifications. If a plurality of conditions are met, an instantaneous value of the higher priority is used.

[First Classification]

When a road edge is recognized farther than a target and the target is determined to be a preceding vehicle on the same lane:

On the left side of the road:

When Fundamental Determination 1 (L) Result=1 and Fundamental Determination 3a (L)=1;

Correction value←40% Priority level: 5

When Fundamental Determination 1 (L) Result=1 and Fundamental Determination 3a (L)=−1;

Correction value←0% Priority level: 3

When Fundamental Determination 1 (L) Result=1 and Fundamental Determination 3a (L)=0;

Correction value←40% Priority level: 2

On the right side of the road, correction values are calculated similar to the left side of the road.

[Second Classification]

When a road edge is recognized farther than a target and the target is determined to be a vehicle on a different lane or an object on a roadside:

On the left side of the road:

When Fundamental Determination 1 (L) Result=−1 and Fundamental Determination 3a (L)=1;

Correction value←−40% Priority level: 5

When Fundamental Determination 1 (L) Result=−1 and Fundamental Determination 3a (L)=−1;

Correction value←0% Priority level: 3

When Fundamental Determination 1 (L) Result=−1 and Fundamental Determination 3a (L)=0;

Correction value←−40% Priority level: 2

On the right side of the road, correction values are calculated similar to the left side of the road.

[Third Classification]

When a road edge is not recognized up to the position of a target and the target is determined to be a preceding vehicle on the same lane:

On the left side of the road:

When Fundamental Determination 2 (L) Result=1 and Fundamental Determination 3a (L)=1;

Correction value←40% Priority level: 1

When Fundamental Determination 2 (L) Result=1 and Fundamental Determination 3a (L)=−1;

Correction value←0% Priority level: 1

When Fundamental Determination 2 (L) Result=1 and Fundamental Determination 3a (L)=0 and Fundamental Determination 2 (L) Reliability=1;

Correction value←40% Priority level: 1

When Fundamental Determination 2 (L) Result=1 and Fundamental Determination 3a (L)=0 and Fundamental Determination 2 (L) Reliability=−1;

Correction value 20% Priority level: 1

On the right side of the road, correction values are calculated similar to the left side of the road.

[Fourth Classification]

When a road edge is not recognized up to the position of a target and the target is determined to be a vehicle on a different lane or an object on a roadside:

On the left side of the road:
When Fundamental Determination 2 (L) Result=−1 and Fundamental Determination 3a (L)=1;
  Correction value←−40% Priority level: 1
When Fundamental Determination 2 (L) Result=−1 and Fundamental Determination 3a (L)=−1;
  Correction value←−0% Priority level: 1
When Fundamental Determination 2 (L) Result=−1 and Fundamental Determination 3a (L)=0 and Fundamental Determination 2 (L) Reliability=1;
  Correction value←−40% Priority level: 1
When Fundamental Determination 2 (L) Result=−1 and Fundamental Determination 3a (L)=0 and Fundamental Determination 2 (L) Reliability=−1;
  Correction value←−20% Priority level: 1
On the right side of the road, correction values are calculated similar to the left side of the road.

[Fifth Classification]

When none of the above conditions is met because, for example, a road edge of neither the left nor the right side of the road is recognized:
  Correction value←0% Priority level: 0

[Sixth Classification]

When a target is determined to be an object on a roadside:
The target is determined to be an object on a roadside, on condition that the center of the target falls in areas shown in FIG. 7B, i.e. areas each ranging 0.5 m to the left and right from a recognized road edge (left road edge or right road edge). In this case, the following correction value and priority level are set.
  Correction value←−70% Priority level: 6

As explained above, a correction value (Ph) of an instantaneous value is calculated in conformity with the recognized road shape. The results of the calculation are summarized as follows.

When a road shape of only a short distance is recognized, a smaller correction value is calculated (compared to the case where the road shape is recognized ranging a farther distance) (refer to the correction values involving the results of Fundamental Determination 2). If a road shape of only a short distance is recognized, a determination is made assuming a circle (arc) connecting the object and the position of the vehicle. Accordingly, considering that such assumed elements are present, a correction value may preferably be relatively small.

When a target is determined to be an object on a roadside, a larger correction value is calculated (refer to the sixth classification). Being determined to be an object on a roadside, the target is highly probably present outside the lane where the vehicle travels. Therefore, the correction value is rendered to be a large negative number of −70%. Thus, in the event the lane-probability instantaneous value is large, correction of the instantaneous value can lower the probability, thereby preventing erroneous selection. For example, such processing is effective in particular when "the vehicle travels on a straight road and the road lying ahead of the vehicle is beginning to curve".

Priority level is used as follows. In the present embodiment, a determination may be made with reference to either the left or the right road edge. However, the degree of recognition is different between the left and right road edges. Accordingly, the probability of an object's being on the same lane may be different between the case where the left road edge is used as a reference and the case where the right road edge is used as a reference. In such a case, a correction value is calculated based on the determination results showing a higher priority level. According to the examples set forth above, the priority levels are 5, 3 and 2 in the first and second classifications where the shape of the road is recognized farther than the object. However, in the third and fourth classifications where the road shape in only a distance short of the object is recognized, the priority level is 1. Thus, the results of determination based on the first and second classifications show a higher priority.

The classifications set forth above are based on the combination of the results of Fundamental Determination 3 with Fundamental Determination 1 or 2. In this way, the priority level is determined comprehensively considering the entire road shape and the positions of the objects used in recognizing the road shape.

At step S6100, it is determined whether or not there is a large difference between the estimated R calculated at step S3000 and the road shape R recognized at step S5000. The reason why this determination is made is that, if the difference between the estimated R and the road shape R is large and the instantaneous value is corrected accordingly, the accuracy of the instantaneous value may be degraded.

Figure 8A:
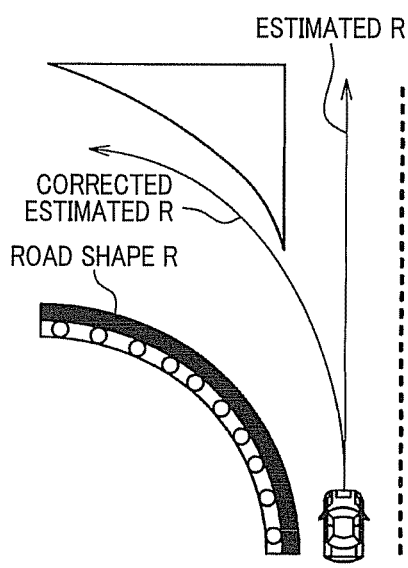
FIG. 8A is a diagram illustrating a junction area, such as an exit, of an interchange of an expressway.
Figure 8B:
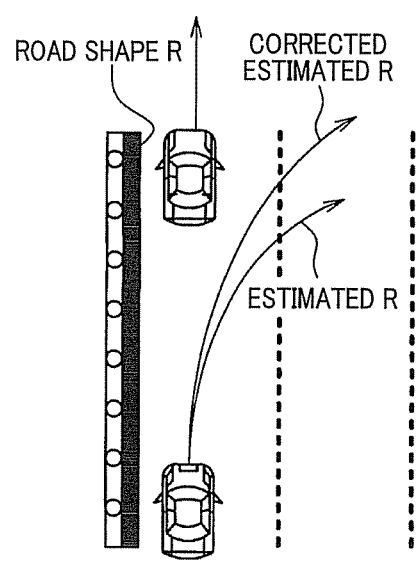
FIG. 8B is a diagram illustrating lane change.

For example, the estimated R may be significantly different from the road shape R in a junction area, such as an interchange exit, of an expressway as shown in FIG. 8A or at the time of changing lane as shown in FIG. 8B. In such a situation, application of a correction value Ph to a lane-probability instantaneous value may degrade the instantaneous lane probability. Thus, a road shape as shown by the corrected estimated R in FIG. 8B may be unavoidably recognized. In this case, a guard process is added. In the guard process, lane probability is not corrected if the estimated R is significantly different from the road shape R. In other words, the guard process is performed when it is determined that "there is a large difference".

A determination on "whether there is a large difference" is specifically made as follows. FIG. 9 shows segment information this time and the conditions in a table prepared in advance. Segment information includes the vehicle speed, estimated R and road shape R. The numerical values shown in FIG. 9 are only examples and thus, as a matter of course, different numerical values may be set.

1) When conditions a and o are met, determinations are made in priority order of i)→iv).
  i) Correction value based on road shape recognition is rendered to be Ph=0% when conditions h and d2 and (condition (1) or (2) or (3)) are met, where condition (1) is (conditions b and g) or (conditions c and f); condition (2) is (conditions d and j and k) or (conditions e and i and l); and condition (3) is condition m or n
  ii) The following A→B are applied when conditions t and d2 and b2 are met.
    A: When condition v and {condition x or u or q} are met, a correction value based on road shape recognition is rendered to be Ph=0%.
    B: When condition v and {condition x or u or q} are not met, a correction value Ph calculated in the road shape recognition is used.
  iii) When conditions s and w and a2 and {condition p or r or v or c2} are met, a correction value based on road shape recognition is rendered to be Ph=0%.
  iv) A correction value Ph calculated at step S6000 is used.
2) When the conditions of the item 1) are not met, a correction value Ph calculated at step S6000 is used.

In the above item 1), i) to iii) correspond to the case where "there is a large difference". In this case, control proceeds to step S7000. Specifically, since the correction value Ph=0%, the lane-probability instantaneous value is not corrected at the subsequent step S6200.

On the other hand, the items 1) iv) and 2) correspond to the case where "there is no large difference". In this case, control proceeds to step S6200.

In the situation as shown in FIG. 8A or 8B, conditions a, b and c, for example, shown in FIG. 9 are as follows:
a) 7000≤|Estimated R| and |Road shape R|<700
b) |Estimated R|<1000 and 7000≤|Road shape R|
c) |(1/Estimated R×1000)−(1/Road shape R×1000)|>1.5
When any one of these conditions a), b) and c) is met, "there is a large difference".

Referring again to FIG. 2, at step S6200, the correction value Ph calculated at step S6000 is added to the instantaneous value calculated at step S4000, for each target, based on the determination that "there is no large difference" made at step S6100. In this case, a limitation process is conducted with upper and lower limits of 100% and 0%.

At step S7000, a lane probability is calculated. In calculating the lane probability, if it is determined, at step S6100, that "there is no large difference", the lane-probability instantaneous value corrected at step S6200 is used. On the other hand, if it is determined, at step S6100, that "there is a large difference", the instantaneous value (not corrected) of lane probability calculated at step S4000 is used. In other words, this means that a correction Ph of 0% is added to the lane-probability instantaneous value calculated at step S4000.

Figure 10:
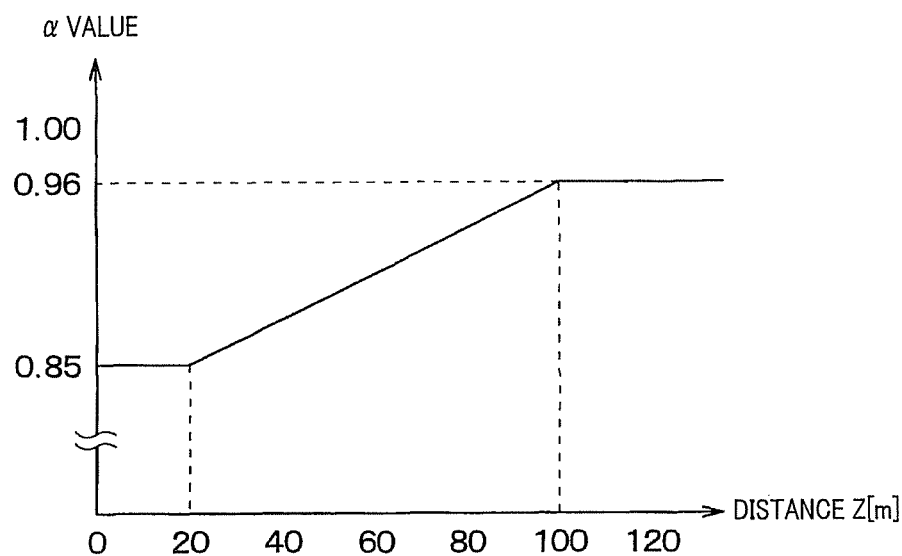
FIG. 10 is an explanatory diagram illustrating a map of parameter a for calculating lane probability.
Figure 11:
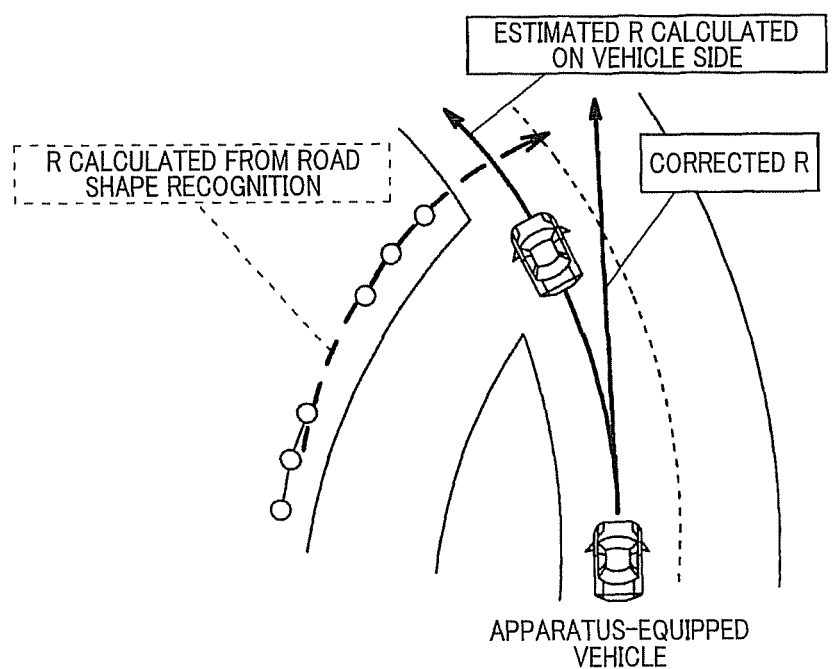
FIG. 11 is a diagram illustrating problems of conventional art.

Specifically, a filtering process is described referring to the following formula:

Lane probability←previous lane probability×α+lane-probability instantaneous value×(1−α)

where α is a parameter depending on the distance Z and calculated using the map shown in FIG. 10. An initial value of lane probability is 0%.

At the subsequent step S8000, a preceding vehicle is determined. Of the targets having a lane probability of 50% or more calculated at step S7000, the target having a minimum distance Z is determined to be a preceding vehicle. According to the distance to the target determined to be a preceding vehicle and the relative speed of the target, the apparatus 1 controls the vehicle such that the distance to the preceding vehicle is kept to be constant or raises an alarm in the event the vehicle has a risk of colliding against the preceding vehicle.

After that, when road shape recognition is again performed at step S5000, the road shape R is low-pass filtered based on the lane probability calculated at step S7000 to correct the estimated R of the vehicle using the filtered road shape. Thus, the road shape is more accurately recognized.

As described above, a lane-probability instantaneous value (step S4000) is used for calculating a lane probability (step S7000). If there is a large difference between the estimated R (step S3000) calculated in the vehicle and the road shape R (step S5000) calculated based on road shape recognition, the lane-probability instantaneous value (step S4000) is not corrected.

Thus, in a situation where an estimated R is considerably different from a road shape R as shown in FIGS. 8A and 8B, for example, a lane probability suitable for the situation is obtained. In other words, a trouble that would be caused by the correction of a lane-probability instantaneous value is avoided, thereby enabling more correct road shape recognition. Further, the accuracy of selecting a preceding vehicle is enhanced. Accordingly, in a situation where an estimated R would be considerably different from a road shape R, a correct road shape is calculated with high probability.

As a matter of course, if the estimated R (step S3000) calculated in the vehicle is not greatly different from the road shape R (step S5000) calculated based on road shape recognition, the lane-probability instantaneous value (step S4000) is corrected (step S6200). In this case as well, the road shape is correctly recognized to thereby enhance the accuracy of selecting a preceding vehicle. In this case, a correction value and a priority level are changed in accordance with the degree of recognition of the road shape. Therefore, the R is more appropriately corrected. As a result, a preceding vehicle is selected with higher accuracy.

In the present embodiment, at least one set out of a set of the steering sensor 27 and steering angle calculation block 49 and a set of the yaw rate sensor 38 and the yaw rate calculation block 51 corresponds to the turn detecting means, while the curve radius calculation block 63 corresponds to the curve radius calculating means. Further, the distance/angle measuring device 5 corresponds to the radar means. The polar/orthogonal coordinate conversion block 41 and the object recognition block 43 correspond to the object recognizing means. The preceding vehicle determination block 53 corresponds to the lane probability calculating means, the preceding vehicle selecting means, the same-lane determining means and the correction value calculating means. The road shape recognition block 45 corresponds to the road shape recognizing means.

[Modifications]

The embodiment described above is only an example. The present invention is not limited to the embodiment described above but may have a different configuration. For example, according to the above embodiment, the apparatus is configured based on the selection of a preceding vehicle. Alternative to this, the apparatus may be configured simply based on road shape recognition. Alternatively, the configuration may be modified as set forth in the following items (1) to (3).

(1) In the above embodiment, a determination is made with reference to each of the left and right road edges. If the results of the determination are different between the left and right road edges, the one having a higher priority level is used. Alternative to this, a determination may be made with reference to either one of the left and right road edges. However, the road edges are not always steadily recognized. Therefore, as in the above embodiment, both of the left and right road edges may better be directly recognized.

(2) In the above embodiment, specific numerical values are introduced for use as a correction value or a priority level. However, the numerical values are only examples and thus may be changed as appropriate.

Second Embodiment

Referring now to FIGS. 12 to 17, hereinafter is described a road shape recognition method and apparatus for vehicles according to a second embodiment of the present invention.

It should be appreciated that, in the second and the subsequent embodiments, the components identical with or similar to those in the already described embodiment are given the same reference numerals for the sake of omitting or simplifying explanation. However, in describing a process of recognizing a road shape, excessive omission of overlapped explanation may make the understanding of the context difficult. In such a case, therefore, an overlapped explanation may be given.

Figure 12:
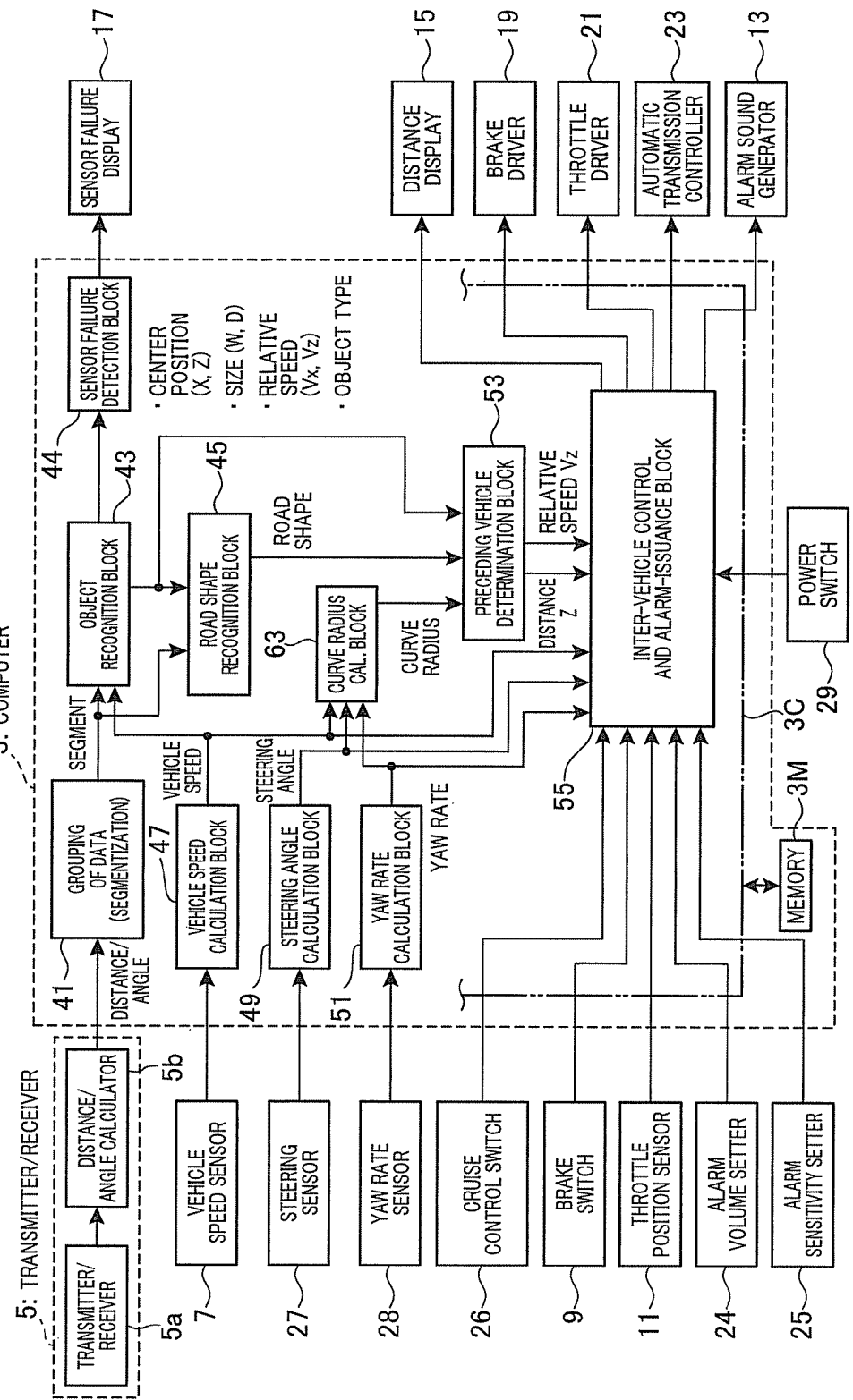
FIG. 12 is a block diagram illustrating a configuration of a vehicle control apparatus according to a second embodiment of the present invention.

FIG. 12 is a diagram illustrating a configuration of a vehicle control apparatus 1 to which the road shape recognition apparatus for vehicles of the present invention is applied. The vehicle control apparatus 1 is described focusing on the differences from the first embodiment.

In the computer 3, the data of a distance r and a scan angle θ outputted from the distance/angle calculation section 5b of the distance/angle measuring device 5 is transmitted to the data grouping block 41. The block 41 converts the data of the distance r and the scan angle θ into an X-Z orthogonal coordinate having the center of laser radar as the origin (0, 0), the vehicle's width direction as the X-axis and the vehicle's longitudinal direction as the Z-axis. The converted data are grouped to form a segment. The process of segmentization will be described later. Object-unit data segmentized in the data grouping block 41 is outputted to the object recognition block 43 and the road shape recognition block 45.

In the object recognition block 43, a speed (Vx, Vz) of an obstacle, such as a preceding vehicle, relative to the position of the apparatus-equipped vehicle is calculated based on temporal changes of the center position of the object, which have been outputted from the data grouping block 41. Further, the object recognition block 43 calculates an object type, i.e. whether the object is a stationary object or a moving object, based on the vehicle speed V, which is outputted from the vehicle speed calculation block 47 in accordance with the detection value derived from the vehicle speed sensor 7, and based on the relative speed (Vx, Vz) as calculated above. Based on the object type and the center position of the object, the object recognition block 43 selects an object that would affect the traveling of the vehicle and shows the distance to the object via the distance display 15. Reference (W, D) indicating the size of an object represents (width, depth) of the object.

The components composing the hardware configuration are identical with or similar to those shown in FIG. 1.

Referring to a flow diagram shown in FIG. 13, hereinafter is described an operation of the vehicle control apparatus 1 configured as described above, in recognizing a road shape. At an initial step S1000 of FIG. 13, distance/angle measurement data, i.e. distance/angle data, are read by the distance/angle measuring device 5. At this step, distance/angle data corresponding to one scan is acquired. The scanning cycle is 100 msec, i.e. distance/angle data is acquired every 100 msec.

At the subsequent step S2000, data (object-unit data) is segmentized. In the segmentization, which is performed by the data grouping block 41, the distance/angle data is converted from a polar coordinate system into an X-Z orthogonal coordinate system as mentioned above, and the converted data is grouped to form a segment.

Figure 14A:
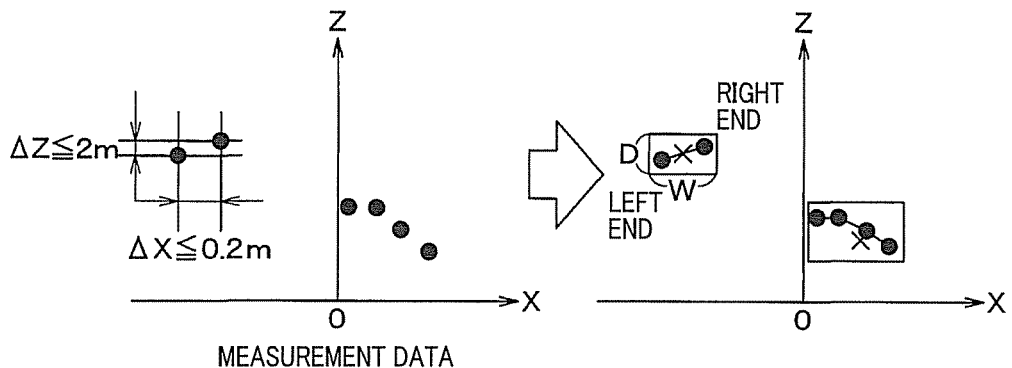
FIG. 14A is an explanatory diagram illustrating how to segmentize measurement data.
Figure 14B:
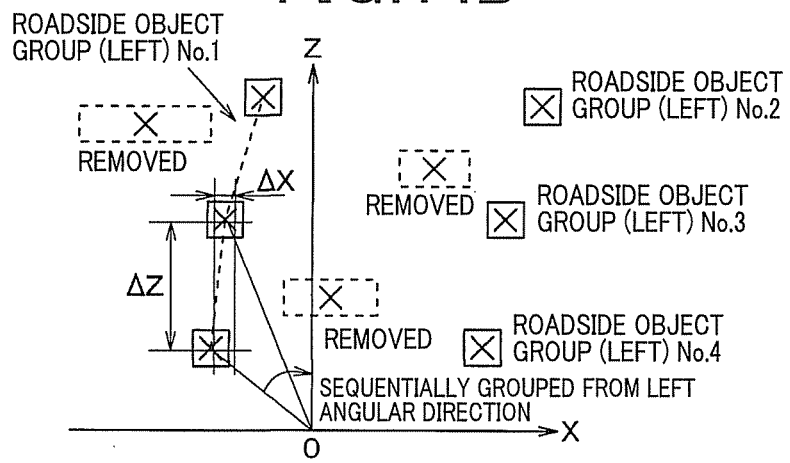
FIG. 14B is an explanatory diagram illustrating grouping segment data.

The segmentization is shown in FIG. 14A. In the present embodiment, a collection of data recognized in the form of dots is integrated to provide a segment data. The segment data is calculated when the following two conditions are met: a distance ΔX between dots, as recognized data, in the X-axis direction is equal to or less than 0.2 m; and a distance ΔZ between dots in the Z-axis direction is 2 m or less. The segment data is ensured to have a size sufficient for including the integrated collection of dots. The segment data corresponds to a rectangular area having two sides parallel to the X-axis and two sides parallel to the Z-axis. Thus, the segment data includes center coordinates (X, Z) and two-side data (W, D) indicating the size. The left and right ends of the rectangular area are also included as coordinate data.

At step S3000, object recognition is performed. The object recognition is executed by the object recognition block 43. The details are as described above.

At step S3100, data (segment data) of a stationary object obtained at step S3000 of the previous cycle is read to perform a data addition process in which the read data is added to the data of the present cycle. The previous cycle here refers to a cycle immediately before the present cycle, the cycle as shown in the flow diagram of FIG. 13 being repeated at a predetermined cycle.

For example, assuming that the numbers of stationary objects obtained in the present and previous cycles are 38 and 42, respectively, the number of stationary objects obtained at the present step equals to a sum of both, i.e. 80. Thus at the present step, a past value is added to the present value.

Accordingly, at step S4000 and at the subsequent steps, both of data obtained at the previous and the present cycles are dealt with. Specifically, at step S4000 and at the subsequent steps, data (segment data) of stationary objects corresponding to two scans is dealt with, and thus the number of data to be used is increased. In this way, the appearance frequency of stationary objects is increased.

Figure 13:
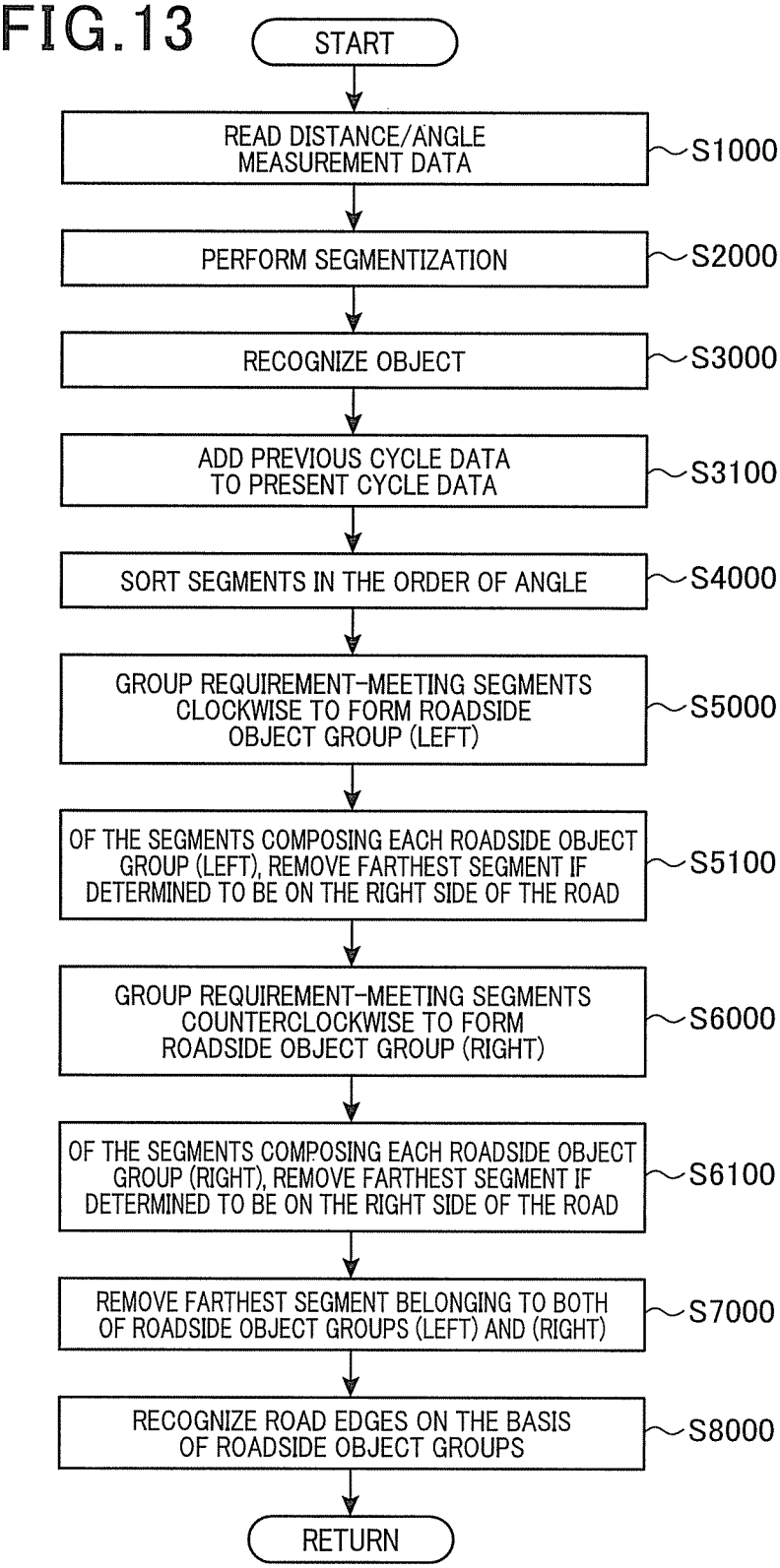
FIG. 13 is an explanatory diagram illustrating the outline of a road shape recognition process.

In the initial cycle of the flow diagram shown in FIG. 13, no previous cycle is available. Accordingly, in this case, no previous data is obtained at the step of reading the previous data, and thus "0" is added to the data obtained in the present cycle. The data obtained at step S3000 in the initial cycle is used as data of the previous cycle in the subsequent cycle.

Step S4000 and the subsequent steps are performed by the road shape recognition block 45. At step S4000, the center positions of individual segments obtained at step S2000 are converted into a polar coordinate system and sorted in the order of angle.

At step S5000, the segments that meet a connection requirement are grouped clockwise to thereby form a roadside object group (left). This is specifically explained also referring to FIG. 14B. In the present embodiment, the road shape is recognized based on delineators located on a roadside. Accordingly, segments, such as of unnecessary advertising boards or vehicles, other than those of the delineators are removed first. To this end, those segments which meet either one of the following removal requirements are removed, being regarded as segments such as of unnecessary advertising boards or vehicles.

Segments having a large horizontal width W:
Removal requirements:
    Horizontal width≥1.2 m; and horizontal to vertical ratio D/W<5
Segments in the vicinity of a moving object in terms of an object type:
Removal requirements:
    Distance between center positions is ΔX≤2 m; and ΔZ≤2 m
Then, the segments remained after removing the segments meeting the removal requirements are processed clockwise. Specifically, of the remaining segments, those which have a distance Z of monotonic increase and meet the following connection requirement are processed clockwise while such segments are present. In the processing, the segments are sequentially connected for grouping to thereby form a roadside object group (left).
Connection requirement:
    Distance between center positions is ΔX≤3.5 m; and ΔZ≤55 m
Then, when the distance is decreased, or does not meet the above connection requirement although it is monotonically increased, a new different roadside object group (left) is formed. Although a single segment can compose a roadside object group (left), only those roadside object groups (left) each composed of three or more segments are used here in recognizing a road edge. In the situation shown in FIG. 14B, as a result of removing the segments meeting the removal requirements and grouping the remaining segments, roadside object group (left) Nos. 1 to 4 are obtained. However, the roadside object group (left) No. 1, which is the only roadside object group having three or more segments, is used for road edge recognition.

The roadside object group (left) No. 1 selected in this way includes the data of the previous cycle, which have been added in the data addition process of step S3100 described above. In other words, the roadside object group (left) No. 1 is introduced based on the increased data. Accordingly, the accuracy of the roadside object group (left) No. 1 is enhanced.

Figure 15:
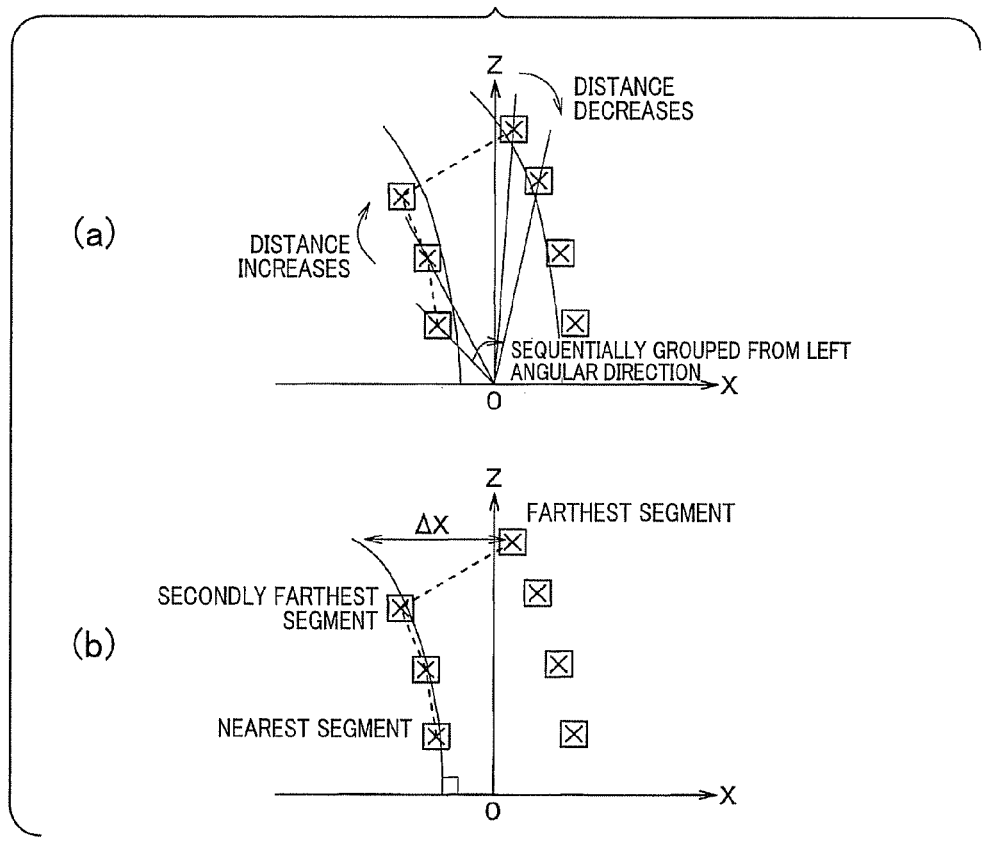
FIG. 15 is an explanatory diagram illustrating how to cope with a farthest segment in a roadside object group (left)

At the subsequent step S5100, a segment having a largest distance Z, i.e. a farthest segment, among the segments composing the roadside object group (left) (i.e. the roadside object group No. 1 in this case as a matter of course) is determined as to whether it is on the left side or on the right side of the road. The details of the determination will be described later. The farthest segment, when determined to be on the right side of the road, is removed from the roadside object group (left). FIG. 15 shows by (a) an example in which a roadside object group (left) is composed of three or more segments and a segment on the right side of the road is mingled. As will be seen from the figure, when segments are grouped clockwise with monotonic increase of the distance Z, there will be no problem if only a farthest segment is determined as to whether it is really located on the left side of the road or not. This is because hardly a situation is envisaged, in which a segment right before the farthest segment (hereinafter referred to as secondly farthest segment) is also on the right side of the road.

A farthest segment is determined as follows. As shown in FIG. 15 by (b), the segments except for the farthest segment are connected via a smoothly curved line. Then, it is determined whether or not the farthest segment is located in the vicinity of the curved line. The curved line is a part of a circle that passes through two points, i.e. a nearest segment having a smallest distance Z and the secondly farthest segment, and is perpendicular to the X-axis. Since the circle should be perpendicular to the X-axis, its center should be on the X-axis. Thus, an equation of the circle is introduced from the center of the circle and the two points on the circumference.

When the distance $\Delta X$ in the X-axis direction between the circle and the farthest segment is less than 1.5 m, the farthest segment is determined to be on the left side of the road and remains being included in the roadside object group (left). When the distance $\Delta X$ is 1.5 m or more, the farthest segment is determined to be on the right side of the road and removed from the roadside object group (left). The location of the farthest segment may be determined based on the nearest distance between the farthest segment and the circle, i.e. the length of a normal line extended from the farthest segment to the circle. In practice, however, no particular problem is raised if the farthest segment is determined only based on the distance $\Delta X$ in the X-axis direction.

At the subsequent steps S6000 and S6100, the processings at steps S5000 and S5100 are performed, reversing left and right. Specifically, at step S6000, the segments that meet the connection requirement are grouped counterclockwise based on the angles obtained at step S4000 to thereby form a roadside object group (right). The processing of removing unnecessary advertising boards or the like is the same as the one performed on the left. The segments remained after the removal, which have a distance Z of monotonic increase and meet the connection requirement, are processed counterclockwise. In the processing, the segments are sequentially connected for grouping to thereby form a roadside object group (right). The connection requirement is also the same as the one on the left. Further, similar to the processing on the left, only the roadside object groups (right) each composed of three or more segments are used for recognizing the road edge.

Figure 16:
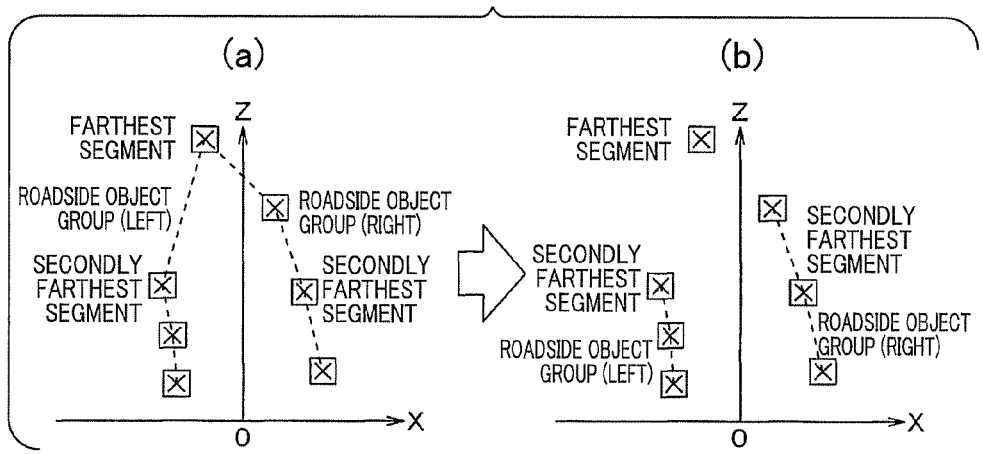
FIG. 16 is an explanatory diagram illustrating how to cope with farthest segments overlapped between a roadside object group (left) and a roadside object group (right)

At step S6100, the processing similar to the one on the left is applied to the farthest segment in a roadside object group (right). Specifically, the farthest segment is determined as to whether it is on the left or on the right of the road. Being determined to be on the left, the farthest segment is removed from the roadside object group (right). After obtaining roadside object groups (left) and roadside object groups (right) in this way, control proceeds to step S7000. It should be noted that the farthest segment in a roadside object group (left) can be the farthest segment in the roadside object group (right). In other words, as shown in FIG. 16 by (a), a single farthest segment can belong to both of the roadside object group (left) and the roadside object group (right), creating a conflicted situation. In such a case, the farthest segment is removed as shown in FIG. 16 by (b). Otherwise, such a processing is not conducted.

Figure 17:
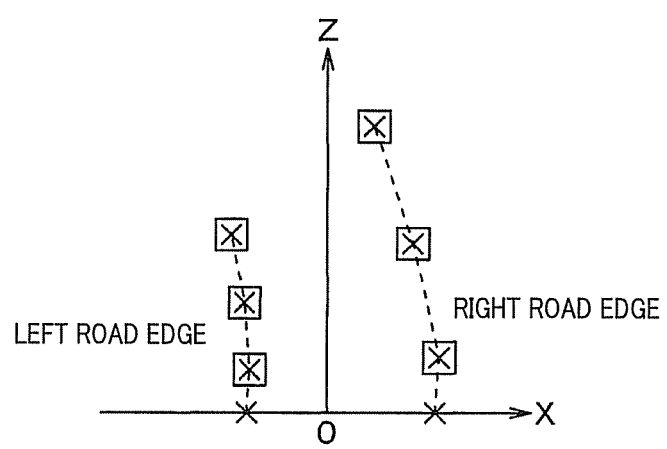
FIG. 17 is an explanatory diagram illustrating how to recognize a road edge as a collection of line segments.

At step S8000, the left and right side road edges are recognized based on the roadside object groups (left) and the roadside object groups (right) each composed of three or more segments. In the present embodiment, as shown in FIG. 17, the segments composing each roadside object group are interpolated for recognition of the left or right road edge as a collection of line segments. Further, using the results of interpolation between roadside object group data, an intersection with the X-axis is calculated, followed by interpolation as well up to the intersection. Thus, starting from the vicinity of the vehicle position, the shape of the road is ensured to be recognized as a collection of line segments.

As described above, according to the vehicle control apparatus 1 of the present embodiment, the data (segment data) of stationary objects, which have been obtained in the previous cycle, is added to the data (segment data) of stationary objects, which have been obtained in the present cycle, in performing the road shape recognition process. Thus, in the road shape recognition process, roadside object groups are formed, with usable data being increased. Accordingly, a situation where lots of roadside objects are present is created, under the conditions where it is difficult to detect roadside objects, such as stationary objects, due to the presence of a preceding vehicle or where the number of roadside objects usable for road shape recognition is small, such as when the number of roadside objects of the road where the vehicle travels is originally small. In other words, the amount of data that can be used for forming roadside object groups is increased. Accordingly, the accuracy of recognizing road edges is enhanced. Further, the shape of the road is calculated more correctly and with good frequency.

The shape of the road recognized in this way is used for determining a preceding vehicle and thus used for controlling the inter-vehicle distance and raising an alarm in the control of inter-vehicle distance. Thus, an inter-vehicle distance is favorably controlled and an alarm is favorably raised.

In the present embodiment, the distance/angle measuring device 5 corresponds to the radar means. The data grouping block 41, the object recognition block 43 and the road shape recognition block 45 of the computer 3 correspond to the recognizing means. Of the blocks 41, 43 and 45, the data grouping block 41 and the object recognition block 43 correspond to the object recognizing means, and the road shape recognition block 45 corresponds to the effective data extracting means, the data adding means, the roadside object group forming means and the road edge recognizing means.

Further, the processings performed by the data grouping block 41, the object recognition block 43 and the road shape recognition block 45 correspond to the recognition process. The processings performed by the data grouping block 41 and the object recognition block 43 correspond to the acquisition process, and the processing performed by the road shape recognition block 45 corresponds to the extraction process and the data addition process.

Third Embodiment

Referring to FIGS. 12, 18, 14, 19 and 15 to 17, hereinafter is described a road shape recognition method and apparatus for vehicles according to a third embodiment of the present invention.

The vehicle control apparatus 1 to which the road shape recognition apparatus for vehicles according to the present embodiment is applied includes hardware components similar to those shown in FIG. 12.

Description of the vehicle control apparatus 1 according to the present embodiment is focused on the differences from the second embodiment.

Figure 18:
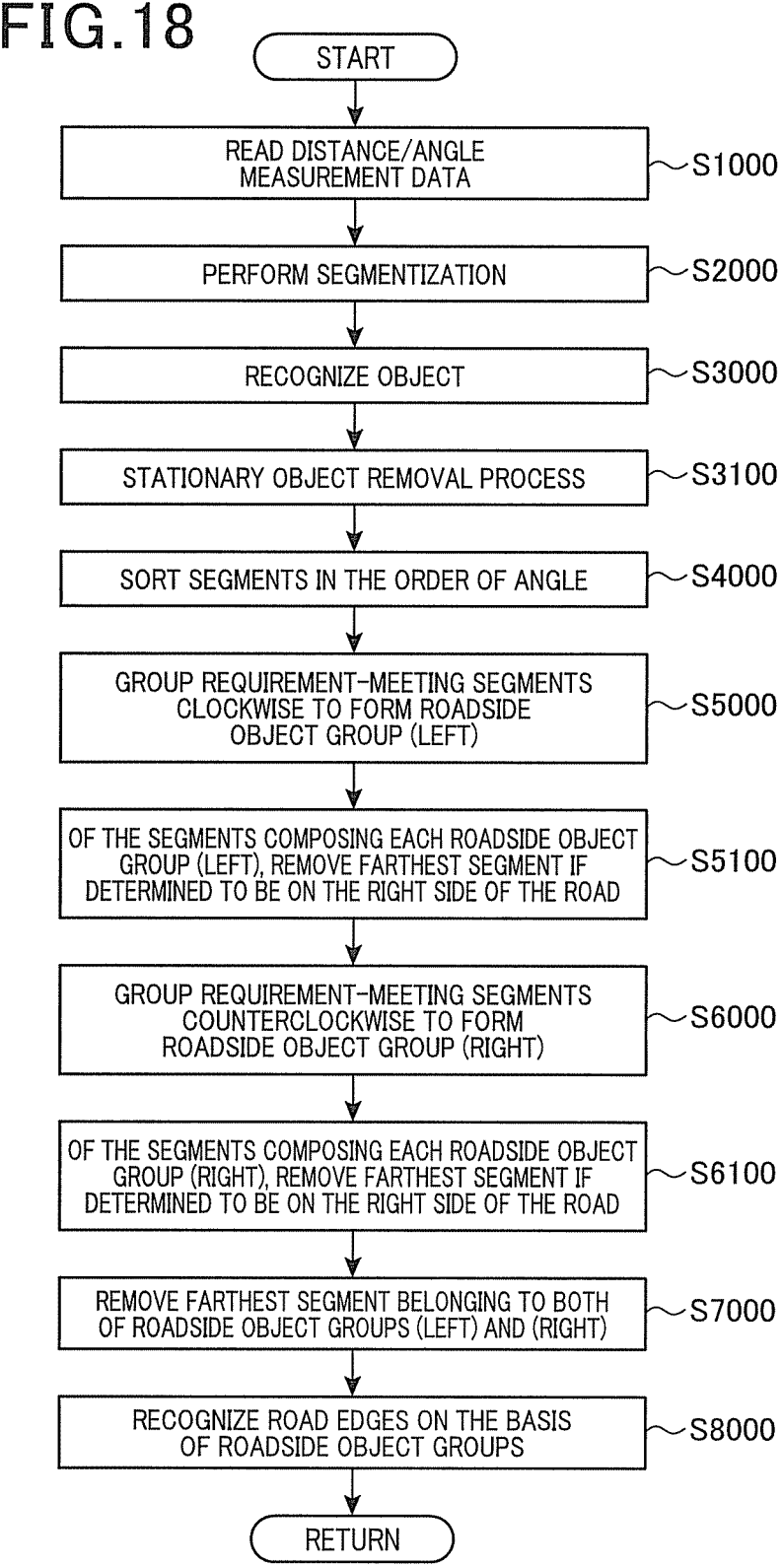
FIG. 18 is an explanatory diagram illustrating the outline of a road shape recognition process according to a third embodiment of the present invention.

Referring to the flow diagram shown in FIG. 18, hereinafter is described an operation involved in the road shape recognition. At an initial step S1000 shown in FIG. 18, distance/angle data is read by the distance/angle measuring device 5. Specifically, the distance/angle measuring device 5 acquires distance/angle data corresponding to one scan. In this case, the scanning cycle is 100 msec and thus the distance/angle measuring device 5 acquires distance/angle data every 100 msec.

At the subsequent step S2000, data (object-unit data) is segmentized. In the segmentization, which is performed by the data grouping block 41, the distance/angle data is converted from a polar coordinate system into an X-Z orthogonal coordinate system as mentioned above, and the converted data is grouped to form a segment.

The segmentization is shown in FIG. 14A. In the present embodiment, a collection of data recognized in the form of dots is integrated to provide a segment data. The segment data is calculated when the following two conditions are met: a distance $\Delta X$ between dots as recognized data in the X-axis direction is equal to or less than 0.2 m; and a distance $\Delta Z$ between dots in the Z-axis direction is 2 m or less. Each segment data is ensured to have a size sufficient for including the collection of integrated dots. The segment data corresponds to a rectangular area having two sides parallel to the X-axis and two sides parallel to the Z-axis. Thus, the segment data includes center coordinate (X, Z) and two-side data (W, D) indicating the size. The left and right ends of the rectangular area are also included as coordinate data.

At step S3000, object recognition is performed. The object recognition is executed by the object recognition block 43. The details of the object recognition are as described above. A preceding vehicle, i.e. an immediately preceding vehicle, and a vehicle ahead of the preceding vehicle, i.e. a secondly preceding vehicle, which are moving objects, are identified through the object recognition.

At step S3100, a stationary object removal process is performed. Stationary objects may be present on the traveling road between the apparatus-equipped vehicle and an immediately preceding vehicle, or between the immediately preceding vehicle and a secondly preceding vehicle. Such stationary objects are highly probably reflectors on the road surface or advertising boards and thus have a high probability of not being roadside objects that contribute to the recognition of the road shape. For this reason, relevant stationary objects are removed from the stationary objects recognized through the stationary object removal process performed at step S3000.

Thus, the presence of an immediately preceding vehicle and a secondly preceding vehicle is recognized first. Requirements for an immediately preceding vehicle are:

Tracking flag is on; and lane probability≥70%
A lane probability is a parameter indicating a likelihood that a target is a vehicle traveling on the lane where the apparatus-equipped vehicle travels. Since the way of calculating a lane probability is well known, the explanation is omitted.

Requirements for a secondly preceding vehicle are:
Tracking flag is on; and located farther than the preceding vehicle When the requirements for an immediately preceding vehicle or a secondly preceding vehicle are not met, i.e. when there is no immediately preceding vehicle or secondly preceding vehicle, the present step is not required to be performed. As a matter of course, the requirements for an immediately preceding vehicle or a secondly preceding vehicle set forth above are only examples, and thus the way of determining an immediately preceding vehicle or a secondly preceding vehicle may be provided as appropriate.

Figure 19:
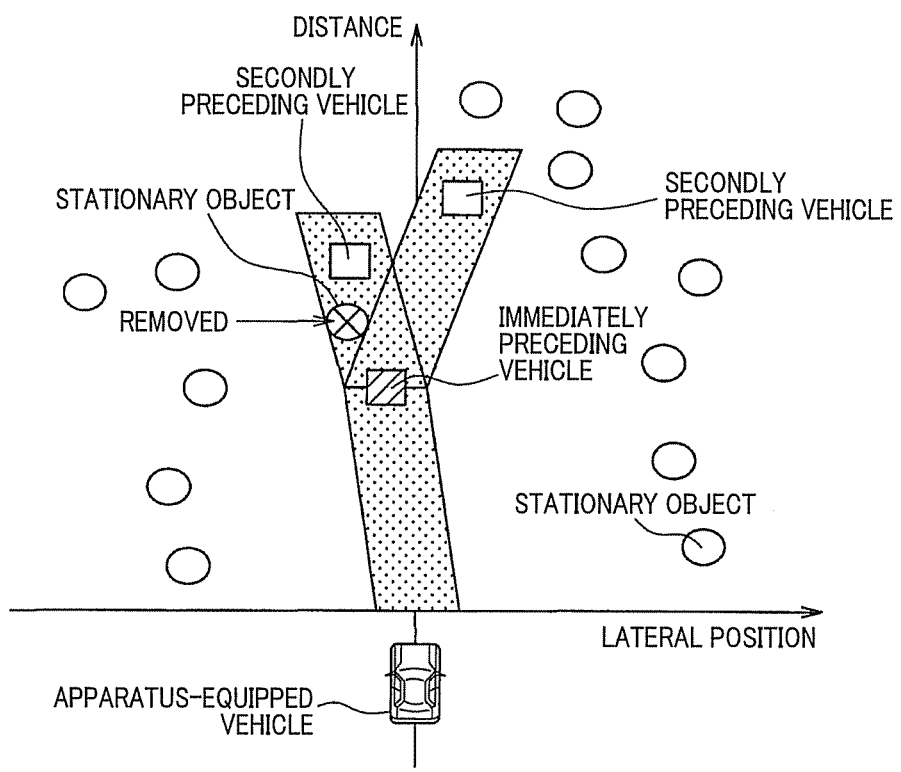
FIG. 19 is an explanatory diagram illustrating stationary objects on a traveling road.

After that, stationary objects present between the apparatus-equipped vehicle and an immediately preceding vehicle and between the immediately preceding vehicle and a secondly preceding vehicle are removed from the recognized objects. FIG. 19 shows the apparatus-equipped vehicle, an immediately preceding vehicle, a secondly preceding vehicle and stationary objects around the apparatus-equipped vehicle. The circles in FIG. 19 indicate stationary objects, such as manholes or advertizing boards. The portion with dotted hatching indicates a traveling road of the apparatus-equipped vehicle or the secondly preceding vehicle. In this situation as shown in FIG. 19, let us assume, for example, that a stationary object indicated with a mark ⓧ is present between the immediately preceding vehicle and the secondly preceding vehicle. The data (object-unit data) corresponding to this stationary object is removed from segment data.

Step S4000 and the subsequent steps are performed by the road shape recognition block 45. At step S4000, the center positions of the segments obtained at step S2000 are converted into a polar coordinate system and sorted in the order of angle.

At step S5000, the segments that meet the connection requirement are grouped clockwise based on the angles obtained at step S4000 to thereby form a roadside object group (left). This is specifically explained also referring to FIG. 14B. In the present embodiment, the road shape is recognized based on delineators located on the roadside. Accordingly, segments, such as of unnecessary advertising boards or vehicles, other than those of the delineators are removed first. To this end, those segments which meet either one of the following removal requirements are removed, being determined as being segments such as of advertising boards or vehicles.

Segments having a large horizontal width W:
Removal requirements:
Horizontal width≥1.2 m; and horizontal to vertical ratio D/W<5
Segments in the vicinity of a moving object in terms of an object type:
Removal conditions:
Distance between center positions is $\Delta X \leq 2$ m; $\Delta Z \leq 2$ m
Then, the segments remained after removing the segments meeting the removal requirements are processed clockwise. Specifically, of the remaining segments, those which have a distance Z of monotonic increase and meet the following connection requirement are processed clockwise while such segments are present. In the processing, the segments are sequentially connected for grouping to thereby form a roadside object group (left).

Connection requirement:

Distance between center positions is $\Delta X \leq 3.5$ m; $\Delta Z \leq 55$ m Then, when the distance is decreased, or does not meet the above connection requirement although it is monotonically increased, a new different roadside object group (left) is formed. Although a single segment can compose a roadside object group (left), only those roadside objects (left) each composed of three or more segments are used herein in recognizing a road edge. In the situation shown in FIG. 14B, as a result of removing the segments meeting the removal conditions and grouping the remaining segments, roadside object group (left) Nos. 1 to 4 are obtained. However, the roadside object group (left) No. 1, which is the only roadside object group having three or more segments, is used for road edge recognition.

As a matter of course, the roadside object group (left) No. 1 selected in this way does not include the stationary objects on the traveling road, which have been removed in the stationary object removal process performed at step S3100. In other words, the stationary objects on the traveling road do not correspond to the "segments that meet the connection requirement" referred to at the present step, and thus are not subjected to grouping. Accordingly, the accuracy of the roadside object group (left) No. 1 is enhanced.

At the subsequent step S5100, a segment having a largest distance Z, i.e. a farthest segment, among the segments composing the roadside object group (left) (i.e. the roadside object group No. 1) is determined whether it is on the left side or on the right side of the road. The details of the determination are described later. The farthest segment, when determined to be on the right side of the road, is removed from the roadside object group (left). FIG. 15 shows by (a) an example in which a roadside object group (left) is composed of three or more segments and a segment on the right side of the road is mingled. As will be seen from the figure, when segments are grouped clockwise with a monotonic increase of the distance Z, there will be no problem if only a farthest segment is determined as to whether it is really located on the left side of the road or not. This is because hardly a situation is envisaged, in which a segment right before the farthest segment (hereinafter referred to as secondly farthest segment) is also on the right side of the road.

A farthest segment is determined as follows. As shown in FIG. 15 by (b), the segments except for the farthest segment are connected via a smoothly curved line. Then, it is determined whether or not the farthest segment is located in the vicinity of the curved line. The curved line is a part of a circle that passes through two points, i.e. a nearest segment having a smallest distance Z and the secondly farthest segment, and is perpendicular to the X-axis. Since the circle should be perpendicular to the X-axis, its center should be on the X-axis. Thus, an equation of the circle is introduced from the center of the circle and the two points on the circumference.

When the distance $\Delta X$ in the X-axis direction between the circle and the farthest segment is less than 1.5 m, the farthest segment is determined to be on the left side of the road and remains being included in the roadside object group (left). When the distance $\Delta X$ is 1.5 m or more, the farthest segment is determined to be on the right side of the road and removed from the roadside object group (left). The location of the farthest segment may be determined based on the nearest distance between the farthest segment and the circle, i.e. the length of a normal line extended from the farthest segment to the circle. In practice, however, no particular problem is raised if the farthest segment is determined only based on the distance $\Delta X$ in the X-axis direction.

At the subsequent steps S6000 and S6100, the processings at steps S5000 and S5100 are performed, reversing left and right. Specifically, at step S6000, the segments that meet the connection requirement are grouped based on the angles obtained at step S4000 counterclockwise to thereby form a roadside object group (right). The processing of removing unnecessary advertising boards or the like is the same as the one performed on the left. The segments remained after the removal, which have a distance Z of monotonic increase and meet the connection requirement, are processed counterclockwise. In the processing, the segments are sequentially connected for grouping to thereby form a roadside object group (right). The connection requirement is also the same as the one on the left. Further, similar to the processing on the left, only the roadside object groups (right) each composed of three or more segments are used for recognizing the road edge.

At step S6100, the processing similar to the one on the left is applied to the farthest segment in a roadside object group (right). Specifically, the farthest segment is determined as to whether it is on the left or on the right of the road. Being determined to be on the left, the farthest segment is removed from the roadside object group (right). After obtaining roadside object groups (left) and roadside object groups (right) in this way, control proceeds to step S7000. It should be noted that the farthest segment in a roadside object group (left) can be the farthest segment in the roadside object group (right). In other words, as shown in FIG. 16 by (a), a single farthest segment can belong to both of the roadside object group (left) and the roadside object group (right), creating a conflicted situation. In such a case, the farthest segment is removed as shown in FIG. 16 by (b). Otherwise, the farthest data is not removed.

At step S8000, the left and right side road edges are recognized based on the roadside object groups (left) and the roadside object groups (right) each composed of three or more segments. In the present embodiment, as shown in FIG. 17, the segments composing each roadside object group are interpolated for recognition of the left or right road edge as a collection of line segments. Further, using the results of interpolation between roadside object group data, an intersection with the X-axis is calculated, followed by interpolation as well up to the intersection. Thus, starting from the vicinity of the vehicle position, the shape of the road is ensured to be recognized as a collection of line segments.

described above, according to the vehicle control apparatus 1 of the present embodiment, the data of stationary objects is removed from segment data in the road shape recognition process if the stationary objects are present on the traveling road between the apparatus-equipped vehicle and an immediately preceding vehicle or on the traveling road between the immediately preceding vehicle and a secondly preceding vehicle. Thus, the right or left end position of a segment data will not be located on the traveling road where the apparatus-equipped vehicle or the immediately preceding vehicle travels. As a result, the roadside object groups after being grouped become closer to the actual shape of the road. Accordingly, the accuracy of recognizing road edges is enhanced. Further, the shape of the road is calculated more correctly and with good frequency.

The shape of the road recognized in this way is used for determining a preceding vehicle and thus used for controlling the inter-vehicle distance and raising an alarm in the control of the inter-vehicle distance. Thus, an inter-vehicle distance is favorably controlled and an alarm is favorably raised.

In the present embodiment, the distance/angle measuring device 5 corresponds to the radar means. The data grouping block 41, the object recognition block 43 and the road shape recognition block 45 of the computer 3 correspond to the recognizing means. Of the blocks 41, 43 and 45, the data grouping block 41 and the object recognition block 43 correspond to the object recognizing means, and the road shape recognition block 45 corresponds to the effective data extracting means, the stationary object removing means, the roadside object group forming means and the road edge recognizing means.

[Modifications]

The above embodiment may be implemented in various modes within a scope not departing from the spirit of the present invention. For example, stationary objects do not have to be necessarily on both of the traveling road range between the apparatus-equipped vehicle and an immediately preceding vehicle and the traveling road range between the immediately preceding vehicle and a secondly preceding vehicle. When stationary objects are present at least on either of the traveling road ranges, the data may be removed.

Fourth Embodiment

Referring to FIGS. 12 and 20 to 25, hereinafter is described a road shape recognition method and apparatus for vehicles according to a fourth embodiment of the present invention.

The vehicle control apparatus 1 to which the road shape recognition apparatus for vehicles according to the present embodiment is applied includes hardware components configured similar to those shown in FIG. 12.

Description of the vehicle control apparatus 1 according to the present embodiment is focused on the differences from the second embodiment.

The internal configuration of the computer 3 is described as control blocks. In the computer 3, the data of a distance r and a scan angle θ outputted from the distance/angle calculation section 5*b* of the distance/angle measuring device 5 is transmitted to the data grouping block 41. The block 41 converts the data of the distance r and the scan angle θ into an X-Z orthogonal coordinate having the center of laser radar as the origin (0, 0), the vehicle's width direction as the X-axis and the vehicle's longitudinal direction as the Z-axis. The converted data are grouped and segmentized. The process of segmentization will be described later. The object-unit data segmentized in the data grouping block 41 is outputted to the object recognition block 43 and the road shape recognition block 45.

In the object recognition block 43, a speed (Vx, Vz) of an obstacle, such as a preceding vehicle, relative to the position of the apparatus-equipped vehicle is calculated based on temporal changes of the center position of the object, which have been outputted from the data grouping block 41. Further, the object recognition block 43 calculates an object type, i.e. whether the object is a stationary object or a moving object, based on the vehicle speed V, which is outputted from the vehicle speed calculation block 47 in accordance with the detection value derived from the vehicle speed sensor 7, and based on the relative speed (Vx, Vz) as calculated above. Based on the object type and the center position of the object, the object recognition block 43 selects an object that would affect the traveling of the vehicle and indicates the distance to the object via the distance display 15. References (W, D) indicating the size of an object represent (width, depth) of the object.

The sensor failure detection block 44 detects whether the data calculated in the object recognition block 43 has a value that falls in an abnormal range. If the value falls in the abnormal range, the sensor failure display 17 displays accordingly. On the other hand, the road shape recognition block 45 recognizes the shape of the road based on the data of the center positions of the objects, which has been outputted from the grouping block 41 and based on the data calculated in the object recognition block 43. The details of the road shape recognition process will be described later. The data obtained at the road shape recognition block 45 is outputted to the preceding vehicle determination block 53.

Further, the steering angle calculation block 49 calculates a steering angle based on a signal from the steering sensor 27. The raw rate calculation block 51 calculates a raw rate based on a signal from the raw rate sensor 28. The curve radius (curvature radius) calculation block 63 calculates a curve radius (curvature radius) R based on a vehicle speed derived from the vehicle speed calculation block 47, a steering angle derived from the steering angle calculation block 49 and a yaw rate derived from the yaw rate calculation block 51. The preceding vehicle determination block 53 selects a preceding vehicle based on the curve radius R, as well as the object type, the center position (X, Z), the size of the object (W, D) and the relative speed (Vx, Vz) calculated in the object recognition block 43, and the road shape data obtained in the road shape recognition block 45. Then, the preceding vehicle determination block 53 calculates a distance Z up to the preceding vehicle and a speed Vz relative to the preceding vehicle.

Then, the inter-vehicle control and alarm-issuance block 55 makes an alarming determination or a cruising determination based on the distance Z to the preceding vehicle, relative speed Vz, apparatus-equipped vehicle speed Vn, preceding vehicle acceleration, object center position, object width, object type, setting conditions of the cruise control switch 26 and degree of braking applied to the brake switch 9, and throttle position from the throttle position sensor 11 and sensitivity value set by the alarm sensitivity setter 25. If an alarming determination is made, it is further determined whether or not an alarm should be raised. If a cruising determination is made, the details of vehicle speed control are determined. As a result of the determination, if an alarm is required to be raised, the block 55 outputs an alarm generation signal to the alarm sound generator 13. If a cruising determination is made, the block 55 outputs control signals to the automatic transmission controller 23, the brake driver 19 and the throttle driver 21 to perform controls as required. In performing these controls, the block 55 outputs a necessary indication signal to the distance display 15 to inform the driver of the situation.

Referring now to a flow diagram of FIG. 20, hereinafter is described an operation involved in the recognition of a road shape, which is performed by the vehicle control apparatus 1 configured as described above. At step S1000 that is an initial step of FIG. 20, distance/angle measurement data, i.e. distance/angle data, is read by the distance/angle measuring device 5. Specifically, the distance/angle measuring device 5 acquires distance/angle data corresponding to one scan. In this case, the scanning cycle is 100 msec and thus the distance/angle measuring device 5 acquires distance/angle data every 100 msec.

At the subsequent step S2000, data (object-unit data) of stationary objects is segmentized. In the segmentization, which is performed by the data grouping block 41, the distance/angle data is converted from a polar coordinate system into an X-Z orthogonal coordinate system as mentioned above, and the converted data is grouped to form segments (roadside object group).

Figure 21A:
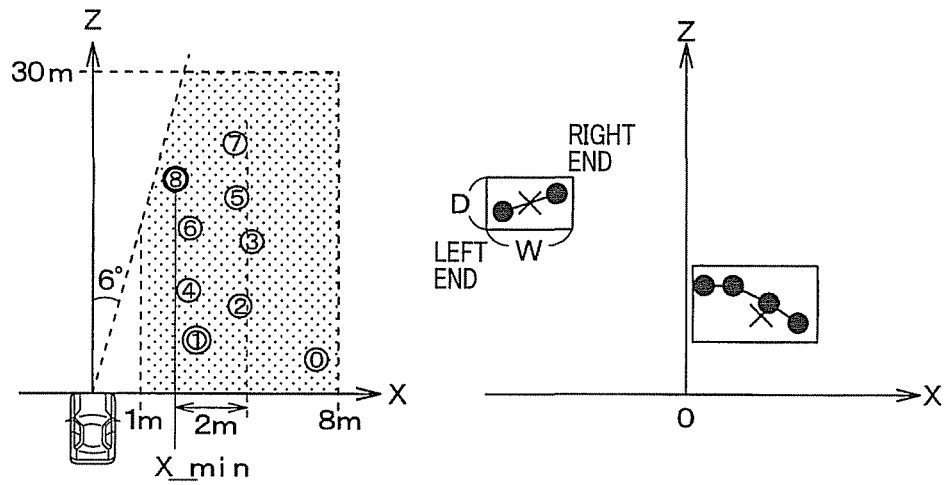
FIG. 21A is an explanatory diagram illustrating how to segmentize measurement data.
Figure 21B:
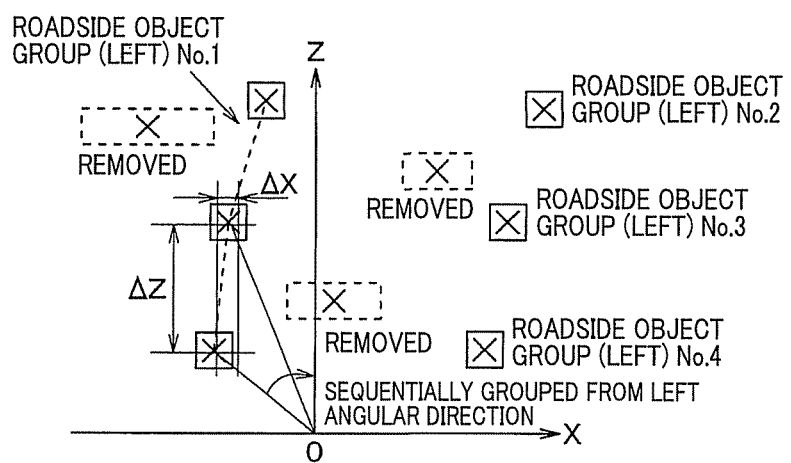
FIG. 21B is an explanatory diagram illustrating grouping of segment data.

Specifically, as shown in FIG. 21A, a starting-point selection process is performed to generate a roadside object group, i.e. segments. In the starting-point selection process, one of the stationary objects sorted in the order of angle is selected as a starting point of forming segments.

Specifically, after the sorting in the order of angle, in a left angular direction:

(1) The lateral position of a stationary object located innermost with respect to the vehicle (located on the vehicle side) is extracted in the left-side area.

(2) A stationary object having a lateral position close to (1) and having a shortest direct distance to the vehicle is used as a starting point.

Regarding the condition (1), a lateral position is extracted for a stationary object which is located at a position from which the distance to the vehicle is the shortest (closest to the vehicle) in the vehicle's width direction. Regarding the condition (2), the "direct distance to the vehicle" refers to the shortest distance from the vehicle to the stationary object, not a distance from the vehicle in the vehicle's width direction.

With respect to the right angular direction, left and right in the conditions (1) and (2) are reversed. Specifically, in the condition (1), the lateral position of a stationary object located innermost with respect to the vehicle in the right-side area is extracted.

For example, with respect to the right angular direction as shown on the left in FIG. 21A, stationary objects numbered "0" to "8" are present on the right-side range with respect to the inclination of 6° from the Z-axis direction centering the vehicle. Specifically, in the right-side range, the stationary objects numbered "0" to "8" are present in a range covering 1 m to 8 m in the X-axis direction from the vehicle and 30 m in the Z-axis direction from the vehicle. This range is indicated by hatching on the left of FIG. 21A.

Of these stationary objects, the stationary object No. 0 has a smallest angle with respect to the X-axis but has a largest distance from the vehicle in the X-axis direction. The stationary object Nos. 1 to 8 are present within a range from a position of the stationary object No. 8 having a shortest distance (X_min) from the vehicle in the X-axis direction, to a position distanced by 2 m from the stationary object No. 8.

Applying the conditions (1) and (2) to this situation, the lateral position in the X-axis direction of the stationary object No. 8 (X_min) is extracted (condition (1)). Further, the stationary object No. 1 having a lateral position near the stationary object No. 8 and having a shortest distance to the vehicle is determined to be a starting point (condition (2)). Thus, grouping connection is prevented from starting from the stationary object No. 0 positioned far from the vehicle. In addition, when the roadside is seen doubled, grouping is preferentially started from an inner roadside line.

Thus, a roadside object group (segments) is formed from the starting point determined as mentioned above. This is explained referring to FIG. 22. FIG. 22 shows an example of connecting stationary objects located in the right angular direction with respect to the vehicle.

As shown in FIG. 22, starting from the stationary object nearest to the vehicle (stationary object No. 1 shown on the left of FIG. 20A), stationary objects are sequentially connected, which are included in both of a connection-requirement range a and a connection-requirement range b which is smaller than the connection-requirement range a. Specifically, the stationary objects are compared in the order of angle. Of the stationary objects that have been found to fall within the connection-requirement range a, those which also fall within the connection-requirement range b are retrieved and connected. Each stationary object connected in this way is used as a base point for sequential retrieval of and connection with the stationary objects included in both of connection-requirement ranges a and b.

In FIG. 22, of the two stationary objects residing in the connection-requirement range a, one also resides in the connection-requirement range b. Therefore, the stationary object residing in both of the connection-requirement ranges a and b is connected. Such a connection is repeated and stationary objects are sequentially connected to thereby form a roadside object group.

In FIG. 22, the connection-requirement range b is located leftward (Z-axis side) in the connection-requirement range a. This is only an example of location of the connection-requirement range b with respect to the connection-requirement range a. For example, the connection-requirement range b may be located at the center in the vehicle's width direction (X-axis direction) in the connection-requirement range a. Thus, the location of the connection-requirement range b in the connection-requirement range a may be determined as appropriate.

As explained above, the stationary objects as a collection of dots are integrated to obtain a segment data. The segment data corresponds to a rectangular area having two sides parallel to the X-axis and two sides parallel to the Z-axis and having a size of including the integrated collection of dots. Thus, as shown on the right of FIG. 21A, the segment data includes center coordinate (X, Z) and two-side data (W, D) indicating the size. The coordinates at the left and right ends of the rectangular area are also included as data.

At step S3000, object recognition is performed. The object recognition is executed by the object recognition block 43. The details of the object recognition are as described above. Step S4000 and the subsequent steps correspond to the processing performed by the road shape recognition block 45. At step S4000, the center positions of the respective segments obtained at step S2000 are converted into a polar coordinate system and then sorted in the order of angle.

At step S5000, the segments that meet the requirement are grouped clockwise to thereby form a roadside object group (left). This is specifically explained also referring to FIG. 21B. In the present embodiment, the road shape is recognized based on delineators located on the roadside. Accordingly, segments, such as of unnecessary advertising boards or vehicles, other than those of the delineators are removed first. To this end, those segments which meet either one of the following removal requirements are removed, being regarded as segments such as of unnecessary advertising boards or vehicles.

Segments having a large horizontal width W:
Removal condition:
Horizontal width$\geq$1.2 m; and horizontal to vertical ratio D/W<5
Segments in the vicinity of a moving object in terms of an object type:
Removal condition:
Distance between center positions is $\Delta X \leq 2$ m; $\Delta Z \leq 2$ m Then, the segments remained after removing the segments meeting the removal requirements are processed clockwise. Specifically, of the remaining segments, those which have a distance Z of monotonic increase and meet the following connection requirement are processed clockwise while such segments are present. In the processing, the segments are sequentially connected for grouping to thereby form a roadside object group (left).

Connection requirement:

Distance between center positions is $\Delta X \leq 3.5$ m; $\Delta Z \leq 55$ m Then, when the distance is decreased, or does not meet the above connection requirement although it is monotonically increased, a new different roadside object group (left) is formed. Although a single segment can compose a roadside object group (left), only those roadside objects (left) each composed of three or more segments are used herein in recognizing a road edge. In the situation shown in FIG. 21B, as a result of removing the segments meeting the removal conditions and grouping the remaining segments, roadside object group Nos. 1 to 4 are obtained. However, the roadside object group No. 1, which is the only roadside object group having three or more segments, is used for road edge recognition.

At the subsequent step S5100, a segment having a largest distance Z, i.e. a farthest segment, among the segments composing the roadside object group (left) (i.e. the roadside object group No. 1 in this case as a matter of course) is determined whether it is on the left side or on the right side of the road. The details of the determination will be described later. The farthest segment, when determined to be on the right side of the road, is removed from the roadside object group (left). FIG. 23 shows by (a) an example in which a roadside object group (left) is composed of three or more segments and a segment on the right side of the road is mingled. As will be seen from the figure, when segments are grouped clockwise, with monotonic increase of the distance, there will be no problem if only a farthest segment is determined as to whether it is really located on the left side of the road or not. This is because hardly a situation is envisaged, in which a segment right before the farthest segment (hereinafter referred to as secondly farthest segment) is also on the right side of the road.

A farthest segment is determined as follows. As shown in FIG. 23 by (b), the segments except for the farthest segment are connected via a smoothly curved line. Then, it is determined whether or not the farthest segment is located in the vicinity of the curved line. The curved line is a part of a circle that passes through two points, i.e. a nearest segment having a smallest distance Z and the secondly farthest segment, and is perpendicular to the X-axis. Since the circle should be perpendicular to the X-axis, its center should be on the X-axis. Thus, an equation of the circle is introduced from the center of the circle and the two points on the circumference.

When the distance $\Delta X$ in the X-axis direction between the circle and the farthest segment is less than 1.5 m, the farthest segment is determined to be on the left side of the road and remains being included in the roadside object group (left). When the distance $\Delta X$ is 1.5 m or more, the farthest segment is determined to be on the right side of the road and removed from the roadside object group (left).

The location of the farthest segment may be determined based on the nearest distance between the farthest segment and the circle, i.e. the length of a normal line extended from the farthest segment to the circle. In practice, however, no particular problem is raised if the farthest segment is determined only based on the distance $\Delta X$ in the X-axis direction.

At the subsequent steps S6000 and S6100, the processings at steps S5000 and S5100 are performed, reversing left and right. Specifically, at step S6000, the segments that meet the connection requirement are grouped counterclockwise to thereby form a roadside object group (right), based on the angles obtained at step S4000. The process of removing unnecessary advertising boards or the like is the same as the one performed on the left. The segments remained after the removal, which have a distance Z of monotonic increase and meet the connection requirement are processed counterclockwise. In the processing, the segments are sequentially connected for grouping to thereby form a roadside object group (right). The connection requirement is the same as the one on the left. Further, similar to the processing on the left, only the roadside object groups (right) each composed of three or more segments are used for recognizing the road edge.

Figure 24:
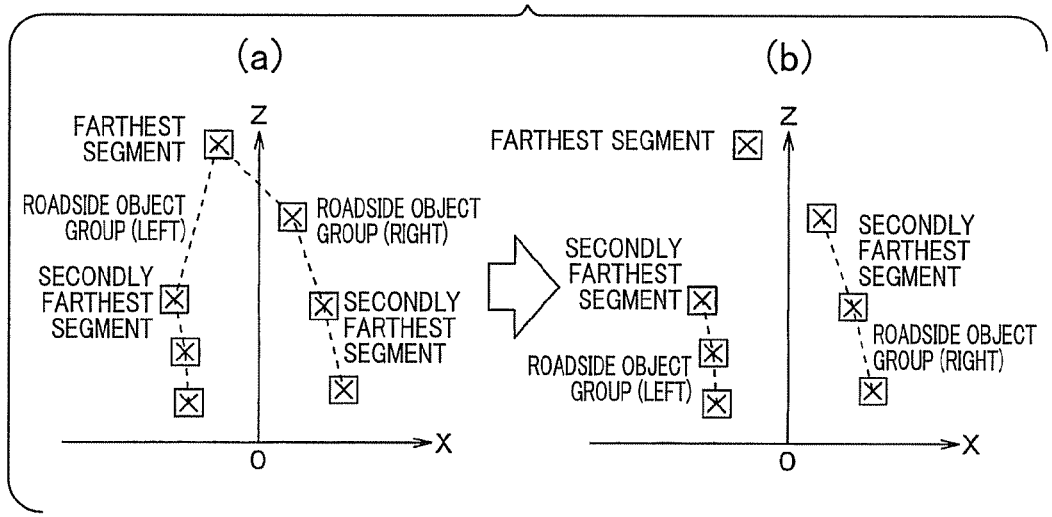
FIG. 24 is an explanatory diagram illustrating how to cope with farthest segments overlapped between a roadside object group (left) and a roadside object group (right)

At step S6100, the processing similar to the one on the left is applied to the farthest segment in a roadside object group (right). Specifically, the farthest segment is determined as to whether it is on the left or on the right of the road. Being determined to be on the left, the farthest segment is removed from the roadside object group (right). After obtaining roadside object groups (left) and roadside object groups (right) in this way, control proceeds to step S7000. It should be noted that the farthest segment in a roadside object group (left) can be the farthest segment in the roadside object group (right). In other words, as shown in FIG. 24 by (a), a single farthest segment can belong to both of the roadside object group (left) and the roadside object group (right), creating a conflicted situation. In such a case, the farthest segment is removed as shown in FIG. 24 by (b). Otherwise, such a processing is not conducted.

Figure 25:
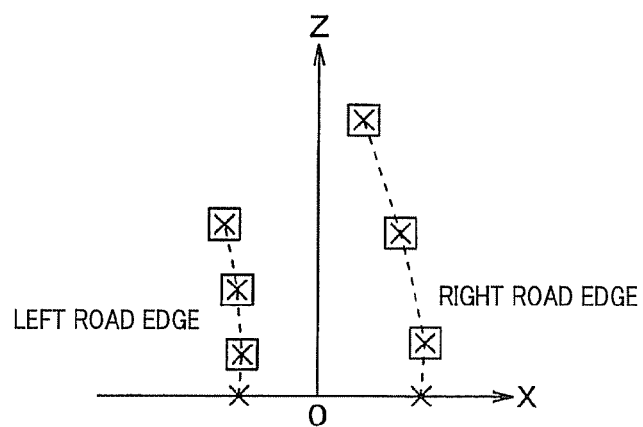
FIG. 25 is an explanatory diagram illustrating how to recognize a road edge as a collection of line segments.

At step S8000, the left and right side road edges are recognized based on the roadside object groups (left) and the roadside object groups (right) each composed of three or more segments. In the present embodiment, as shown in FIG. 25, the segments composing each roadside object group are interpolated for recognition of the left or right road edge as a collection of line segments. Further, using the results of interpolation between roadside object group data, an intersection with the X-axis is calculated, followed by interpolation as well up to the intersection. Thus, starting from the vicinity of the vehicle position, the shape of the road is ensured to be recognized as a collection of line segments.

As described above, in the road shape recognition process performed by the vehicle control apparatus 1 according to the present embodiment, the lateral position of an innermost stationary object (located on the vehicle side) is extracted from among the extracted stationary objects. Further, a stationary object near the lateral position and having a smallest direct distance to the vehicle is used as a starting point. Thus, grouping connection is prevented from being started from the stationary object as a starting point which is positioned far away from the vehicle. In addition, when the roadside is seen doubled, grouping is preferentially started from an inner roadside line. Accordingly, the accuracy of recognizing road edges is enhanced. Further, the shape of the road is calculated more correctly and with good frequency.

Furthermore, in the present embodiment, stationary objects included in both of the connection-requirement ranges a and b are connected starting from a stationary object that has been determined to be a starting point. Since the stationary objects included in the narrow connection-requirement range b are connected, the grouping connection provides a shape close to the actual shape of the road. Accordingly, the accuracy of recognizing the road edges is enhanced. Further, owing to the comparison of the stationary objects in the order of angle, a stationary object having a large distance difference but having a small angle difference is prevented from being preferentially connected. Since two connection-requirement ranges are provided to doubly narrow the connection requirement, the existing performance is maintained.

The shape of the road recognized in this way is used for determining a preceding vehicle and thus used for controlling the inter-vehicle distance and raising an alarm in the control of the inter-vehicle distance. Thus, an inter-vehicle distance is favorably controlled and an alarm is favorably raised.

In the present embodiment, the distance/angle measuring device 5 corresponds to the radar means. The data grouping block 41, the object recognition block 43 and the road shape recognition block 45 of the computer 3 correspond to the recognizing means. Of the blocks 41, 43 and 45, the data grouping block 41 and the object recognition block 43 correspond to the object recognizing means, and the road shape recognition block 45 corresponds to the effective data extracting means, the starting-point selecting means, the roadside object group forming means and the road edge recognizing means.

Further, the connection-requirement range a corresponds to the first connection-requirement range, and the connection-requirement range b corresponds to the second connection-requirement range.

Fifth Embodiment

Figure 26A:
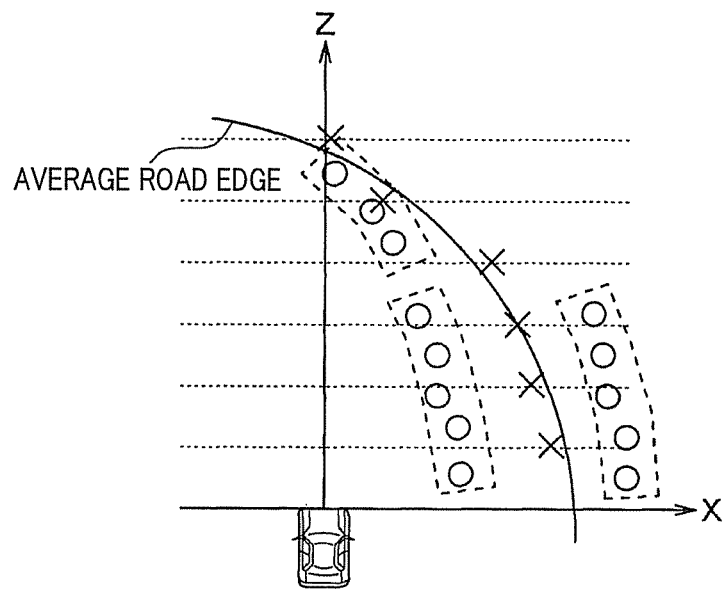
FIG. 26A is an explanatory diagram illustrating how to recognize a road edge using all of segments, according to a fifth embodiment of the present invention.
Figure 26B:
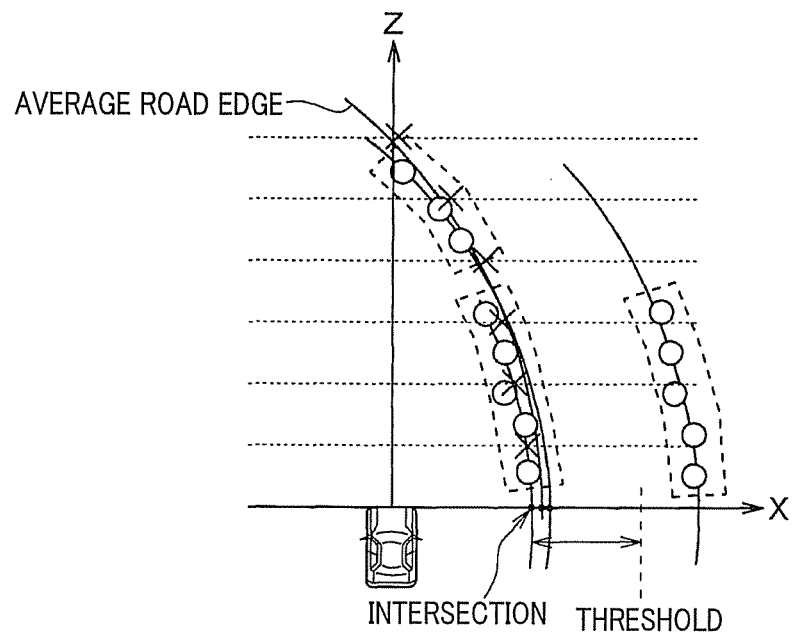
FIG. 26B is an explanatory diagram illustrating how to recognize a road edge using segments which are equal to or less than a threshold, according to the fifth embodiment.

Referring now to FIGS. 26A and 26B, hereinafter is described a road shape recognition method and apparatus for vehicles according to a fifth embodiment of the present invention.

The vehicle control apparatus 1 to which the road shape recognition apparatus for vehicles according to the present embodiment is applied includes hardware components similar to those shown in FIG. 12.

Description of the vehicle control apparatus 1 according to the present embodiment is focused on the differences from the fourth embodiment.

In the present embodiment, segments (stationary object groups) on the vehicle side are preferentially connected to prepare a road-edge table.

For example, when all of the segments are used for calculating an averaged road edge, the average of the road edge is varied, as shown in FIG. 26A, in the vehicle's width axis (X-axis direction). Therefore, in the present embodiment, vehicle-side (inner) segments are used for grouping. The grouping according to the present embodiment corresponds to steps S5000 and S6000 of the first embodiment.

Specifically, as shown in FIG. 26B, circles passing through respective segments and the X-axis are calculated. Only specific segments are used for grouping. The specific segments have the intersections that fall within a range from an innermost intersection to a point distanced from the innermost intersection by a predetermined threshold. Accordingly, the segment farthest from the vehicle in the X-axis direction in FIG. 26B is excluded from grouping. Thus, an average road edge to be calculated is ensured to be recognized as passing through the inner (vehicle-side) segments.

As described above, in the present embodiment, road side object groups located more on the vehicle side (inner side) and on the same curved line are preferentially used for grouping. In other words, a road-edge table is prepared preferentially using the vehicle-side (inner) segments. Accordingly, in a situation such as when a roadside is seen doubled due to a plurality of segments scattered in the vehicle's width direction (X-axis direction), the accuracy of recognizing a road edge is enhanced. In this way, the shape of the road is calculated more correctly and with good frequency.

[Modifications]

The present invention is not limited to the configurations according to the first to fifth embodiments but may be implemented in various modes within a scope not departing from the spirit of the invention. For example, the present invention may be modified as set forth in the following items (1) to (3).

(1) For example, in the embodiments described above, the farthest segment belonging to both of the left and right roadside object groups is removed at step S7000. Alternative to this, the farthest segment may be determined as to whether it has a high probability of belonging to the left roadside object group or to the right roadside object group. Then, the farthest segment may be included in the roadside object group to which the farthest segment has a high probability of belonging. Thus, the farthest segment may be effectively used as much as possible. Step S5100 or S6100, for example, may be applied to the determination to be made on the farthest segment. Specifically, a distance $\Delta X$ between the farthest segment and the circle passing through the left roadside object group may be calculated, and, similarly, a distance $\Delta X$ between the farthest segment and the circle passing through the right roadside object group may be calculated. Then, the length of the distances $\Delta X$ may be compared to include the farthest segment in the roadside object group having a smaller distance $\Delta X$. Alternatively, for example, a neutral zone may be provided between both circles. The farthest segment, when it crosses over the neutral zone and is located closer to either of the left and right roadside object groups, may be determined to belong to the roadside object group.

(2) The embodiments described above and the above item (1) are provided from a viewpoint of effectively using the farthest segment as much as possible. However, from a view point of avoiding an erroneous determination as much as possible, the farthest segment may be unconditionally removed at steps S5100 and S6100. Thus, an erroneous determination that would have been made due to the use of the farthest segment is reliably avoided.

(3) In the embodiments described above, the segments composing a roadside object group are interpolated to recognize a road edge as a collection of line segments. However, a method of interpolation is not limited to this. For example, segments may be interpolated using curved line segments to recognize a road edge as a smoothly curved line.

Sixth Embodiment

Referring to FIGS. 27 to 33, hereinafter is described a road shape recognition method and apparatus for vehicles according to a sixth embodiment of the present invention.

FIGS. 27 to 33 show a system configuration of an inter-vehicle control apparatus 1A applied with the road shape recognition apparatus for vehicles according to the present embodiment.

Figure 27:
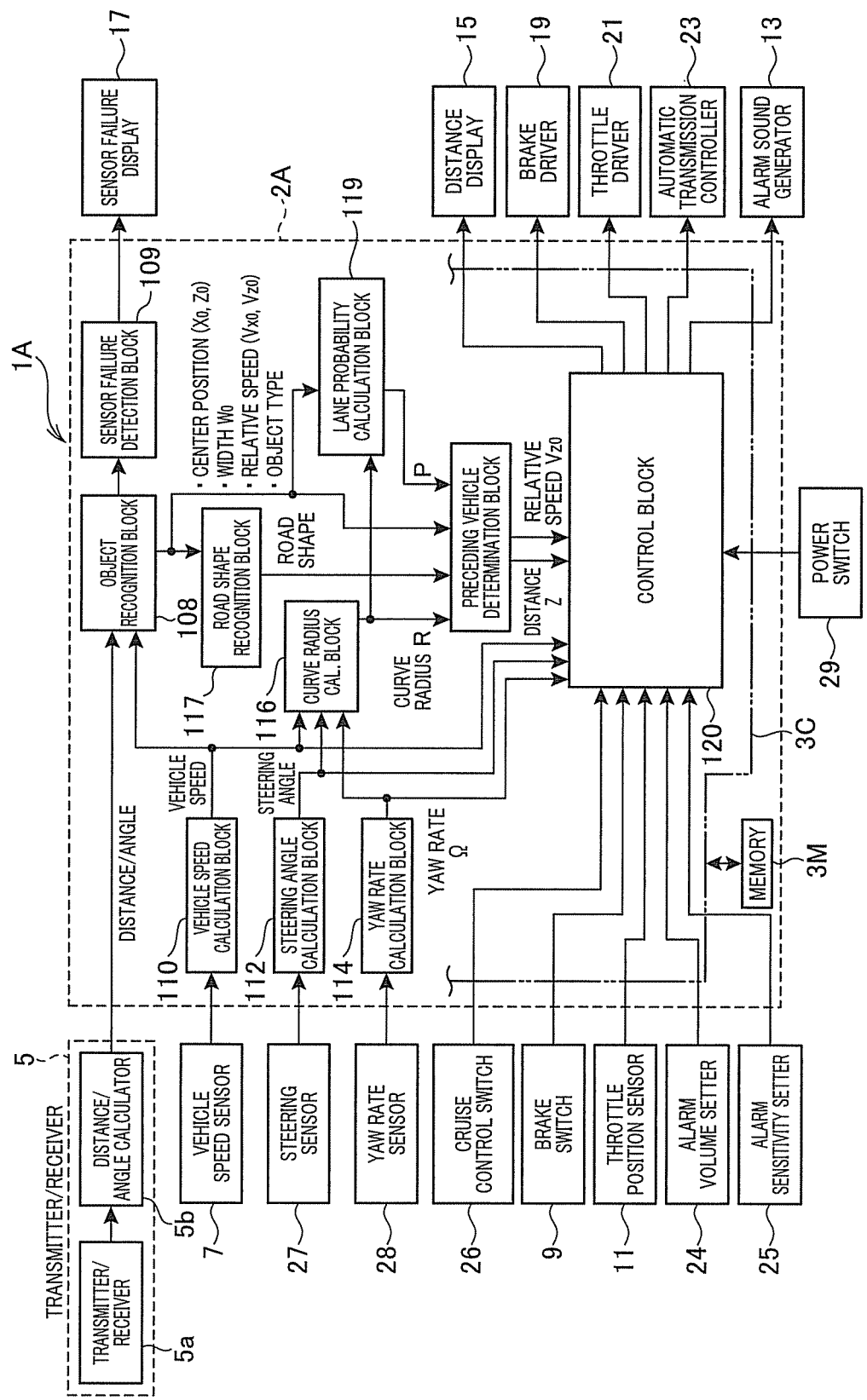
FIG. 27 is a system configuration diagram illustrating an inter-vehicle control apparatus to which a road shape recognition apparatus according to a sixth embodiment of the present invention is applied.
Figure 28:
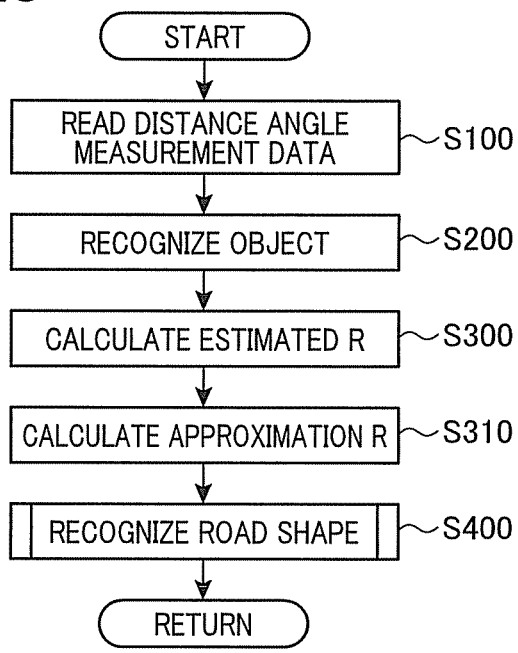
FIG. 28 is a flow diagram illustrating road shape recognition.

As shown in FIG. 27 and similar to the configurations described so far, the inter-vehicle control apparatus 1A includes, in addition to a computer 2A, a distance/angle measuring device 5, vehicle speed sensor 7, steering sensor 27, yaw rate sensor 28, cruise control switch 26, brake switch 9, throttle position sensor 11, alarm volume setter 24, alarm sensitivity setter 25, power switch 29, sensor failure display 17, distance display 15, brake driver 19, throttle driver 21, automatic transmission controller 23 and alarm sound generator 13.

The computer 2A includes an input/output interface (I/O) and various drive circuits and detection circuits. Since these hardware components are generally used ones, detailed description is omitted. The computer 2A includes a power switch 29. When the computer 2A is turned on, the computer 2A is supplied with power to start predetermined processes. The computer 2A performs not only inter-vehicle distance control described in the present embodiment, but also cruise control, when a preceding vehicle is not selected, to maintain the vehicle speed at a set speed.

The distance/angle measuring device 5 corresponding to a radar system includes a transmitter/receiver 5a and a distance/angle calculator 5*b*. The transmitter/receiver 5*a* outputs a laser beam to scan the forward direction of the vehicle, covering a predetermined angular range and detects the reflected light. Further, the transmitter/receiver 5*a* detects a distance to an object ahead of the vehicle and a position coordinate of the object, based on the time taken for the distance/angle calculator 5*b* to capture the reflected light. Since such a radar system is well known, detailed description is omitted.

Besides laser beams, the distance/angle measuring device 5 may use a radio wave, such as a millimeter wave, or an ultrasonic wave.

The vehicle speed sensor 7 detects a signal corresponding to the rotational speed of the wheels.

The steering sensor 27 detects the amount of change in the steering angle of the steering wheel. When the power switch 29 is turned on, a steering angle storing address of a memory is set to "0". A relative steering angle θ (Rad) is determined by integrating the amount of change in the steering angle detected thereafter.

The yaw rate sensor 28 detects a rate of change Ω (Rad/sec) in the vehicle's rotational angle (yaw angle) about the vertical axis passing through the center of gravity of the vehicle.

The cruise control switch 26, when it is turned on, causes start of cruise control under which an inter-vehicle control process is also performed. In the inter-vehicle control process, if the inter-vehicle distance becomes small, the computer 2A may determine that the vehicle has a risk of colliding with the preceding vehicle. In this case, the computer 2A allows the alarm sound generator 13 to raise an alarm. The volume of the alarm sound is adjusted by the alarm volume setter 24. Further, the sensitivity of the alarm is adjusted by the alarm sensitivity setter 26.

The brake switch 9 detects the degree of braking applied by the driver. The brake driver 19 is activated with the instruction of the computer 2A, if necessary for avoiding a risk, to adjust the brake pressure.

The throttle position sensor 11 detects the position of the throttle valve of the internal combustion engine.

According to the results of the detection of the throttle position sensor 11, the computer 2A instructs activation of the throttle driver 21 to adjust the position of the throttle valve and thus to adjust the output of the engine.

The sensor failure display 17 displays failure of the distance/angle measuring device 5, which has been detected by a sensor failure detection block 109. The distance display 15 displays a distance to a preceding vehicle selected through a process, which will be described later, based on the results of measurements derived from the distance/angle measuring device 5.

The automatic transmission controller 23 selects a gear position of the automatic transmission, which position is suitable for controlling the speed of the vehicle, based on the instruction from the computer 2A.

Description hereinafter is provided referring to the block diagram of the computer 2A.

The data regarding distance and angle outputted from the distance/angle calculator 5*a* of the distance/angle measuring device 5 is converted from a polar coordinate into an X-Z orthogonal coordinate centering on the vehicle by an object recognition block 108. On the other hand, a signal outputted from the vehicle speed sensor 7 according to the rotational speed of the wheels is converted into a vehicle speed signal by a vehicle speed calculation block 110. Based on the vehicle speed signal and the converted X-Z orthogonal coordinate, the object recognition block 108 calculates a center position coordinate (X0, Z0), an object width W, a relative speed (VX0, VZ0) and the type of an object type. The object type indicates whether a recognized object is a moving object or a stationary object. It should be noted that, in the center position coordinate (X0, Z0) of an object, X0 indicates the position of the object in the width direction of the vehicle, and Z0 indicates the position of the object in the traveling direction of the vehicle.

A steering angle calculation block 112 calculates a steering angle θ based on a signal from the steering angle sensor 27. A yaw rate calculation block 114 calculates a yaw rate based on a signal from the yaw rate sensor 28.

A curve radius calculation section 116, which calculates a curve radius R of the road where the vehicle travels, receives inputs of a vehicle speed from the vehicle speed calculation block 110, a steering angle θ from the steering angle calculation block 112 and a yaw rate Ω from the yaw rate calculation block 114. Thus, the curve radius calculation section 116 calculates a curve radius R based on the vehicle speed, the steering angle θ and the yaw rate Ω.

A lane probability calculation block 119 calculates a lane probability P of a preceding vehicle. In calculating the lane probability P, the lane probability calculation block 119 uses the curve radius R, as well as the center position coordinate (X0, Z0), object width W, relative speed (VX0, VZ0) and object type calculated in the object recognition block 108.

If the object recognition block 108 determines an object to be a reflector set on the road, a road shape recognition block 117 recognizes the shape of the road based on the center position coordinate (X0, Z0) of the reflector, as well as the curve radius R derived from the curve radius calculation block 116. Details of the road shape recognition will be described later.

A preceding vehicle determination block 118 specifies a preceding vehicle based on the curve radius R calculated in the curve radius calculation section 116, the lane probability P calculated in the lane probability calculation block 119, the center position coordinate (X0, Z0), the relative speed (VX0, VZ0) and the object type calculated in the object recognition block 108, and the road shape recognized in the road shape recognition block 117.

A control block 120 outputs signals for adjusting a distance between the vehicle and a preceding vehicle, to the brake driver 19, the throttle driver 21 and the automatic transmission controller 23. The signals are outputted based on the distance Z0 to the preceding vehicle, the relative speed VZ0 in the traveling direction, the setting conditions of the cruise control switch 26, and the degree of braking applied to the brake switch 9. Also, the control block 120 outputs a signal necessary for the distance display 15, while outputting, as necessary, an alarm signal to the alarm sound generator 13 to thereby notify the driver of the situation.

The relative speed VZ0 in the traveling direction, which is the only factor used in performing the inter-vehicle control, is transmitted to the control block 120.

Referring to the flow diagrams of FIGS. 2 and 4 hereinafter is specifically described a process up to the recognition of a road shape, which process is performed by the computer 2A in the inter-vehicle distance control apparatus 1A. The present process is repeatedly performed at every is.

Figure 2:
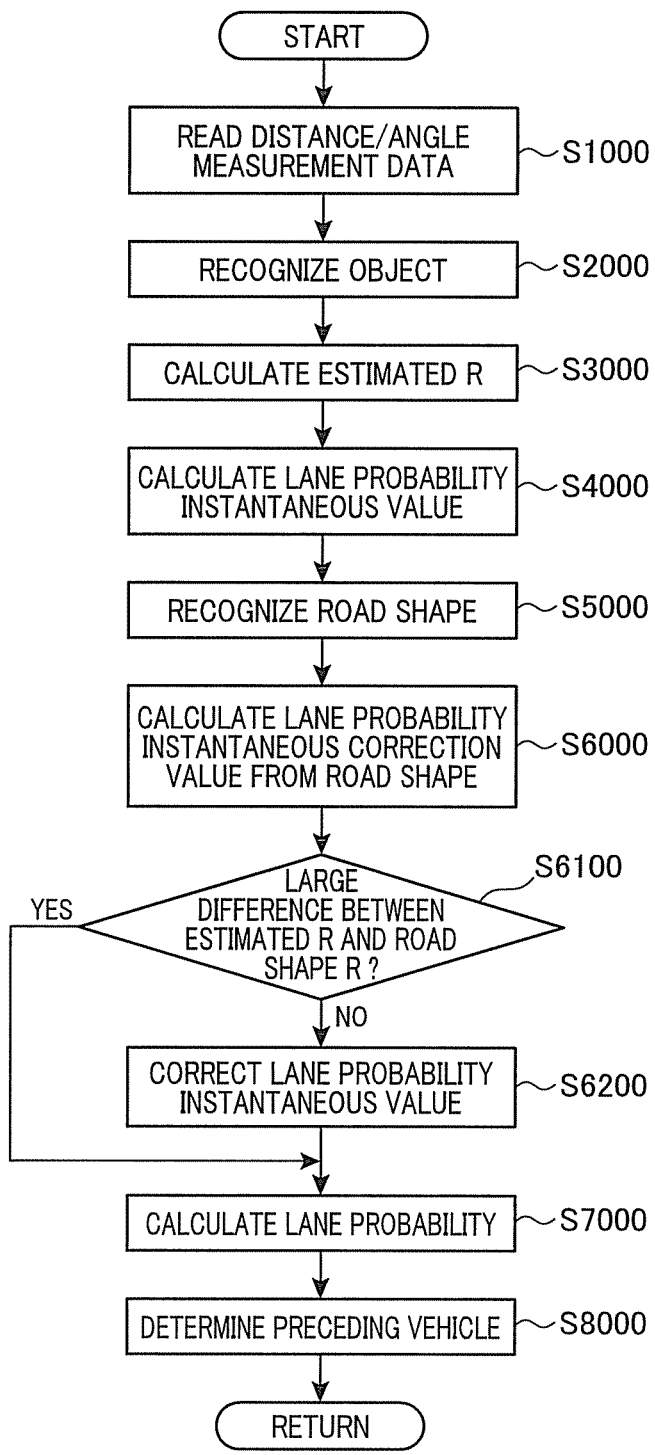
FIG. 2 is an explanatory diagram illustrating the outline of a preceding vehicle selection process.
Figure 3:
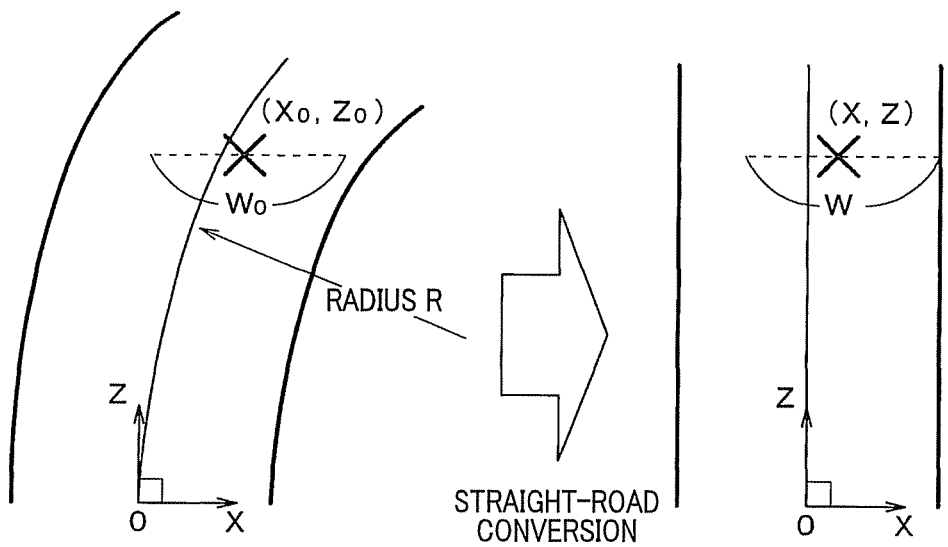
FIG. 3 is an explanatory diagram illustrating how to convert target positions into positions of straight-road traveling.

At step S100 of FIG. 2, the distance/angle measuring device 5 reads distance/angle measurement data, i.e. distance angle data, (object-unit data) for an object ahead of the vehicle.

Then, at step S200, a recognition process is performed for the object ahead of the vehicle. In the object recognition process, the distance/angle data read by the distance/angle measuring device 5 is converted from a polar coordinate system into an orthogonal coordinate system. Then, based on the converted distance/angle data, a center position coordinate (X0, Z0) of the object, object width W0, relative speed (VX0, VZ0) and object type are calculated. The relative speed (VX0, VZ0) of the object is calculated based on the temporal changes of the center position coordinate (X0, Z0). For example, if the relative position of the object hardly moves in spite of the vehicle's traveling forward, the object may be determined to be a moving object. If a distance to the object gradually increases, the object may also be recognized to be a moving object. On the other hand, if the relative position of the object becomes closer to the vehicle at the same rate (absolute value) of the vehicle speed, the object may be recognized to be a stationary object. Other objects, such as an object having a duration of appearance time insufficient for completing recognition, are recognized as unidentified objects.

At step S300, a curve radius R (estimated R) of the vehicle is calculated based on a steering angle θ derived from the steering sensor 27 or a yaw rate Ω derived from the yaw rate sensor 28. The curve radius R here is calculated from a steering angle θ by using the following formula (1).

$$R = C/\theta \tag{1}$$

In Formula (1), C represents a constant depending on vehicle type and vehicle speed. Constants C for respective vehicle types and vehicle speeds are stored as map functions in the curve radius calculation block 116 of the computer 2A. Since the constant C is generally known as a function for calculating a curve radius R from a steering angle θ, detailed explanation is omitted. When a curve radius R is calculated from a yaw rate Ω, a vehicle speed V is divided by a yaw rate Ω.

Then, at step S310, an approximation R is calculated. At step S300 described above, a curve radius R is calculated based on the state of the vehicle. At the present step, an approximation R is calculated using the data of a preceding vehicle, i.e. an immediately preceding vehicle, and the vehicle right ahead of the preceding vehicle, i.e. a secondly preceding vehicle, which are the moving objects recognized at step S200. Specifically, an approximation R corresponds to a radius of a circle approximated by three points, i.e. the coordinate of the immediately preceding vehicle, the coordinate of the secondly preceding vehicle, and the origin (the apparatus-equipped vehicle). Thus, an immediately preceding vehicle and a secondly preceding vehicle are selected from the moving objects recognized at step S200.

In order to select an immediately preceding vehicle and a secondly preceding vehicle from the moving objects, the following requirements are used.

A: Lane probability≥70%
B: Lane probability>50% and Detection time≥10 sec
C: Having a shortest distance
D: Xcross<2 m
E: Located farther than an immediately preceding vehicle The lane probability of requirements A and B is calculated in the lane probability calculation block 119. A lane probability is a parameter expressing a likelihood that a target travels on the same lane where the apparatus-equipped vehicle travels. Since the method of calculating a lane probability is well known, description is omitted. The detection time in requirement B is a duration of time when a moving object is continuously detected.

Requirement C indicates a moving object having a shortest distance between the moving object and the apparatus-equipped vehicle. The of Xcross of requirement D is calculated at step S414 described later. Specifically, an estimated X-axis Xcross obtained at step S414 of the previous cycle is read for use at step S310 of the present cycle. The previous cycle here refers to a cycle immediately before the present cycle in the flow diagram of FIG. 28, which cycle is repeatedly executed at a predetermined cycle.

In the requirements set forth above, the moving object meeting the following requirements are regarded to be an immediately preceding vehicle:
(A or B) and C and D
Also, the moving object meeting the following requirements is regarded to be a secondly preceding vehicle:
E and D
The numerical values of the conditions A, B and D are only examples, and thus these values may be determined as appropriate.

Figure 29:
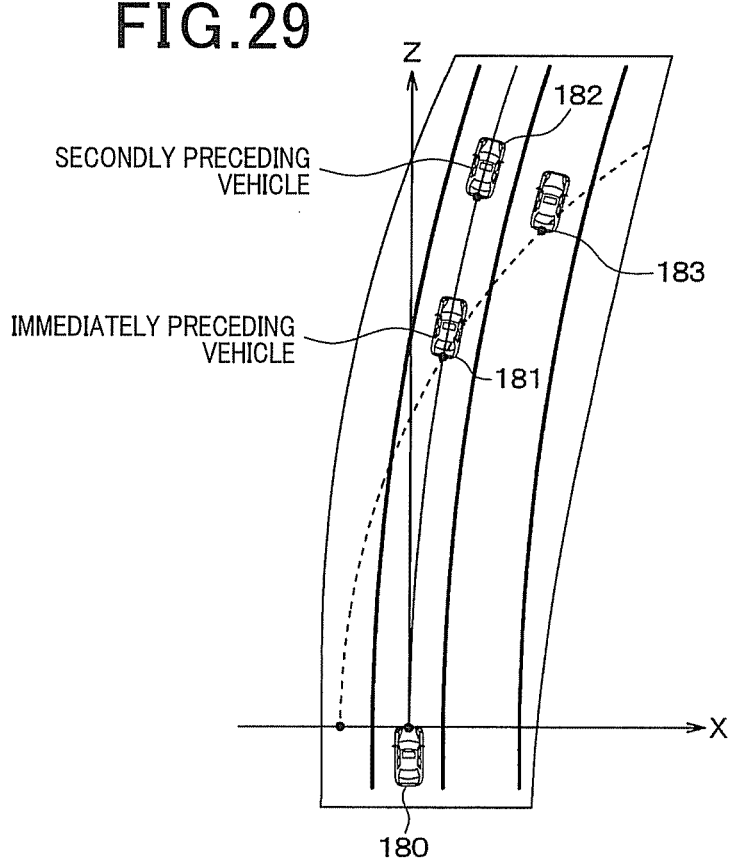
FIG. 29 is an explanatory diagram illustrating how to calculate an approximation R based on the apparatus-equipped vehicle, a preceding vehicle, and a vehicle ahead of the preceding vehicle.

Thus, as shown in FIG. 29, two vehicles traveling on the lane, where the apparatus-equipped vehicle 180, travels are selected as an immediately preceding vehicle 181 and a secondly preceding vehicle 182. Then, a circle passing through three points, i.e. the vehicle 180, the vehicle 181 and the vehicle 182, is approximated. The radius of the circle is rendered to be an approximation R.

As mentioned above, a "circle passing through three points" is approximated. However, the circle does not necessarily have to pass the three points, but a circle may only have to be approximated by three points. In calculating an approximation R based on moving objects, if a different vehicle other than the immediately preceding vehicle 181 and the secondly preceding vehicle 182 is present on the same lane, the different vehicle may be used for calculating the approximation R. Thus, the accuracy of the approximation is enhanced.

For example, as shown in FIG. 29, if a vehicle 183 traveling on the lane on the right side of the lane where the vehicle 180 travels is selected as a secondly preceding vehicle, a circle indicated by the broken line in FIG. 29 is calculated. The broken-line circle intersects the X-axis at a position distanced from the vehicle 180 in the vehicle's width direction. Therefore, the accuracy of the approximation R is not high. In this regard, an appropriate selection of the secondly preceding vehicle 182 meeting the conditions set forth above enables calculation of the approximation R having quite a high accuracy as indicated by the solid-line circle in FIG. 29.

When the immediately preceding vehicle 181 and the secondly preceding vehicle 182 cannot be selected from among moving objects, i.e. when the conditions set forth above are not met, the approximation R is not required to be calculated at the present step.

When the approximation R is calculated as described above, an average between the curve radius R calculated at step S300 and the approximation R calculated at the present step, for example is calculated. Then, the average is filtered to acquire a curve radius R which is used for road shape recognition set forth below. As a matter of course, the method of applying an approximation R to a curve radius R in this way is only an example and thus a different method may be used.

On the other hand, when the immediately preceding vehicle 181 and the like cannot be selected and no approximation R is calculated at the present step, the curve radius R calculated at step S300 is used for road shape recognition. In contrast, when the curve radius R cannot be calculated at step S300, the approximation R per se calculated at the present step may be used as a curve radius R.

At the subsequent step S400, road shape recognition is performed. The details are described referring to the flow diagram illustrated in FIG. 30.

At step S410, first, object-unit data which seems to correspond to delineators is extracted. Specifically, if the object type recognized in the object recognition block 108 is determined to be a stationary object, those stationary objects which have a width equal to or smaller than 1 m of the stationary object are extracted. Thus, the stationary objects, such as advertising boards, having a comparatively large width are removed to extract only reflectors arranged along the road from among the stationary objects. Hereinafter, the reflectors are referred to as delineators (reflectors embedded on the road edge, which are commonly known as "cat's eyes").

Figure 31:
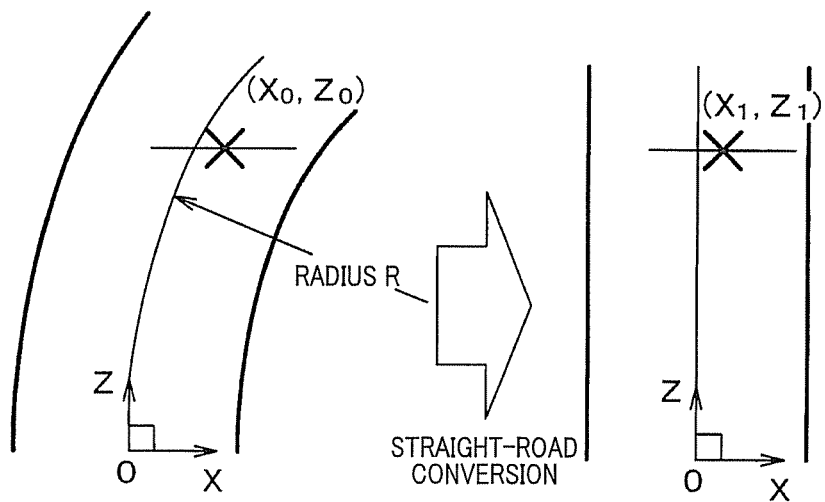
FIG. 31 is an explanatory diagram illustrating how to convert a curve radius into a straight road.

At the subsequent step S412, as shown in FIG. 31, a center position coordinate (X0, Z0) of each delineator is converted into a center position coordinate (X1, Z1) in terms of the traveling on a straight road, i.e. straight-road traveling. After conversion, the delineators having a large coordinate X1 are removed.

In converting the position of each delineator into the position in terms of straight-road traveling, the following Formula (2) is specifically used.

$$X1 \leftarrow X0 - Z0 \times Z0/2R$$

$$Z1 \leftarrow Z0 \tag{2}$$

The approximation of Formula (2) is performed assuming that $|X| \ll |R|$, $|X| \ll Z$.

At the present step, when, for example, the coordinate X1 of a delineator after straight-road conversion meets the condition of the following Formula (3), the delineator is excluded from those delineators which are used for recognizing the road shape.

$$|\text{Straight-road conversion } X1| > 3.5 \ m \tag{3}$$

With this conditional expression, a value of a range equivalent to the width of the lane where the apparatus-equipped vehicle travels is set to 3.0 m, for example. The lane-width equivalent value 3.0 m is set on both of the left and right sides of the vehicle. Thus, the conditional expression is used for extracting only the delineators on the lane lines of the lane where the vehicle travels.

Let us assume that the vehicle travels along the center of a lane of 3.5 m wide of a straight road. In this case, the vehicle is at a position X1=−1.75 m to the left-side line of the lane where the vehicle travels and X1=−5.25 m to the adjacent lane line. On the other hand the vehicle is at a position X1=1.75 m to the right-side line of the lane where the vehicle travels and X1=5.25 m to the adjacent lane line. In this situation, the condition of Formula (3) removes the delineators whose absolute value of the positional coordinate X1 in the vehicle's width direction after straight-road conversion is larger than 3.5 m. Accordingly, only those delineators which are provided along the lane lines where the vehicle travels are extracted.

When the curve radius R cannot be calculated in the absence of a steering sensor and a yaw rate sensor, the condition of the following formula (4) is used. Since a calculated curve radius R may have an error, the condition of Formula (4) may be combined.

$$|X| > 4.0 \ m$$

In Formula (4), the lane-width equivalent value is set to 4.0 m. The condition of Formula (4) is provided without taking into account the curve radius R of the road and thus the condition corresponds to the condition before straight-road conversion. Thus, the condition of Formula (4) is permitted to have a margin compared to the condition of Formula (3).

Figure 32:
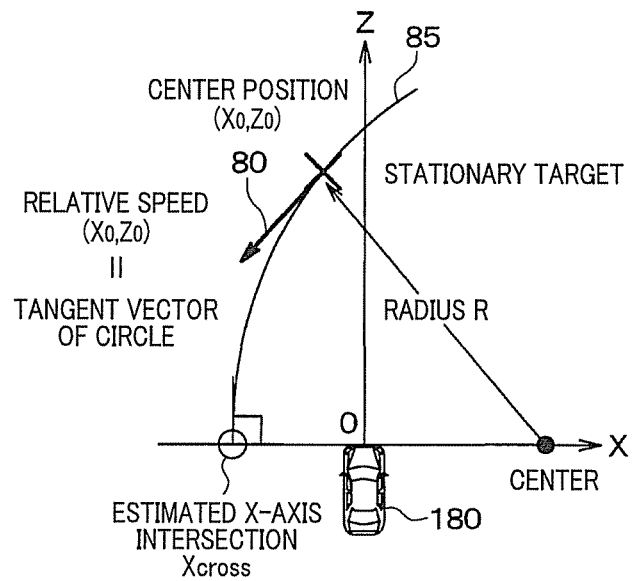
FIG. 32 is an explanatory diagram illustrating how to calculate a curve radius from a delineator.

At step S414, an estimated X-axis intersection of each delineator is calculated. As shown in FIG. 32, a circle 85 is calculated, which passes a center position coordinate (X0, Z0) of a delineator and has, as a tangent vector, a relative speed vector 80 of the delineator with respect to the vehicle. The estimated X-axis intersection corresponds to an intersection between the circle 85 and the vehicle's width direction, i.e. the X-axis whose origin is the vehicle. In calculating the estimated X-axis intersection, an approximate calculation is performed using the following Formulas (4) to (8).

When a circle is approximated by a parabola on the assumption that $|X| \ll |R|$, $|X| \ll Z$, an equation of the circle (expressed as a function of X and Z) passing the center of a delineator and perpendicular to the X-axis is expressed as follows.

$$X = X0 + \{(Z-Z0) \times (Z-Z0)/2R\} \tag{5}$$

A relative speed vector (VX, VZ) of a delineator, which is a tangent vector, is expressed as follows.

$$dX/dZ = VX0/VZ0 \tag{6}$$

From Formulas (5) and (6), a curve radius R is expressed as follows.

$$R = (Z-Z0) \times VZ/VX \tag{7}$$

Accordingly, the equation of the circle is transformed as follows.

$$X = X0 + \{(Z-Z0) \times VX/2VZ\} \tag{8}$$

In this case, when Z=0, the value of X corresponds to an estimated X-axis intersection Xcross, the value being expressed as follows.

$$X = X - Z \times VX0/2VZ0 \tag{9}$$

Thus, the estimated X-axis intersection Xcross is calculated.

Calculating the estimated X-axis intersection Xcross, a range in the width direction of the vehicle, which range cannot be detected by a radar system, can be defined. Accordingly, the shape of the road is more correctly recognized. At the same time, the left and right edges of the lane where the vehicle travels are also recognized as follows.

The estimated X-axis intersection Xcross is calculated for each of the delineators remained without being removed by Formulas (3) and (4) set forth above. However, finally, a delineator having a minimum distance (Z0) in the traveling direction of the vehicle is selected for each of the left and right sides of the vehicle and used for the following processing.

Then, at step S416, the left and right edges of the lane where the vehicle travels are recognized using the results up to step S414. First, the signs of the estimated X-axis intersections Xcross are grouped into a positive group and a negative group. The positive group is recognized to be the delineators along the right edge of the lane, while the negative group is recognized as the delineators along the left edge of the lane.

Then, for each of the left and right edges of the lane, the delineators remained without being removed through the straight-road conversion at step S412 are mutually connected through the respective center position coordinates (X0, Z0) before the straight-road conversion to thereby recognize the shape of the road.

The present embodiment has been described taking as an example the case where a series of delineators are detected on each of the right and left sides of the vehicle. However, no limitation shall be imposed by this. For example, a series of delineators may be detected on either of the right and left sides of the road.

As described above, according to the road shape recognition apparatus for vehicles of the present embodiment, the following advantages are obtained.

Stationary objects having a width larger than a predetermined value, e.g., 1 m, are removed to extract only the reflectors placed on the road. Thus, most of unnecessary vehicles, signposts, advertising boards and the like are removed for the extraction of only delineators 110.

Figure 33:
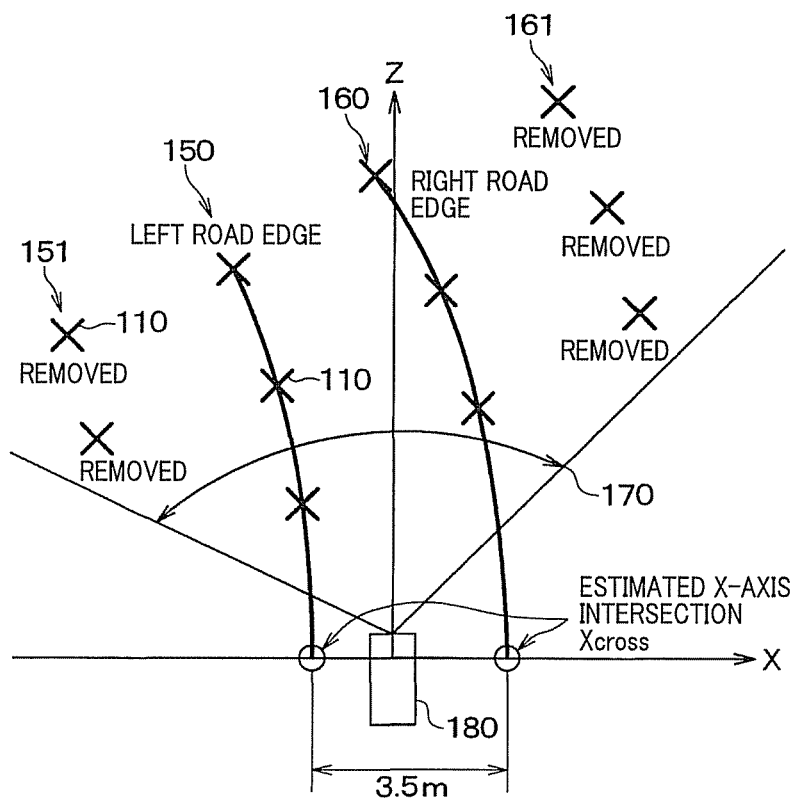
FIG. 33 is an explanatory diagram illustrating how to recognize both edges of a lane.

As shown in FIG. 33, delineator lines 150 and 151 may be present on the left side of the vehicle and delineator lines 160 and 161 may be present on the right side of the vehicle. In such a situation as well, the delineator lines 151 and 161 are removed, the lines being present outside a range defined by a lane-width equivalent value, with reference to the position of the vehicle 180. Accordingly, only the delineator lines 150 and 160 that are present at the edges of the lane are defined. Thus, the delineators 110 present on different lines 150 and 151 are not erroneously recognized as being on the same delineator line to thereby correctly recognize the shape of the road.

Also, a curve radius R of the road where the vehicle travels is calculated based on the steering angle θ detected by the steering sensor 27 and the yaw rate Ω detected by the yaw rate sensor 28. Then, based on the curve radius R, the center position coordinate (X0, Z0) of each delineator 110 is converted into the center position coordinate (X1, Z1) in terms of straight-road traveling. Then, of the delineators 110 resulting from the conversion, those delineators 110 which are present outside a range defined by a lane-width equivalent value, with reference to the position of the vehicle 180, are removed to recognize the edges of the lane and to recognize the road shape.

As a result, when the vehicle enters a curve, delineator lines are prevented from being erroneously recognized in defining the delineator lines and thus the road shape is correctly recognized.

Further, an intersection in the vehicle's width direction is obtained for each delineator line by calculating the estimated X-axis intersections Xcross. Accordingly, delineator lines can be defined in a range which is out of the detection of the radar system, thereby enabling more correct road shape recognition.

In the present embodiment, when an approximation R is calculated at step S310 based on moving objects, such as the immediately preceding vehicle 181, a curve radius R is obtained based on the approximation R and then road shape recognition is performed using the curve radius R. In this way, the estimated X-axis intersections Xcross are calculated using not only stationary objects but also moving objects. Therefore, the road shape is calculated more correctly and with good frequency when it is difficult to detect roadside objects, such as delineators, due to the presence such as of the immediately preceding vehicle 181 ahead of the apparatus-equipped vehicle or when only a small number of roadside objects are originally present along the road where the apparatus-equipped vehicle travels.

Regarding the correspondency between the description of the present embodiment and the claims, the distance/angle measuring device 5 corresponds to the radar means and the object recognition block 108 and the road shape recognition block 117 correspond to the recognizing means of the present invention. However, the object recognition block 108 corresponds to the object recognizing means, preceding vehicle extracting means and reflector extracting means, and the road shape recognition block 117 corresponds to the approximation radius calculating means and road shape recognizing means.

Seventh Embodiment

Figure 34:
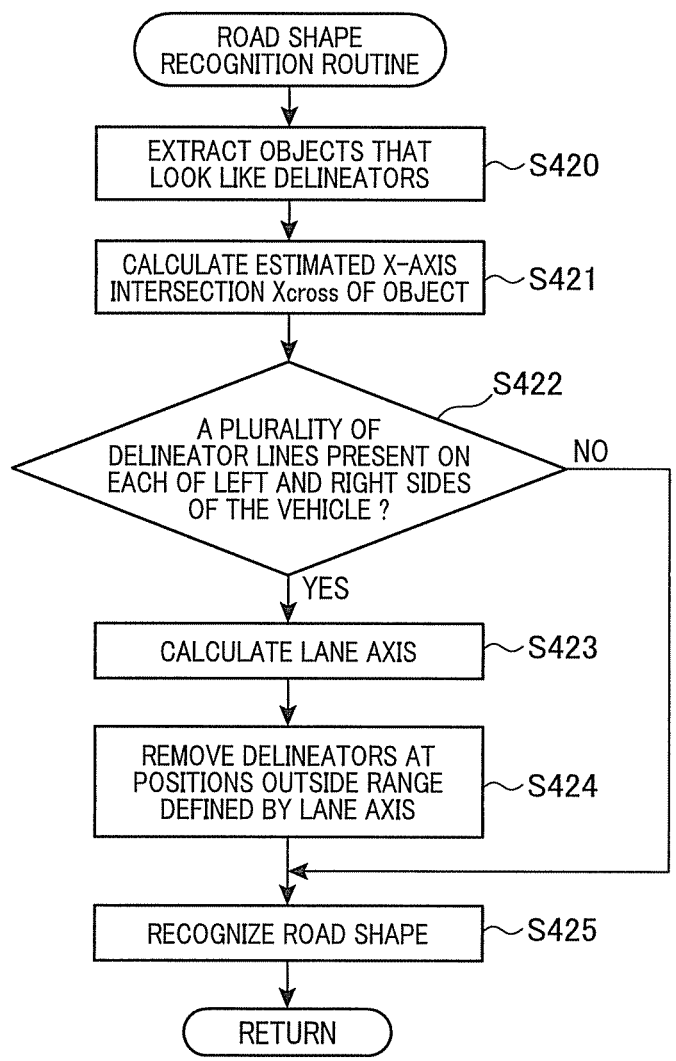
FIG. 34 is a flow diagram illustrating road shape recognition executed by an inter-vehicle control apparatus to which a road shape recognition apparatus according to a seventh embodiment of the present invention is applied.

Referring to FIG. 34, hereinafter is described a road shape recognition method and apparatus for vehicles according to a seventh embodiment.

The inter-vehicle control apparatus 1A shown in FIG. 27 is further developed. In the apparatus, a road shape recognition process is executed according to a flow diagram shown in FIG. 34.

Specifically, at step S420 of FIG. 34, objects that look like delineators, i.e. objects that are candidates of delineators, are extracted using delineators of the previous and the present cycles. This is similar to step S410 of the sixth embodiment.

At step S421, an estimated X-axis intersection Xcross of a delineator line is calculated. In this case, calculation of the estimated X-axis intersections Xcross of the delineators 110 present in the same delineator line may be condensed in the vicinity of a specific portion. However, statistical processing is conducted for such a portion and a single representative estimated X-axis intersection Xcross is calculated. By calculating such a representative estimated X-axis intersection Xcross, whether or not a plurality of delineator lines are present can be determined as will be described below. The calculation of the estimated X-axis intersection is similar to the one at step S414 of the sixth embodiment.

At the subsequent step S422, it is determined whether or not a plurality of delineator lines are present on each of the left and right sides of the vehicle.

When a plurality of representative estimated X-axis intersections Xcross are calculated at step S421 on each of the right and left sides of the vehicle, delineator line is determined to be plural, and control proceeds to step S423.

On the other hand, when it is determined that a single representative estimated X-axis intersection Xcross is present on each of the right and left sides of the vehicle, control proceeds to step S425 to recognize the road shape.

Specifically, since one line of delineators is detected on the right or left side of the vehicle, road shape recognition similar to the one at step S416 of the first embodiment is conducted based on the detected delineators.

At step S423, a lane width is calculated. Specifically, when a plurality of delineator lines are determined to be present on each of the right and left sides of the vehicle, the lane width is calculated from an interval between adjacent representative estimated X-axis intersections Xcross. In this case, the lane width may be calculated from an interval between the estimated X-axis intersections Xcross which are present on the edges of the lane where the vehicle travels.

At the subsequent step S424, a lane-width equivalent value is calculated based on the lane width calculated at step S423, with respect to the delineators subjected to the straight-road conversion in the first embodiment. Then, the delineators at positions larger than the lane-width equivalent value are removed. For example, when the lane-width equivalent value is 3.0 m, the delineators at positions larger than 3.0 m from the position of the vehicle 180 are removed.

Then, at step S425, the right and left edges of the lane are recognized based on the delineator lines that are not removed at step S424 to thereby recognize the road shape. The road shape recognition is carried out in a manner similar to the one carried out at step S416 of the first embodiment.

In the present embodiment, it is determined whether a plurality of delineator lines are present on each of the right and left sides of the vehicle. However, no limitation shall be imposed by this, but it may be determined whether a plurality of delineator lines are present on either of the right and left sides of the vehicle.

A plurality of delineator lines are not necessarily steadily detected at step S422. Therefore, for example, once a plurality of representative estimated X-axis intersections Xcross are present within the latest three seconds, delineator line may be determined to be plural.

As described above, according to the present embodiment, the road shape is correctly recognized in spite of the change of the lane width.

For example, when a vehicle travels on an ordinary road, a predetermined range corresponding to the lane of the ordinary road may be determined with reference to the vehicle and then delineator lines present in the predetermined range may be extracted. In this case, when the vehicle enters an expressway, the lane width on the expressway becomes larger and thus the delineator nearest to the vehicle comes to be present outside the predetermined range. Accordingly, it may be difficult to recognize the road shape in this situation. In this regard, in the present embodiment, a lane width is calculated and then a predetermined range is set according to the lane width. Therefore, in the situation set forth above, the road shape is correctly recognized.

Eighth Embodiment

Figure 35:
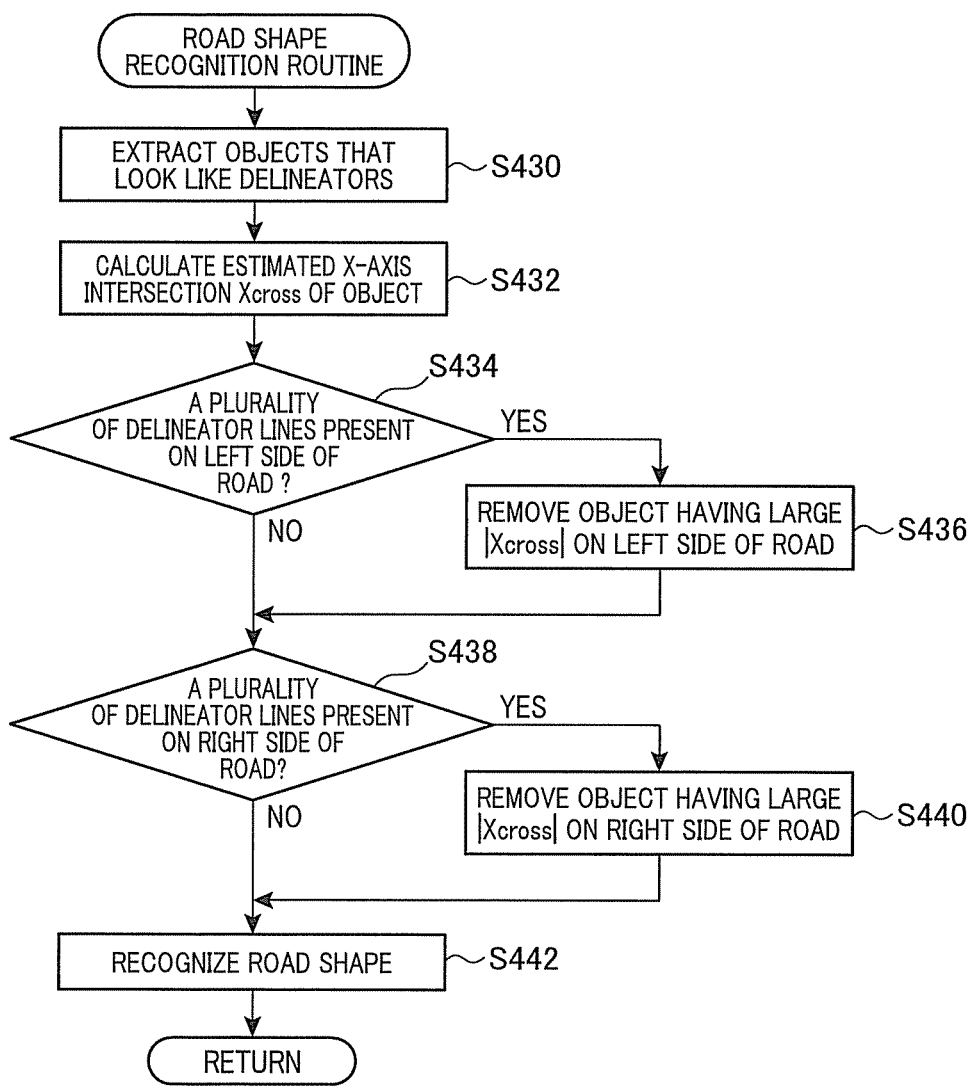
FIG. 35 is a flow diagram illustrating road shape recognition executed by an inter-vehicle control apparatus to which a road-shape recognition apparatus according to an eighth embodiment of the present invention is applied.

Referring to FIG. 35, hereinafter is described a road shape recognition method and apparatus for vehicles, according to an eighth embodiment.

The inter-vehicle control apparatus 1A shown in FIG. 27 is further developed. In this apparatus, the process of recognizing a road shape is performed according to a flow diagram shown in FIG. 35.

Specifically, at step S430 of FIG. 35, objects that look like delineators are extracted. In this extraction the delineator data of the previous cycle is also used. This is similar to step S410 of the sixth embodiment.

Then, at step S432, an estimated X-axis intersection Xcross of the delineator line is calculated. This is similar to step S432 of the second embodiment.

At the subsequent step S434, it is determined whether or not a plurality of delineator lines are present on the left side of the road.

In making a determination, the delineators having an estimated X-axis intersections Xcross of negative sign are regarded to be on the left side of the road. In this case, maximum and minimum values of the estimated X-axis intersections Xcross are calculated. If the difference is equal to or more than the lane-width equivalent value of 3.0 m, delineator line is determined to be plural and control proceeds to step S436.

At step S436, the delineators 110 with an estimated X-axis intersection Xcross of a large absolute value on the left side of the road are removed. In this case, a step similar to step S412 of the first embodiment is performed.

Then, at step S438, it is determined, similar to step S434, whether or not a plurality of delineator lines are present on the right side of the road. If it is determined that a plurality of delineator lines are present, control proceeds to step S440 where the delineators 110 with an estimated X-axis intersection Xcross of a large absolute value on the right side of the road are removed.

At the subsequent step S442, the left and right edges of the lane are recognized to recognize the road shape. The way of recognizing the edges of the lane where the vehicle travels is similar to step S416 of the first embodiment.

At step S434 or S438, a plurality of delineator lines are not necessarily steadily detected. Therefore, for example, once the difference between the maximum and minimum values of the estimated X-axis intersections Xcross are equal to or larger than the lane-width equivalent value within the latest three seconds, delineator line may be determined to be plural.

Ninth Embodiment

Figure 36:
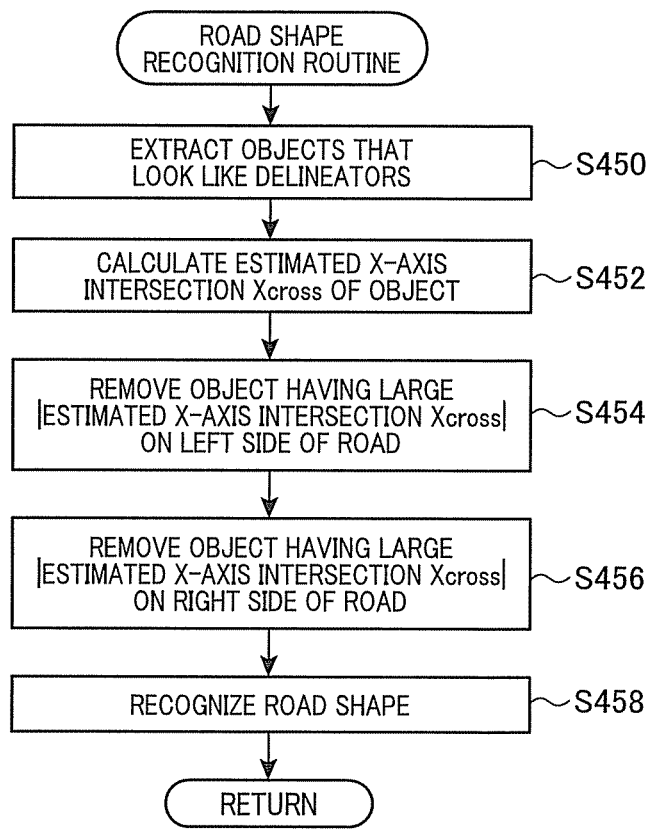
FIG. 36 is a flow diagram illustrating road shape recognition executed by an inter-vehicle control apparatus to which a road shape recognition apparatus according to a ninth embodiment of the present invention is applied.

Referring to FIG. 36, hereinafter is described a road shape recognition method and apparatus for vehicles according to a ninth embodiment.

The inter-vehicle control apparatus 1A shown in FIG. 27 is further developed. In this apparatus, the process of recognizing a road shape is performed according to a flow diagram shown in FIG. 36.

Specifically, at step S450 of FIG. 36, objects that look like delineators are extracted. In this extraction, the delineator data of the previous cycle is also used. This is similar to step S410 of the sixth embodiment.

At the subsequent step S452, an estimated X-axis intersection Xcross of each delineator is calculated. This calculation is similar to step S414 of the first embodiment.

Then, at step S454, of the delineators on the left side of the road, those which having an estimated X-axis intersection Xcross of a large absolute value are removed. In this case, delineators having an estimated X-axis intersection Xcross of a negative sign are regarded to be a group of delineators on the left side of the road. Then, in the group on the left side of the road, a minimum absolute value of the estimated X-axis intersections Xcross is calculated. For example, those delineators which satisfy the conditional expression of the following Formula (9) are removed, as having an estimated X-axis intersection Xcross of a large absolute value.

$$|\text{Estimated X-axis intersection Xcross}| > \text{Minimum value of } |\text{Estimated X-axis intersection Xcross}| + 2.0 \text{ m} \quad (9)$$

Then, at step S456, similar to step S454, delineators having an estimated X-axis intersection Xcross of a large absolute value are removed from the delineators on the right side of the road, and control proceeds to step S458.

At the subsequent step S458, the left and right edges of the lane are recognized to thereby recognize the road shape. The recognition method is similar to that of the first embodiment.

At step S454 or S456, a plurality of delineators are not necessarily steadily detected. Therefore, in calculating a minimum absolute value of the estimated X-axis intersections Xcross, the minimum value detected within the latest three seconds, for example, may be used.

As described above, a minimum value of the estimated X-axis intersections Xcross is calculated. Then, a value smaller than the lane width (e.g., 2.0 m) is added to the minimum value. The delineator line 151 at a position larger than the position resulting from the addition is removed to extract the remaining delineator line 150. Accordingly, only the delineator line 150 nearest to the vehicle 180 can be defined/enabling recognition of the road shape.

Other Embodiments

The embodiments set forth above each exemplify only an example of the configuration of the road shape recognition apparatus and the road shape recognition method. The configuration and method are not limited to the details set forth above, but may be different configurations or methods that can implement the present invention. For example, step S310 for calculating an approximation R does not have to be necessarily performed after step S300, but may be performed at any stage shown in a flow diagram such as of FIG. 30.

Tenth Embodiment

With reference to FIGS. 37 and 38, as well as FIGS. 27, 30, 31, 33 and 34 referred to in the above description, hereinafter is described a road shape recognition method and apparatus for vehicles according to a tenth embodiment.

The inter-vehicle control apparatus 1A shown in FIG. 27 is further developed. In this apparatus, the process of road shape recognition is performed according to a flow diagram shown in FIG. 37. Other configuration is the same or similar to the one shown in FIG. 27.

Figure 30:
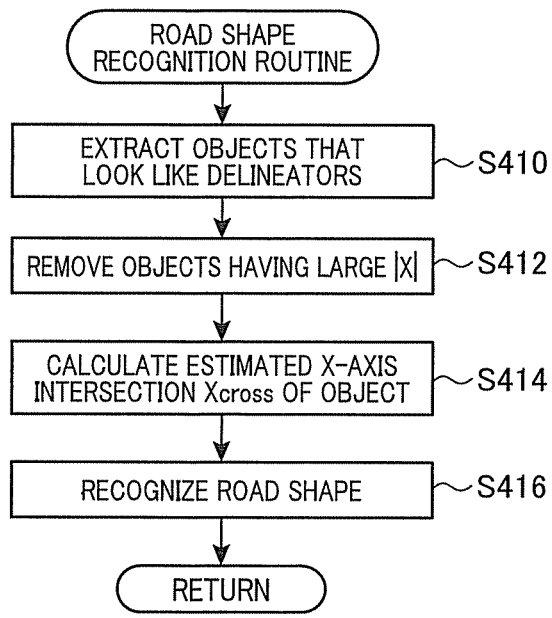
FIG. 30 is a flow diagram illustrating road shape recognition.

Referring to the flow diagrams of FIGS. 37 and 30, hereinafter is specifically described a process up to recognition of a road shape performed by the computer 2 in the inter-vehicle distance control apparatus 1A. The present process is repeatedly performed every 0.1 second.

First, at step S100 of FIG. 37, the distance/angle measuring device 5 reads measurement data (object-unit data) of the distance/angle between the vehicle and an object ahead of the vehicle.

Then, at step S200, a process of recognizing the object is performed. This process is similar to the one described above.

At the subsequent step S300, a curve radius R (estimated R) of the road where the vehicle travels is calculated based on a steering angle θ obtained from the steering sensor 24 or a yaw rate obtained from the yaw rate sensor 26. This process is also similar to the one described above.

Then, at the subsequent step S400, road shape recognition is performed. The details are described referring to the flow diagram shown in FIG. 30.

First, at step S410, object-unit data of objects that look like delineators are extracted. This process is also similar to the one described above.

The present step also uses the data in the vicinity of the road-shape estimated R calculated at step S414 of the previous cycle, among the data regarding the objects (reflectors) that look like delineators extracted at step S410 of the previous cycle. In other words, of the previous cycle data, the data that can be used in the present cycle is used. The "previous cycle" refers to a cycle immediately before the present cycle in the flow diagram shown in FIG. 2, the cycle being repeatedly performed at a predetermined cycle.

In brief, at step S414 described later, the circle passing delineators is approximated by a parabola to calculate a curve radius. Then, a point where the circle intersects the X-axis is calculated as an estimated X-axis intersection Xcross from the curve radius. This curve radius is the "road-shape estimated R".

Further, the "vicinity" in the expression in the vicinity of the road-shape estimated R refers to a predetermined range obtained by increasing and decreasing the R by a predetermined value a in the radial direction. In other words, as shown in FIG. 38, the zonal range of R±α, for example, corresponds to the vicinity of the road-shape estimated R. In the predetermined range shown in FIG. 38, a mark "⊙" indicates the previous cycle data and a mark "○" indicates the present cycle data. As shown in FIG. 38, the previous cycle data outside the predetermined range is not used in the present cycle. Thus, the accuracy of road shape recognition is prevented from being lowered.

Thus, at the present step, of the previous cycle data, the data of delineators positioned within the predetermined range based on the road-shape estimated R, is added to the present cycle data. Therefore, in the processes after step S410 inclusive, delineator data substantially corresponding to two cycles is dealt with. Accordingly, the amount of usable data is increased and thus the appearance frequency of delineators is raised.

At the subsequent step S412, as shown in FIG. 31, the center position coordinate (X0, Z0) of each delineator is converted into the center position coordinate (X1, Z1) in terms of straight-road traveling. Then, those delineators which have a large coordinate X1 after the conversion are removed.

The conversion of the position of each delineator into a position in terms of straight-road traveling is specifically calculated from the following Formula (2).

$$X1 \leftarrow X0 - Z0 \times Z0/2R$$

$$Z1 \leftarrow Z0 \qquad (2)$$

The approximation of Formula (2) is performed assuming that $|X| \ll |R|$, $|X| \ll Z$.

At the present step, when, for example, the coordinate X1 after the straight-road conversion of each delineator meets the condition of the following Formula (3), the delineator is removed from the delineators used for recognizing the road shape.

$$|\text{Straight-road conversion } X1| > 3.5 \ m \qquad (3)$$

This conditional expression is used for setting 3.0 m, for example, as a lane-width equivalent value on each of the left and right sides of the vehicle to define a range equivalent to the lane width with reference to the vehicle, and for extracting only the delineators on the edges of the lane where the vehicle travels.

When the vehicle travels at the center of a lane having a width of 3.5 m in a straight road, the vehicle is positioned at X1=−1.75 m from the edge on the left of the vehicle and at X1=−5.25 m from the edge of the adjacent lane. Also, the vehicle is positioned at X1=0.75 m from the edge on the right of the vehicle and at X1=5.25 m from the edge of the adjacent lane. The condition of Formula (3) allows removal of the delineators with the position coordinate X1 of an absolute value larger than 3.5 m in the vehicle's width direction after straight-road conversion. Thus, only the delineators on the edges of the lane where the vehicle travels are extracted.

When a curve radius R cannot be calculated due to the absence of a steering sensor and a yaw rate sensor, the condition of the following Formula (4) is used. Further, since an error may be caused in a calculated curve radius R, the condition of the following Formula (4) may be combined.

$$|X| > 4.0 \ m \qquad (4)$$

In Formula (4), the lane-width equivalent value is set to 4.0 m. The condition of Formula (4) is provided without taking into account the curve radius R of the road and thus the condition corresponds to the condition before straight-road conversion. Thus, the condition of Formula (4) is permitted to have a margin compared to the condition of Formula (3).

Then, at step S414, an estimated X-axis intersection of each delineator is calculated. The estimated X-axis intersection refers to an intersection between a calculated circle 85 and the vehicle's width direction, i.e. the X-axis with the vehicle as an origin. The calculated circle 85 passes the center coordinate (X0, Z0) of the delineator, as shown in FIG. 33, and has a vector 80 as a tangent vector expressing a speed of the delineator relative to the vehicle.

The radius R of the circle 85 corresponds to the road-shape estimated R. In other words, the road-shape estimated R is an R calculated using a delineator (reflector) that is a stationary object.

Similar to the above, an approximate calculation is applied to the calculation of the estimated X-axis intersection.

When the estimated X-axis intersection Xcross is calculated, a range in the vehicle's width direction where the radar system is not able to conduct detection can be defined. Accordingly, this enables more correct road shape recognition and at the same time enables recognition of the left and right edges of the lane, as set forth below, where the vehicle travels.

The estimated X-axis intersection Xcross is calculated for each of the delineators remained without being removed by the conditional expressions of the above Formulas (3) and (4). Finally, the delineators selected on both of the left and right sides of the vehicle have a minimum distance (Z0) in the forward direction of the vehicle. The selected delineators are used for the following process.

At step S416, the left and right edges of the lane where the vehicle travels are recognized using the results obtained up to step S414. First, the signs of the estimated X-axis intersections Xcross calculated at step S414 are divided into two groups, i.e. a positive group and a negative group. The delineators of the positive group are recognized to be those belonging to the right edge of the lane, while the delineators of the negative group are recognized to be those belonging to the left edge of the lane.

In each of the left and right edges of the lane, the delineators remained without being removed through the straight-road conversion at step S421 are mutually connected through the respective center position coordinates (X0, Z0) before the straight-road conversion to thereby recognize the road shape.

In this case, the data of the delineators acquired in the previous cycle at step S410 is also used. Accordingly, the number of delineators connected at the present step is larger than the number of delineators that would be acquired in one cycle. In other words, the appearance frequency of delineators is raised. Thus, the road shape is more correctly recognized.

The present embodiment exemplifies that delineator lines are detected on both of the right and left sides of the vehicle. However, this shall not impose a limitation, but delineator lines may be detected on either of the right and left sides of the road.

As described above, the road shape recognition apparatus for vehicles according to the present embodiment has the following advantages.

Stationary objects having a width larger than a predetermined value, i.e. 1 m, are removed to extract only the reflectors placed on the road. Thus, most of the vehicles, signposts, advertising boards and the like are removed and thus only the delineators 110 are extracted.

As shown in FIG. 34, when delineator lines 150 and 151 are present on the left side of the vehicle and the delineator lines 160 and 161 are present on the right side of the vehicle, the delineator lines 151 and 161 are removed, which are present outside the range defined by a lane-width equivalent value, with reference to the position of the vehicle 180. Accordingly, only the delineator lines 150 and 160 present on the edges of the lane where the vehicle travels are defined. Thus, the delineators 110 present on the different delineator lines 150 and 151 are not erroneously recognized as being on the same delineator line. In this way, the road shape is more correctly recognized.

A curve radius R of the curve the vehicle travels is calculated from a steering angle θ detected by the steering sensor 24 and a yaw rate Ω detected by the yaw rate sensor 26. Then, based on the curve radius R, the center position coordinate (X0, X0) of each delineator 110 is converted into the center position coordinate (X1, Z1) in terms of straight-road traveling. Then, some delineators 110 are removed from the delineators 110 after conversion. These delineators 110 to be removed are present at positions outside the range defined by the lane-width equivalent value, with reference to the position of the vehicle 180. Thus, the edges of the lane are recognized and thus the road shape is recognized.

As a result, when the vehicle enters a curve, the road shape is correctly recognized, preventing erroneous recognition in defining delineator lines.

Further, calculation of each of the estimated X-axis intersections Xcross leads to the calculation of an intersection between each delineator line and the vehicle's width direction. Thus, the delineator line is defined as well in a range where the radar system is not able to conduct detection. In this way, the road shape is more correctly recognized.

The present embodiment has a feature in that, in performing road shape recognition, a part of the delineators extracted in the previous cycle is used in addition to the delineators of the present cycle. The part of the delineators extracted in the previous cycle corresponds to the data in the vicinity of the road-shape estimated R calculated in the previous cycle. Thus, in a situation where an absolute number of delineators that can be used for road shape recognition is small, a situation where a number of delineators are present is created. The situation where an absolute number of delineators is small may, for example, be the situation where it is difficult to detect delineators due to the presence of a preceding vehicle, or the situation where the number of delineators of the road where the vehicle travels is originally small. In other words, the appearance frequency of delineators is raised to increase the amount of data usable for the calculation of road shape recognition. Thus, a correct road shape is calculated with good frequency.

Further, it is not that all of the data of the delineators in the previous cycle is merely unconditionally used, but the previous cycle data used in the present embodiment corresponds to the delineators of the previous cycle, which are within a predetermined range with reference to the road-shape estimated R calculated in the previous cycle. Accordingly, the data that is not in conformity with the road shape is removed from road shape recognition. As a result, the road shape is more correctly recognized.

Regarding the correspondency between the description of the present embodiment and the recitations of the claims, the distance/angle measuring device 4 corresponds to the radar means, and the object recognition block 8 and the road-shape recognition block 17 correspond to the recognizing means of the present invention. However, among them, the object recognition block 8 corresponds to the object recognizing means, extracting means and data adding means, and the road-shape recognition block 17 corresponds to the road edge recognizing means.

Further, the process performed by the object recognition block 8 corresponds to the acquisition process, extraction process and data addition process, and the process performed by the road-shape recognition block 17 corresponds to the recognition process. In addition, the road-shape estimated R corresponds to the road-shape estimated curve radius of the present invention.

Other Embodiments

The tenth embodiment described above exemplifies only an example of the configuration of the inter-vehicle distance control apparatus 1 and the road shape recognition method. The configuration and the method are not limited to the details set forth above, but may be different configurations or methods that can implement the present invention. For example, in the above embodiment, in adding the object-unit data of reflectors extracted in the previous cycle to the object-unit data of reflectors of the present cycle, the reflectors that fall within a range R±α as the vicinity of the road-shape estimated R have been selected: However, this is only an example of the "vicinity of the road-shape estimated R". Instead, a predetermined range in the radial direction may be appropriately set with reference to R, such as a range of R+α or a range of R−α.

Further, the tenth embodiment described above may be modified according to the flow diagrams described in the seventh, eighth and ninth embodiments set forth above. In other words, the road shape recognition process shown in the flow diagram of FIG. 34, 35 or 36 may be applied to the tenth embodiment.

The embodiments described above employ a distance/angle measuring device using laser beams as the "radar means". Alternatively, as already mentioned above, a millimeter wave, for example, may be used. For example, when FMCW radar or Doppler radar is used with a millimeter wave, information on the distance from a reflected wave (received wave) to a preceding vehicle and information on the relative speed of the preceding vehicle are obtained at a time. Accordingly, this eliminates the calculation of a relative speed based on the distance information.

What is claimed is:

1. A road-shape recognition method for vehicles, comprising:
   detecting, by a turn calculator mounted in a vehicle, a turning condition of the vehicle;
   calculating, by a curvature calculator mounted in the vehicle, a curvature of a travelling road where the vehicle travels, from the turning condition of the vehicle and a speed of the vehicle;
   detecting, by a radar mounted in the vehicle, a distance to a reflector and an angle to the reflector relative to a vehicle's width direction on the basis of a reflected wave that is a reflection of a transmitted wave radiated over a predetermined angular range in the vehicle's width direction;
   calculating, by an object recognizing unit mounted in the vehicle, a relative position of the object on the basis of the detected distance and the angle in the vehicle's width direction;
   calculating, by a lane probability calculator mounted in the vehicle, a first lane probability that is a probability that an object to be recognized is on the same lane where the vehicle to which the method is applied travels, on the basis of the calculated curvature of the travelling road where the vehicle travels and the calculated relative position of the object relative to the vehicle;
   determining, by the object recognizing unit, an object type as to whether each of objects is a moving object or a stationary object, according to a relative speed of the object and a speed of the vehicle;
   recognizing, by a road-shape recognizing unit mounted in the vehicle, a road shape ahead of the vehicle according to extracted stationary object data effective for recognizing a road shape, while extracting the stationary object data using the relative position of the object and the determined object type;
   determining, by a same-lane determining unit mounted in the vehicle, a second lane probability that the object is on the same lane where the vehicle travels, according to the recognized road shape ahead of the vehicle and a degree of the recognition, the road shape being recognized according to a distance to the object and an angle to the object in a vehicle's width direction;
   calculating, by a correction value calculator mounted in the vehicle, a correction value used for correcting the first lane probability in conformity with the determination of the second lane probability; and
   determining, by the lane probability calculator, whether or not there is a difference between the calculated curvature of the travelling road where the vehicle travels and a curvature of the recognized road shape ahead of the vehicle to correct the first lane probability using the correction value when there is no difference, or not to correct the first lane probability using the correction value when there is a difference.

2. A road-shape recognition apparatus for vehicles, comprising:
   a turn detector configured to detect a turning condition of a vehicle equipped with the apparatus;
   a curvature calculator configured to calculate a curvature of a travelling road where the vehicle travels, from a turning condition of the vehicle calculated by the turn detector and a speed of the vehicle;
   a radar configured to detect a distance to a reflector and an angle to the reflector relative to a vehicle's width direction on the basis of a reflected wave that is a reflection of a transmitted wave radiated over a predetermined angular range in the vehicle's width direction;
   an object recognizing unit configured to calculate a relative position of the object on the basis of the distance detected by the radar and the angle in the vehicle's width direction, the object recognizing unit being able to determine an object type as to whether each of objects is a moving object or a stationary object, according to a relative speed of the object and a speed of the vehicle;
   a lane probability calculator configured to calculate a first lane probability that is a probability that the object is on the same lane where the vehicle travels, on the basis of the calculated curvature of the travelling road where the vehicle travels and the calculated relative position of the object;
   a road-shape recognizing unit configured to recognize a road shape ahead of the vehicle according to extracted stationary object data effective for recognizing a road shape, while extracting the stationary object data using the relative position of the object and the object type obtained by the object recognizing unit;
   a same-lane determining unit configured to determine a second lane probability of the object to be on the same lane where the vehicle travels, according to the road shape recognized by the road-shape recognizing unit and a degree of the recognition;
   a correction value calculator configured to calculate a correction value used for correcting the first lane probability in conformity with the determination of the second lane probability made by the same-lane determining unit,
   the lane probability calculator determining whether there is a difference between a curvature of the travelling road where the vehicle travels and a curvature of the recognized road shape ahead of the vehicle to correct the first lane probability using the correction value calculated by the correction value calculator when it is determined there is no difference, or not to correct the first lane probability using the correction value calculated by the correction value calculator when it is determined there is a difference.

3. A non-transitory computer-readable recording medium which is recorded with programs for functioning a computer system as;
   a turn detector configured to detect a turning condition of a vehicle equipped with a road-shape recognition apparatus;

a curvature calculator configured to calculate a curvature of a travelling road where the vehicle travels, from the detected turning condition of the vehicle and a speed of the vehicle;

an object recognizing unit configured to calculate a relative position of the object on the basis of a distance detected by a radar and the angle relative to the vehicle's width direction, the radar detecting a distance to a reflector and an angle to the reflector in a vehicle's width direction on the basis of a reflected wave that is a reflection of a transmitted wave radiated over a predetermined angular range in the vehicle's width direction, the object recognizing unit determining an object type as to whether each of objects is a moving object or a stationary object, according to a relative speed of the object and a speed of the vehicle;

a lane probability calculator configured to calculate a first lane probability that is a probability that the object is on the same lane where the vehicle travels, on the basis of the calculated curvature of the travelling road where the vehicle travels and the calculated relative position of the object;

a road-shape recognizing unit configured to recognize a road shape according to extracted stationary object data effective for recognizing a road shape ahead of the vehicle, while extracting the stationary object data using the relative position of the object and the object type obtained by the object recognizing unit;

a same-lane determining unit configured to determine a second lane probability of the object to be on the same lane where the vehicle travels, according to the road shape recognized by the road-shape recognizing unit and a degree of the recognition; and a correction value calculator configured to calculate a correction value used for correcting the first lane probability in conformity with the determination of the second lane probability made by the same-lane determining unit, the lane probability calculator determining whether there is a difference between the calculated curvature of the travelling road where the vehicle travels and a curvature of the recognized road shape ahead of the vehicle to correct the first lane probability using the correction value calculated by the correction value calculator when it is determined there is no difference, or not to correct the first lane probability using the correction value calculated by the correction value calculator when it is determined there is a difference.

\* \* \* \* \*